(12) United States Patent
Ozone et al.

(10) Patent No.: US 12,368,955 B2
(45) Date of Patent: Jul. 22, 2025

(54) IMAGE PROCESSING DEVICE, IMAGE PROCESSING METHOD, AND PROGRAM

(71) Applicant: Sony Group Corporation, Tokyo (JP)

(72) Inventors: Takayoshi Ozone, Tokyo (JP); Hiroshi Yamamoto, Tokyo (JP); Ryuichi Tadano, Tokyo (JP)

(73) Assignee: Sony Group Corporation, Tokyo (JP)

( * ) Notice: Subject to any disclaimer, the term of this patent is extended or adjusted under 35 U.S.C. 154(b) by 812 days.

(21) Appl. No.: 17/626,245

(22) PCT Filed: May 11, 2020

(86) PCT No.: PCT/JP2020/018810
§ 371 (c)(1),
(2) Date: Jan. 11, 2022

(87) PCT Pub. No.: WO2021/014716
PCT Pub. Date: Jan. 28, 2021

(65) Prior Publication Data
US 2022/0264008 A1    Aug. 18, 2022

(30) Foreign Application Priority Data
Jul. 24, 2019   (JP) ................................. 2019-136087

(51) Int. Cl.
*G06F 3/04845*     (2022.01)
*G06F 3/04847*     (2022.01)
(Continued)

(52) U.S. Cl.
CPC ....... *H04N 23/683* (2023.01); *G06F 3/04845* (2013.01); *G06F 3/04847* (2013.01);
(Continued)

(58) Field of Classification Search
CPC .... G06F 3/0481; G06F 3/0482; G06F 3/0484; H02M 1/12; H02M 1/14; H02M 1/00;
(Continued)

(56) References Cited

U.S. PATENT DOCUMENTS

2006/0158545 A1    7/2006  Hirai
2010/0208087 A1    8/2010  Ogawa
(Continued)

FOREIGN PATENT DOCUMENTS

| CN | 101107842 A | 1/2008 |
|----|-------------|--------|
| CN | 101661208 A | 3/2010 |

(Continued)

OTHER PUBLICATIONS

International Search Report issued Aug. 4, 2020 in PCT/JP2020/018810 filed May 11, 2020, 2 pages.

*Primary Examiner* — Rayeez R Chowdhury
(74) *Attorney, Agent, or Firm* — Oblon, McClelland, Maier & Neustadt, L.L.P.

(57) ABSTRACT

In an image processing device, shake modification processing of obtaining shake-modified image data by modifying a shake state of input image data constituting a moving image, user interface processing of acquiring operation information regarding shake modification, and parameter setting processing of setting a parameter of the shake modification processing on the basis of the operation information acquired in the user interface processing are performed.

18 Claims, 34 Drawing Sheets

(51) Int. Cl.
*G06T 5/73* (2024.01)
*H04N 23/62* (2023.01)
*H04N 23/68* (2023.01)
*H04N 23/80* (2023.01)

(52) U.S. Cl.
CPC ............... *G06T 5/73* (2024.01); *H04N 23/62* (2023.01); *H04N 23/80* (2023.01)

(58) Field of Classification Search
CPC ............ H02M 3/00; H02M 5/00; H02M 7/00; H02M 9/00; H02M 11/00
See application file for complete search history.

(56) References Cited

U.S. PATENT DOCUMENTS

| | | | |
|---|---|---|---|
| 2014/0223368 A1* | 8/2014 | Nakano | G06T 5/73 715/810 |
| 2015/0042828 A1 | 2/2015 | Wakamatsu | |
| 2015/0304560 A1 | 10/2015 | Joshi | |
| 2017/0007857 A1 | 3/2017 | Wakamatsu | |
| 2017/0078577 A1* | 3/2017 | Wakamatsu | H04N 23/687 |
| 2017/0134658 A1 | 5/2017 | Miyahara | |
| 2017/0142347 A1 | 5/2017 | Sun et al. | |
| 2017/0237904 A1* | 8/2017 | Takahashi | H04N 23/683 348/208.1 |
| 2019/0075249 A1 | 5/2019 | Sun et al. | |
| 2020/0404178 A1* | 12/2020 | Li | G03B 5/00 |

FOREIGN PATENT DOCUMENTS

| | | |
|---|---|---|
| CN | 109391755 A | 2/2019 |
| JP | 2006-180471 A | 7/2006 |
| JP | 2006-203463 A | 8/2006 |
| JP | 2011097512 A | 5/2011 |
| JP | 2014-153778 A | 8/2014 |
| JP | 2015126436 A | 7/2015 |
| JP | 2015-216510 A | 12/2015 |
| JP | 2018-74337 A | 5/2018 |
| JP | 2018098612 A | 6/2018 |
| JP | 2019029832 A | 2/2019 |
| WO | WO 2016/002322 A1 | 1/2016 |

* cited by examiner

FIG. 1
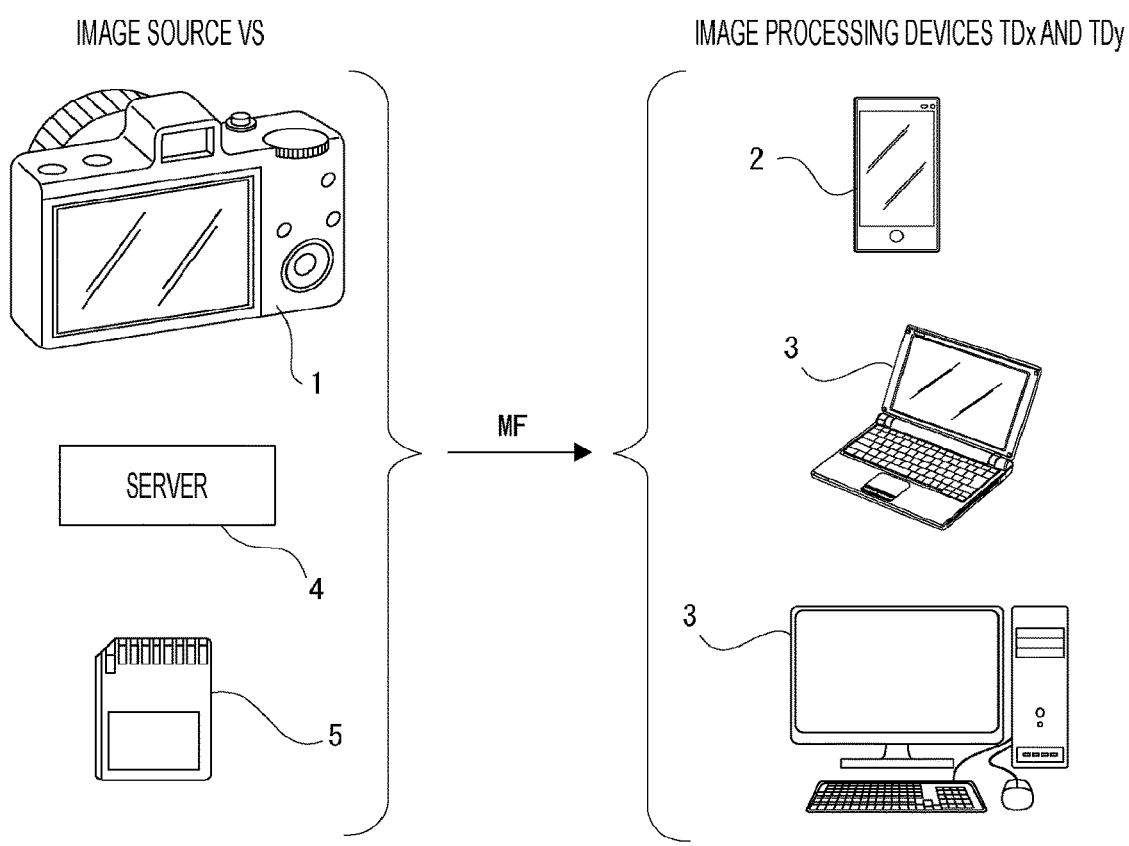
A
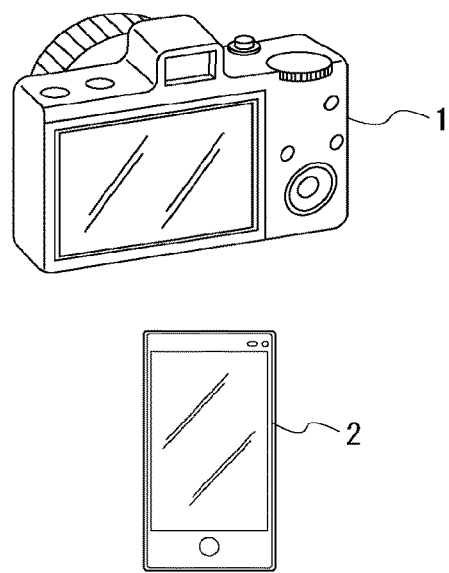
B

FIG. 13
A
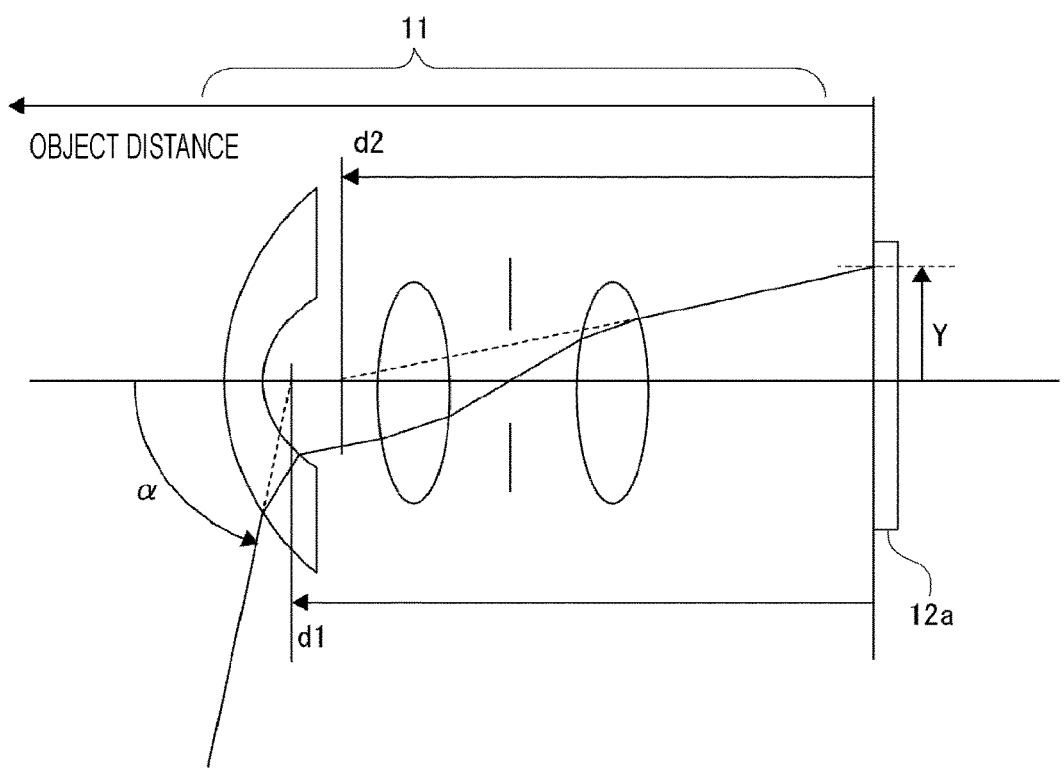
B
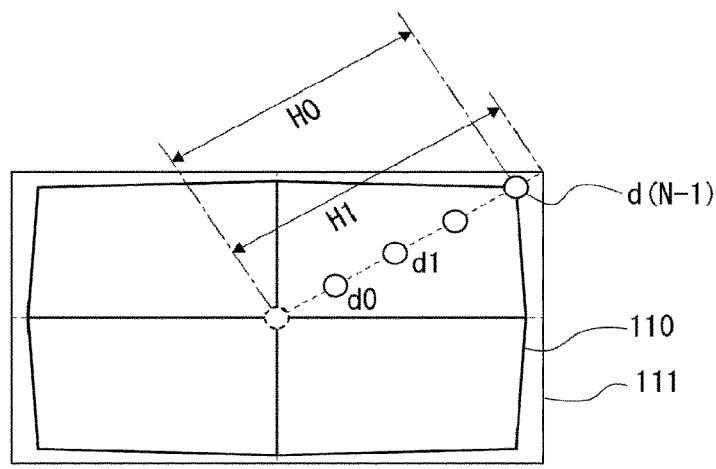

FIG. 15
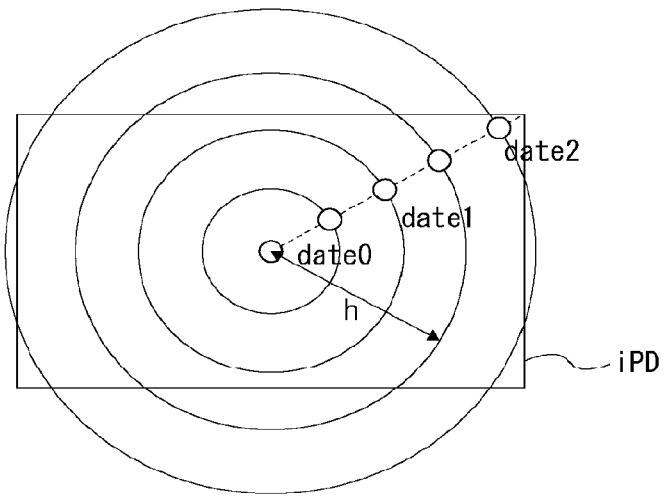
A
RELATIONSHIP BETWEEN Imager PLANE AND INCIDENT ANGLE
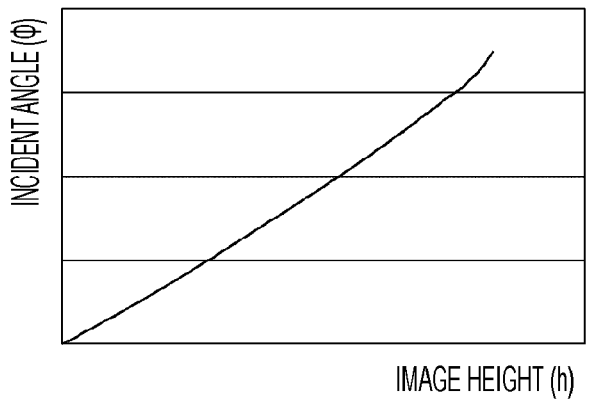
B
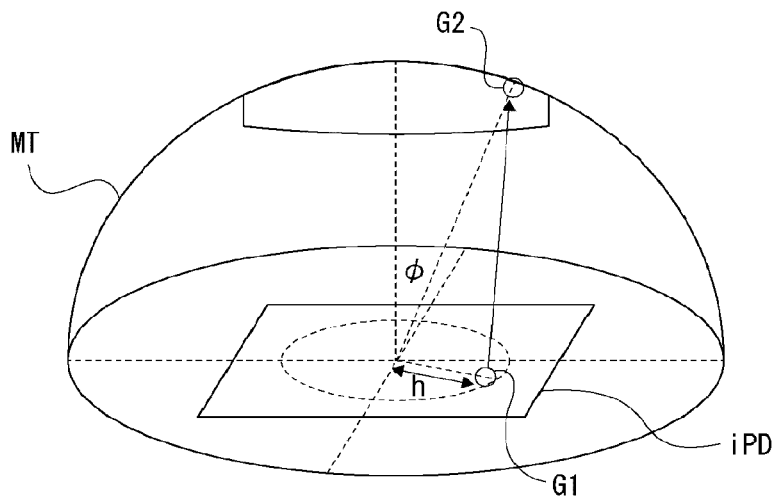
C FIG. 20
A
PERFORM PROCESSING ON OUTPUT COORDINATE PLANE
B
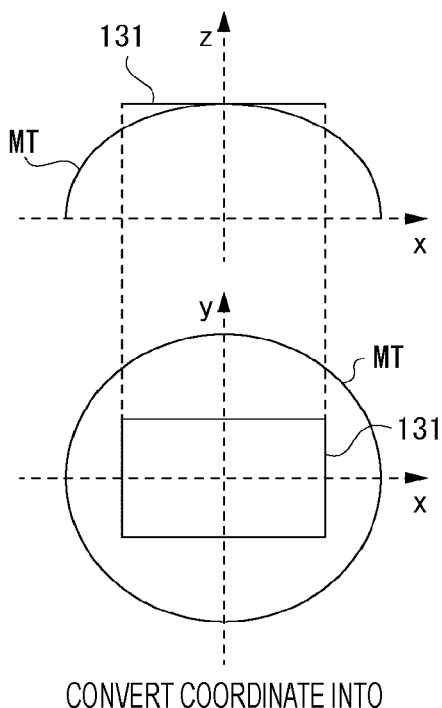
CONVERT COORDINATE INTO NORMALIZED SPACE

FIG. 21
A
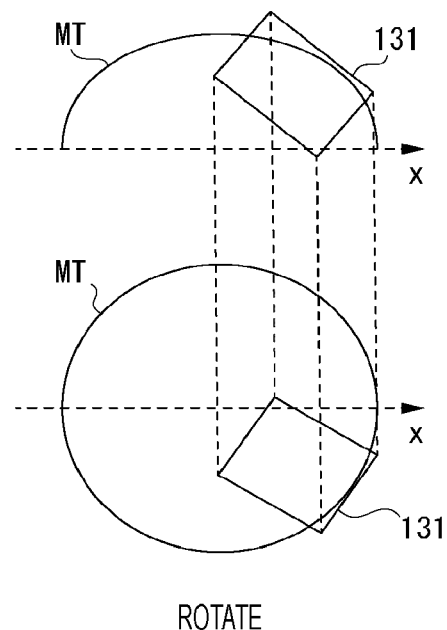
ROTATE
B
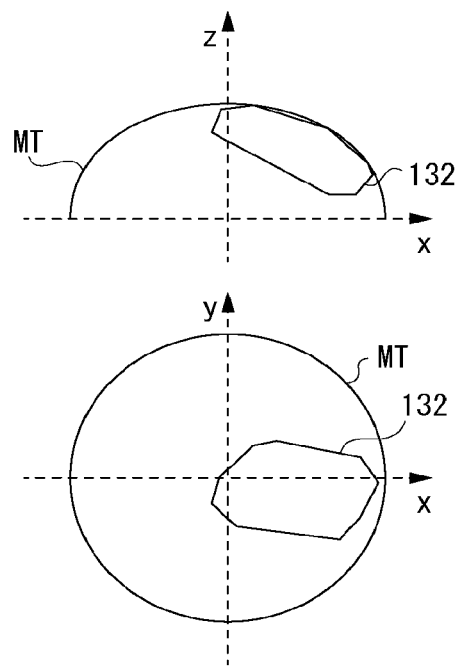
CALCULATE CELESTIAL SPHERE CORRESPONDING POINTS
IN PERSPECTIVE PROJECTION FIG. 22
A 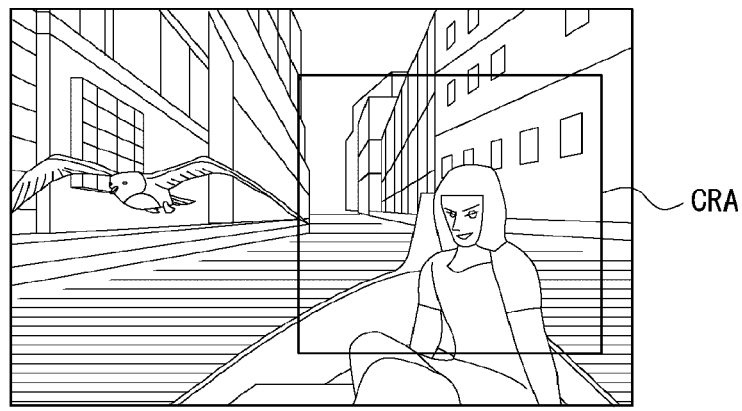
B 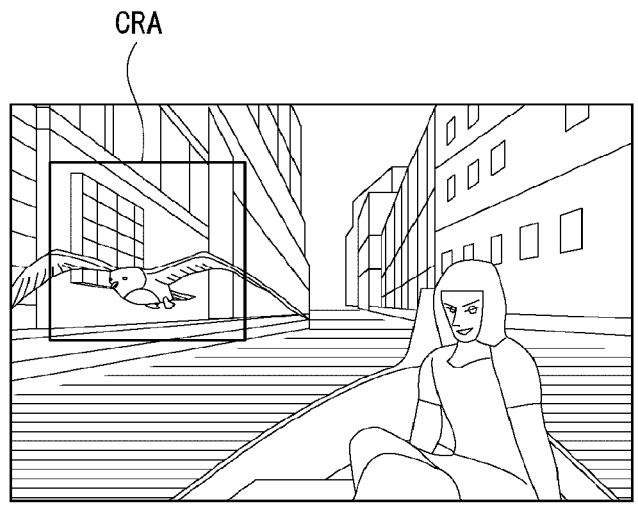

FIG. 23

MTD1

| IMU data | gyro | |
| --- | --- | --- |
| | accel | |
| | SAMPLING RATE | |
| | DISTORTION CORRECTION PARAMETER | LENS DISTORTION CORRECTION |
| | | TRAPEZOIDAL DISTORTION CORRECTION |
| | | FOCAL PLANE DISTORTION CORRECTION |
| | | ELECTRONIC CAMERA SHAKE CORRECTION (yaw/pitch/roll) |
| | | OPTICAL CAMERA SHAKE CORRECTION (yaw/pitch/roll) |
| COORDINATE TRANSLATION PARAMETER (HP) | | |
| TIMING INFORMATION (TM) | EXPOSURE TIME (shutter speed) | |
| | EXPOSURE START TIMING | |
| | READOUT TIME (CURTAIN SPEED) | |
| | NUMBER OF EXPOSURE FRAMES (LONG-SECOND EXPOSURE INFORMATION) | |
| | IMU SAMPLE TIMING OFFSET | |
| | FRAME RATE | |
| CAMERA PARAMETER (CP) | ANGLE OF VIEW (FOCAL LENGTH) | |
| | ZOOM POSITION | |
| | LENS DISTORTION INFORMATION | |

MTD2

| QUATERNION (QD) | | |
| --- | --- | --- |
| TIMING INFORMATION (TM) | EXPOSURE TIME (shutter speed) | |
| | EXPOSURE START TIMING | |
| | READOUT TIME (CURTAIN SPEED) | |
| | NUMBER OF EXPOSURE FRAMES (LONG-SECOND EXPOSURE INFORMATION) | |
| | IMU SAMPLE TIMING OFFSET | |
| | FRAME RATE | |
| CAMERA PARAMETER (CP) | ANGLE OF VIEW (FOCAL LENGTH) | |
| | ZOOM POSITION | |
| | LENS DISTORTION INFORMATION | |

FIG. 27
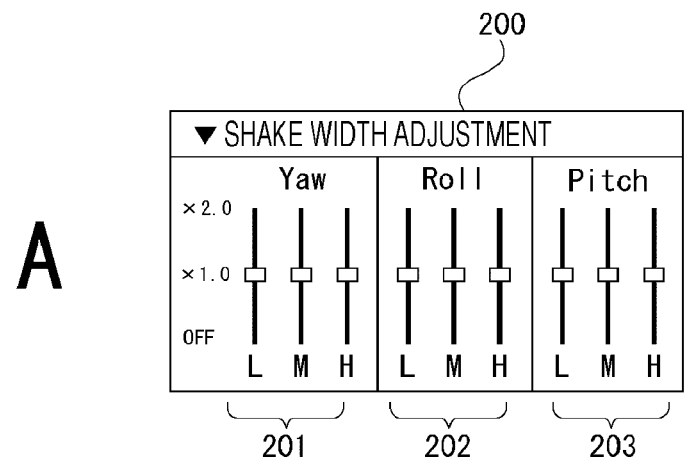
A
B
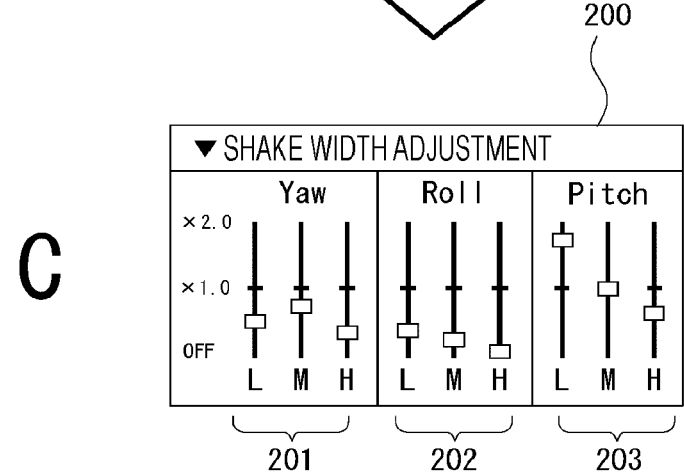
C

FIG. 28
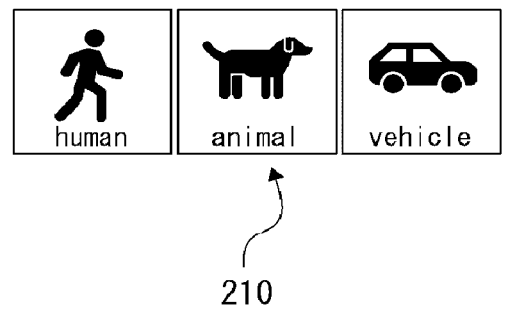
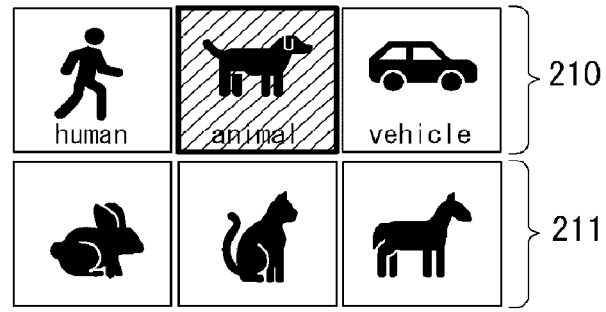
OUTPUT SELECTED PRESET DATA

IMAGE PROCESSING DEVICE, IMAGE PROCESSING METHOD, AND PROGRAM

TECHNICAL FIELD

The present technology relates to an image processing device, an image processing method, and a program, and particularly relates to image processing for image shake.

BACKGROUND ART

A technique for performing image processing such as various corrections for a moving image captured by an imaging device is known.

Patent Document 1 below discloses that an anti-vibration processing is executed for image data related to a captured image, and an influence of the anti-vibration processing is removed for image data after the anti-vibration processing.

CITATION LIST

Patent Document

Patent Document 1: Japanese Patent Application Laid-Open No. 2015-216510

SUMMARY OF THE INVENTION

Problems to be Solved by the Invention

In recent years, a user can easily perform image capturing, image adjustment, and the like using a mobile terminal such as a smartphone or a tablet, a camera itself, or a personal computer, and moving image posting is also active.

Under such an environment, it is desired to produce an image with higher quality or various images instead of outputting the image captured by the user as it is.

Further, it is also desired that a broadcaster or the like can perform various productions of images.

Therefore, the present disclosure proposes a technique of enabling easy adjustment regarding shake in a moving image.

Solutions to Problems

An image processing device according to the present technology includes a shake modification unit configured to perform shake modification processing of obtaining shake-modified image data by modifying a shake state of input image data constituting a moving image; a user interface processing unit configured to acquire operation information regarding shake modification; and a parameter setting unit configured to set a parameter of the shake modification processing on the basis of the operation information acquired by the user interface processing unit.

The shake modification processing is to change the shake state by reducing the shake occurring in the moving image or adding the shake. The shake modification unit performs shake modification processing on the basis of the parameter set by the parameter setting unit.

In the image processing device according to the above-described present technology, it is conceivable that the user interface processing unit causes an operation piece for adjusting a shake amount to be presented, and the parameter setting unit sets a parameter for adjusting the shake amount on the basis of operation information of the operation piece.

That is, the shake amount of the shake appearing in the image can be adjusted by an operation.

In the image processing device according to the above-described present technology, it is conceivable that the user interface processing unit causes an operation piece for adjusting a shake amount for one or a plurality of shake direction components to be presented, and the parameter setting unit sets a parameter for adjusting the shake amount of the shake direction component on the basis of operation information of the shake amount of the shake direction component.

The shake appearing in the image includes the plurality of shake direction components. Therefore, the shake amount can be adjusted for one shake direction component or for each plurality of shake direction components.

In the image processing device according to the above-described present technology, it is conceivable that the shake direction component includes at least one of a yaw direction shake component, a roll direction shake component, or a pitch direction shake component.

The shake appearing in the image includes shake components in a yaw direction, a roll direction, and a pitch direction. At least one, two, or all of these shake amounts can be adjusted.

In the image processing device according to the above-described present technology, it is conceivable that the user interface processing unit causes an operation piece for adjusting a shake amount for one or a plurality of frequency bands of shake to be presented, and the parameter setting unit sets a parameter for adjusting the shake amount of the frequency band on the basis of operation information of the shake amount of the frequency band.

The shake appearing in the image includes vibration components of a plurality of frequencies. Therefore, the shake amount can be adjusted for each one frequency band or each plurality of frequency bands.

In the image processing device according to the above-described present technology, it is conceivable that the user interface processing unit causes an operation piece for adjusting shake amounts of at least a low frequency band and a high frequency band as the frequency band to be presented, and the parameter setting unit sets a parameter for adjusting the shake amount of the low frequency band and a parameter for adjusting the shake amount of the high frequency band.

For example, the shake can be adjusted in two bands of the low frequency band and the high frequency band. Alternatively, the shake can be adjusted in three or more bands of the low frequency band, one or more intermediate frequency bands, and the high frequency band.

In the image processing device according to the above-described present technology, it is conceivable that the user interface processing unit enables selection operation for preset data of a shake waveform, and the parameter setting unit sets a parameter for adjusting shake of an image according to the selection operation for preset data.

For example, one or a plurality of the preset data of a shake waveform indicating a shake pattern is stored, and a user is enabled to perform an operation of applying one preset data or to select one in the plurality of preset data.

In the image processing device according to the above-described present technology, it is conceivable that the user interface processing unit causes presentation of a timeline indicating a shake component to be executed in a time axis direction of an image.

For example, a waveform representing shake or the like is displayed in the time axis direction of the image.

In the image processing device according to the above-described present technology, it is conceivable that the user interface processing unit enables specification of a keyframe on the timeline by a user operation.

The user is enabled to specify an arbitrary position (timecode/frame) on the timeline.

In the image processing device according to the above-described present technology, it is conceivable that the user interface processing unit enables specification of a keyframe on the timeline by a user operation, and performs processing of reproducing an image with reference to the keyframe specified by the user operation on the timeline.

For example, the user is enabled to specify an arbitrary position (timecode/frame) on the timeline as a keyframe, and the user is enabled to perform a preview (reproduction) operation.

In the image processing device according to the above-described present technology, it is conceivable that the user interface processing unit performs processing of repeatedly reproducing an image section determined with reference to the keyframe specified by the user operation on the timeline.

For example, when the user specifies an arbitrary position (timecode/frame) on the timeline as a keyframe, the image section is determined with reference to the keyframe. Then, the image section is repeatedly reproduced.

In the image processing device according to the above-described present technology, it is conceivable that the user interface processing unit performs processing of assigning preset data selected by an operation to the timeline.

For example, an operation to assign the preset data to a certain section on the timeline is enabled by an operation of the user dragging the image indicating the preset data onto the timeline.

In the image processing device according to the above-described present technology, it is conceivable that the user interface processing unit performs processing of presenting a situation of shake that changes according to the assignment of the preset data to the timeline.

For example, when the user assigns certain preset data to a certain section on the timeline, display indicating that the shake changes in the section is performed.

In the image processing device according to the above-described present technology, it is conceivable that the user interface processing unit enables specification of a keyframe on the timeline by a user operation, and causes an operation of shake modification to be reflected in a section set with reference to the keyframe.

For example, the user is enabled to specify an arbitrary position (timecode/frame) on the timeline as a keyframe, and the section is automatically set according to the keyframe. The shake modification by various operations is reflected in the section.

In the image processing device according to the above-described present technology, it is conceivable that the user interface processing unit performs processing of presenting a state before modification and a state after modification of shake of an image regarding a shake modification operation on the timeline.

For example, the waveform of the shake is displayed, and the waveform of the shake before the shake modification and the waveform of the shake after the shake modification are simultaneously displayed or switched and displayed.

In the image processing device according to the above-described present technology, it is conceivable that the shake modification unit performs shake modification processing of adding shake to the input image data in which no shake has occurred or the input image data to which shake reduction processing has been applied.

For example, the shake modification is performed for an image in which no camera shake or the like has originally occurred or an image for which the camera shake or the like has been removed on an imaging device side, which has been captured by a fixed camera.

In the image processing device according to the above-described present technology, it is conceivable that the shake modification unit performs shake modification processing for the input image data including a shake component.

For example, an image from which the camera shake or the like has not been removed is input, and the shake modification is performed for the image.

In the image processing device according to the above-described present technology, it is conceivable that the user interface processing unit performs processing of storing shake information in response to an operation of saving shake information of a user.

That is, information of the shake modification performed in response to the user operation, for example, parameter setting can be saved.

An image processing method according to the present technology includes, performing, by an image processing device, shake modification processing of obtaining shake-modified image data by modifying a shake state of input image data constituting a moving image; user interface processing of acquiring operation information regarding shake modification; and parameter setting processing of setting a parameter of the shake modification processing on the basis of the operation information acquired in the user interface processing.

Thereby, the user is enabled to execute an operation of shake production or shake reduction for an image.

The program according to the present technology is a program for causing an information processing device to execute processing corresponding to such an image processing method.

As a result, the disclosed image processing can be executed by various information processing devices.

BRIEF DESCRIPTION OF DRAWINGS

FIG. 1 is an explanatory diagram of a device used in an embodiment of the present technology.

FIG. 13 is an explanatory diagram of metadata regarding lens distortion correction.

FIG. 15 is an explanatory diagram of attachment to a celestial sphere model according to the embodiment.

FIG. 20 is an explanatory diagram of association between an output image and the celestial sphere model according to the embodiment.

FIG. 21 is an explanatory diagram of rotation and perspective projection of an output coordinate plane according to the embodiment.

FIG. 22 is an explanatory diagram of a clipped region according to the embodiment.

FIG. 23 is an explanatory diagram of metadata transmitted in the embodiment.

FIG. 27 is an explanatory diagram of a UI according to a third embodiment.

FIG. 28 is an explanatory diagram of image processing according to the third embodiment.

MODE FOR CARRYING OUT THE INVENTION

Figure 2:
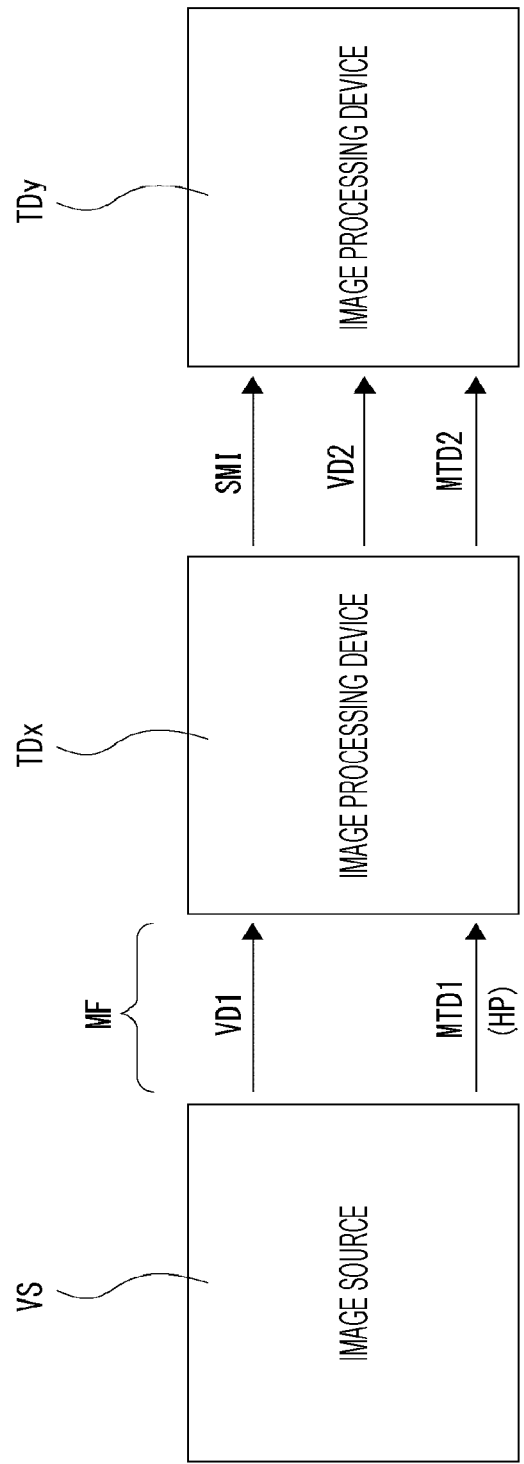
FIG. 2 is an explanatory diagram of information transmitted between devices according to the embodiment.

Hereinafter, embodiments will be described in the following order.

<1. Configuration of Device Applicable as Image Processing Device>
<2. Device Configuration and Processing Function>
<3. Image File and Metadata>
<4. Image Processing of Embodiment>
<5. Shake Modification User Interface>
 [5-1: UI Operation of First Embodiment]
 [5-2: UI Operation of Second Embodiment]
 [5-3: UI Operation of Third Embodiment]
 [5-4: UI Processing of First, Second, and Third Embodiments]
 [5-5: UI Operation of Fourth Embodiment]
 [5-6: UI Operation of Fifth Embodiment]
 [5-7: UI Operation of Sixth Embodiment]
 [5-8: UI Processing of Fourth, Fifth, and Sixth Embodiments]
<6. Conclusion and Modification>

Prior to description of embodiments, some terms used in the description will be described.

"Shake" refers to shake between frames (interframe shake) of an image constituting a moving image. It is assumed that the "shake" widely refers to vibration components generated between frames (fluctuation of an image between frames), such as shake caused by camera shake or the like in an image captured by a so-called imaging device or shake intentionally added by image processing.

"Shake modification (interframe shake modification)" refers to changing a shake state in an image, such as reducing shake occurring in the image or adding shake to the image.

It is assumed that the "shake modification" includes "shake reduction (interframe shake reduction)" and "shake production "interframe shake production)".

The "shake reduction" refers to elimination (whole removal of shake) or reduction (partial removal of shake) of shake occurring in the image due to camera shake or the like. For example, the "shake reduction" refers to performing adjustment to reduce shake on the basis of shake information at the time of imaging. So-called camera shake correction performed in the imaging device is the shake reduction.

The "shake production" may be a case of adding shake to the image or a case of reducing shake, and may be accordingly similar to the "shake reduction" in that sense. In the present embodiment, the "shake production" refers to giving an instruction on a change amount of shake by a user's operation or automatic control to change the shake state of the image according to the instruction. For example, the "shake production" corresponds to decreasing or increasing shake by changing the shake information at the time of imaging according to the user instruction and performing shake modification processing on the basis of the changed shake information, or decreasing or increasing shake by modifying the shake on the basis of information for adding shake generated according to the user instruction or the like.

Even in the case of adjusting the shake in the direction of suppressing the shake, for example, intentionally adjusting the shake can be considered to correspond to the "shake production".

Note that, as an example of the purpose of the shake production, intentionally shaking the image to impress the scene of the moving image is assumed.

The "shake information at the time of imaging" is information regarding shake when an image is captured by the imaging device, and corresponds to detection information of a motion of the imaging device, information that can be calculated from the detection information, posture information indicating a posture of the imaging device, shift or rotation information as a motion of the imaging device, or the like.

In the embodiment, specific examples of the "shake information at the time of imaging" include a quaternion (QD), IMU data, shift/rotation information (SFRO), and the like. Of course, the shake information at the time of imaging is not limited to the above examples.

"Post-adjustment shake information" is shake information generated by adjusting the shake information at the time of imaging, and is information used for the shake modification processing. For example, the "shake information after adjustment" is shake information adjusted according to the user operation or automatic control.

In the embodiment, specific examples of the "post-adjustment shake information" include a post-adjustment quaternion (eQD) and post-adjustment IMU data (eIMU), but are not limited thereto.

The "shake modification information" (given reference sign "SMI" in the description and drawings) is information of the shake modification processing of the image data, and may be any information as long as a processing amount of the shake modification processing can be specified.

In the embodiment, specific examples of the "shake modification information" include a shake modification parameter (PRM) and the post-adjustment quaternion (eQD), but are not limited thereto.

1. CONFIGURATION OF DEVICE APPLICABLE AS IMAGE PROCESSING DEVICE

In the following embodiments, an example in which an image processing device according to the present disclosure is implemented mainly by an information processing device such as a smartphone or a personal computer will be described, but the image processing device can be implemented in various devices. First, a device to which the technique of the present disclosure is applicable will be described.

FIG. 1A illustrates an example of an image source VS and image processing devices (TDx, TDy) that acquire an image file MF from the image source VS.

Note that the image processing device TDx is assumed to be a device that primarily performs the shake modification processing for image data acquired from the image source VS.

Meanwhile, the image processing device TDy is assumed to be a device that secondarily performs the shake modification processing for image data for which the shake modification processing has been already performed by another image processing device.

As the image source VS, an imaging device 1, a server 4, a recording medium 5, and the like are assumed.

As the image processing devices TDx and TDy, a mobile terminal 2 such as a smartphone, a personal computer 3, and the like are assumed. Although not illustrated, various devices such as an image editing dedicated device, a cloud server, a television device, and a video recording/reproducing device are assumed as the image processing devices TDx and TDy. These devices can function as both the image processing devices TDx and TDy.

The imaging device 1 as the image source VS is a digital camera or the like capable of capturing a moving image, and transfers the image file MF obtained by capturing a moving image to the mobile terminal 2, the personal computer 3, or the like via wired communication or wireless communication.

The server 4 may be any of a local server, a network server, a cloud server, or the like, but refers to a device that can provide the image file MF captured by the imaging device 1. It is conceivable that the server 4 transfers the image file MF to the mobile terminal 2, the personal computer 3, or the like via some transmission path.

The recording medium 5 may be any of a solid-state memory such as a memory card, a disk-shaped recording medium such as an optical disk, a tape-shaped recording medium such as a magnetic tape, or the like, but refers to a removable recording medium on which the image file MF captured by the imaging device 1 is recorded. It is conceivable that the image file MF read from the recording medium 5 is read by the mobile terminal 2, the personal computer 3, or the like.

The mobile terminal 2, the personal computer 3, or the like as the image processing devices TDx and TDy can perform image processing for the image file MF acquired from the image source VS described above. The image processing referred to here includes the shake modification processing (shake production and shake reduction).

The shake modification processing is performed by, for example, performing attaching processing to a celestial sphere model for each frame of image data constituting a moving image, and then rotating the celestial sphere model using the posture information corresponding to the frame.

Note that a certain mobile terminal 2 or personal computer 3 may serve as the image source VS for another mobile terminal 2 or personal computer 3 functioning as the image processing devices TDx and TDy.

FIG. 1B illustrates the imaging device 1 and the mobile terminal 2 as one device that can function as both the image source VS and the image processing device TDx.

For example, a microcomputer or the like inside the imaging device 1 performs the shake modification processing.

That is, the imaging device 1 is assumed to be able to output an image as an image processing result of the shake reduction or shake production by performing the shake modification processing for the image file MF generated by the imaging.

Similarly, since the mobile terminal 2 can serve as the image source VS by having an imaging function, the mobile terminal 2 can output an image as an image processing result of the shake reduction or shake production by performing the shake modification processing for the image file MF generated by the imaging.

Of course, the device that can serve as both the image source and the image processing device is not limited to the imaging device 1 or the mobile terminal 2, and various devices are conceivable.

As described above, there are various devices that function as the image processing devices TDx and TDy and various image sources VS of the embodiment. Hereinafter, description will be given assuming that the image source VS such as the imaging device 1, the image processing device TDx such as the mobile terminal 2, and the another image processing device TDy are separate devices.

FIG. 2 illustrates a state of information transmission among the image source VS, the image processing device TDx, and the image processing device TDy.

Image data VD1 and metadata MTD1 are transmitted from the image source VS to the image processing device TDx via wired communication, wireless communication, or a recording medium.

As will be described below, the image data VD1 and the metadata MIDI are, for example, information transmitted as the image file MF.

The metadata MTD1 may include a coordinate translation parameter HP as information of the shake reduction at the time of imaging performed as camera shake correction or the like, for example.

The image processing device TDx can perform various types of processing in response to the image data VD1, the metadata MTD1, and the coordinate translation parameter HP.

For example, the image processing device TDx can perform the shake modification processing for the image data VD1 using the shake information at the time of imaging included in the metadata MTD1.

Furthermore, for example, the image processing device TDx can cancel the shake reduction applied to the image data VD1 at the time of imaging, using the coordinate translation parameter HP included in the metadata MTD1.

In the case of performing the shake modification processing, the image processing device TDx performs processing of associating the image data, the shake information at the time of imaging, and shake modification information SMI with which the processing amount of the shake modification processing can be specified.

The associated image data, shake information at the time of imaging, and shake modification information SMI can be transmitted to the image processing device TDy collectively or separately via wired communication, wireless communication, or a recording medium.

Here, the term "associate" means, for example, making one information usable (linkable) when processing the other information (data, commands, programs, and the like). That is, pieces of information associated with each other may be collected as one file or may be individual pieces of information. For example, information B associated with information A may be transmitted on a different transmission path from the information A. Furthermore, for example, information B associated with information A may be recorded on a different recording medium (or another recording area of the same recording medium) from the information A. Note that this "association" may be performed for a part of information instead of entire information. For example, an image and information corresponding to the image may be associated with each other in an arbitrary unit such as a plurality of frames, one frame, or a part in a frame.

More specifically, for example, actions such as assigning the same ID (identification information) to a plurality of pieces of information, recording a plurality of pieces of information to the same recording medium, storing a plurality of pieces of information in the same folder, storing a plurality of pieces of information in the same file (assigning one to the other as metadata), embedding a plurality of pieces of information in the same stream, for example, embedding metadata in an image like a digital watermark are included in the "associate".

FIG. 2 illustrates image data transmitted from the image processing device TDx to the image processing device TDy as image data VD2. Various examples are conceivable for the image data VD2, such as an image in which the shake reduction by the imaging device 1 has been canceled, an image in which the shake reduction has been applied by the image processing device TDx, and an image before the shake modification processing is performed by the image processing device TDx.

Further, FIG. 2 illustrates metadata MTD2 transmitted from the image processing device TDx to the image processing device TDy. The metadata MTD2 may be information similar to or partially different from the metadata MTD1. Note that the metadata MTD2 includes the shake information at the time of imaging.

Therefore, the image processing device TDy can acquire at least the image data VD2, the shake information at the time of imaging included in the metadata MTD2, and the shake modification information SMI in association with one another.

Note that a data form in which the shake modification information SMI is also included in the metadata MTD2 is also conceivable.

In the present embodiment, image processing that can be executed by the image processing devices TDx and TDy on the assumption of such information transmission will be described.

2. DEVICE CONFIGURATION AND PROCESSING FUNCTION

First, a configuration example of the imaging device 1 serving as the image source VS will be described with reference to FIG. 3.

Note that, in the case of assuming that the image processing is performed by the mobile terminal 2 for the image file MF captured by the mobile terminal 2 as described with reference to FIG. 1B, the mobile terminal 2 only needs to have a configuration equivalent to the following imaging device 1 regarding the imaging function.

Furthermore, the imaging device 1 performs processing of reducing shake of an image due to movement of the imaging device at the time of imaging, which is so-called camera shake correction, and this processing is the "shake reduction" performed by the imaging device. Meanwhile, the "shake production" and "shake reduction" performed by the image processing devices TDx and TDy are separate processing independent of the "shake reduction" performed at the time of imaging by the imaging device 1.

Figure 3:
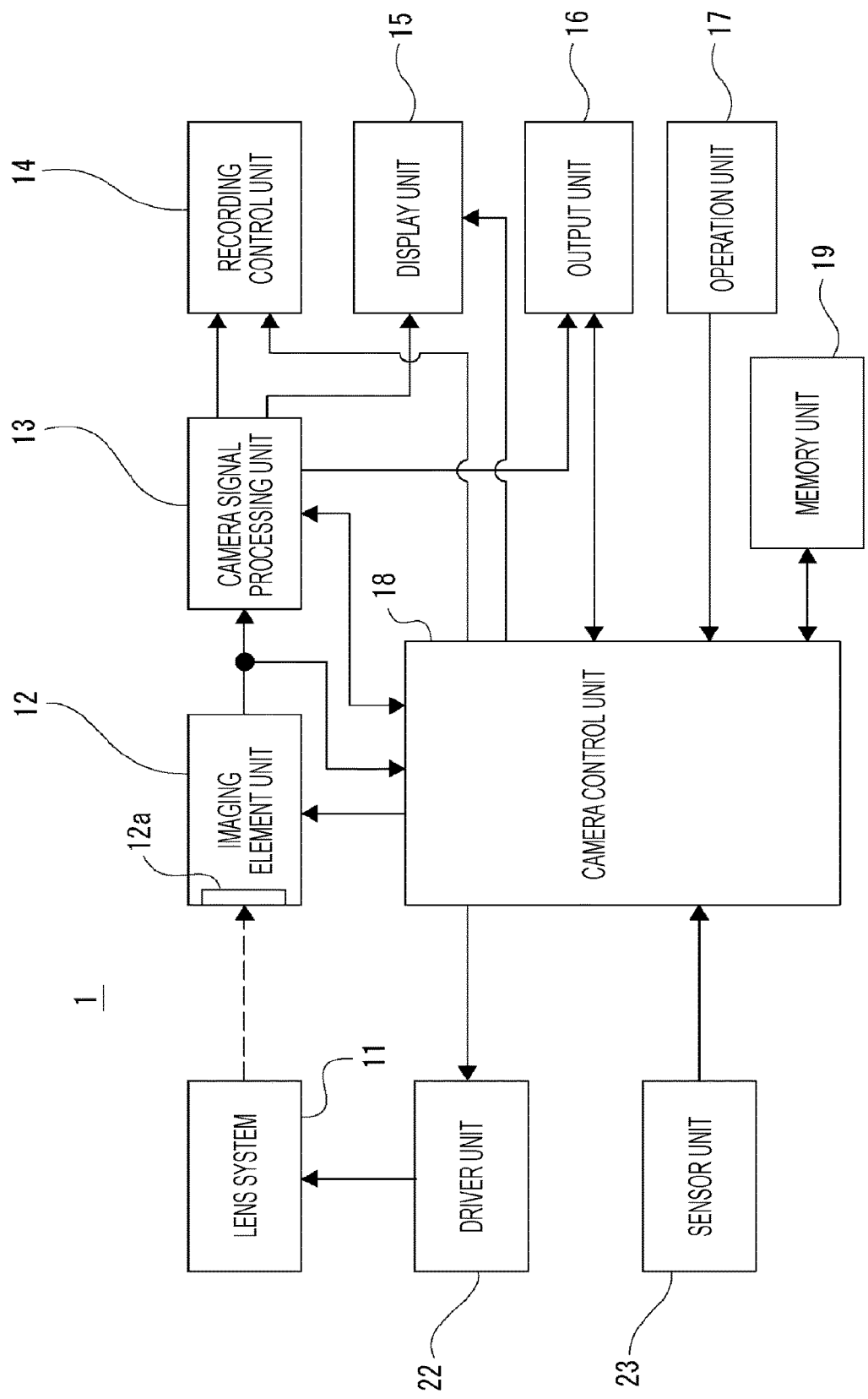
FIG. 3 is a block diagram of an imaging device according to the embodiment.

The imaging device 1 includes, as illustrated in FIG. 3, for example, a lens system 11, an imaging element unit 12, a camera signal processing unit 13, a recording control unit 14, a display unit 15, an output unit 16, an operation unit 17, a camera control unit 18, a memory unit 19, a driver unit 22, and a sensor unit 23.

The lens system 11 includes lenses such as a cover lens, a zoom lens, and a focus lens, an aperture mechanism, and the like. The lens system 11 guides light (incident light) from an object and collects the light in the imaging element unit 12.

Note that, although not illustrated, the lens system 11 may be provided with an optical camera shake correction mechanism (optical image stabilization mechanism) that corrects shake (interframe shake) and blur of an image due to camera shake or the like.

The imaging element unit 12 includes, for example, a complementary metal oxide semiconductor (CMOS)-type or charge coupled device (CCD)-type image sensor (imaging element) 12a.

The imaging element unit 12 executes, for an electrical signal obtained by photoelectrically converting the light received by the image sensor 12a, correlated double sampling (CDS) processing, automatic gain control (AGC) processing, and the like and further performs analog/digital (A/D) conversion processing. Then, the imaging element unit 12 outputs an imaging signal as digital data to the camera signal processing unit 13 and the camera control unit 18 at a subsequent stage.

Note that, as the optical camera shake correction mechanism (not illustrated), there are a case of a mechanism for correcting image shake by moving the image sensor 12a side instead of the lens system 11 side, a case of a spatial optical camera shake correction mechanism (balanced optical image stabilization mechanism) using a gimbal, and the like, and any method may be used.

In the optical camera shake correction mechanism, blur in a frame is also corrected in addition to the shake (interframe shake), as will be described below.

The camera signal processing unit 13 is configured as an image processing processor such as a digital signal processor (DSP). The camera signal processing unit 13 applies various types of signal processing to a digital signal (captured image signal) from the imaging element unit 12. For example, the camera signal processing unit 13 performs, as camera processes, preprocessing, synchronization processing, YC generation processing, resolution conversion processing, codec processing, and the like.

The camera signal processing unit 13 also performs various types of correction processing. Note that the camera shake correction may be performed in the imaging device 1 or may not be performed.

In the preprocessing, the camera signal processing unit 13 performs clamp processing of clamping R, G, and B black levels to a predetermined level, correction processing among R, G, and B color channels, and the like, for the captured image signal from the imaging element unit 12.

In the synchronization processing, the camera signal processing unit 13 applies color separation processing so that image data for each pixel has all of R, G, and B color components. For example, in a case of an image element using a Bayer color filter, demosaic processing is performed as the color separation processing.

In the YC generation processing, the camera signal processing unit 13 generates (separates) a luminance (Y) signal and a color (C) signal from R, G, and B image data.

In the resolution conversion processing, the camera signal processing unit 13 executes the resolution conversion processing for the image data to which various types of signal processing have been applied.

Figure 4:
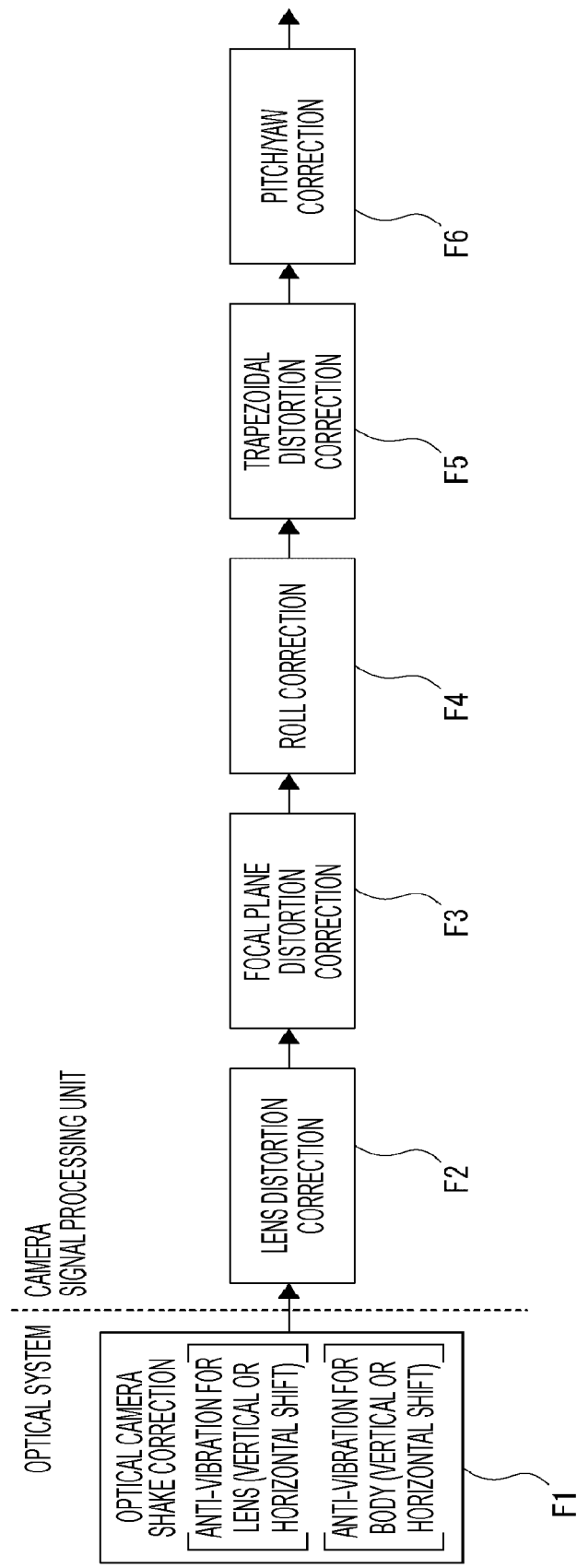
FIG. 4 is an explanatory diagram of image shake reduction processing in the imaging device according to the embodiment.

The various types of correction processing (internal correction of the imaging device 1) performed by the camera signal processing unit 13 are exemplified in FIG. 4. FIG. 4 illustrates the optical camera shake correction performed by the lens system 11 and the correction processing performed by the camera signal processing unit 13 in the execution order.

In the optical camera shake correction as processing F1, in-lens camera shake correction by shift in the yaw direction and the pitch direction of the lens system 11 and in-body camera shake correction by shift in the yaw direction and the pitch direction of the image sensor 12a are performed, so that the image of the object is formed on the image sensor 12a in a state where the influence of the camera shake is physically canceled.

Only one of the in-lens camera shake correction and the in-body camera shake correction may be used, or both of the in-lens camera shake correction and the in-body camera shake correction may be used. In the case of using both the in-lens camera shake correction and the in-body camera shake correction, it is conceivable that the shift in the yaw direction and the pitch direction is not performed in the in-body camera shake correction.

Furthermore, there is a case of not adopting both the in-lens camera shake correction and the in-body camera shake correction, and performing only electronic camera shake correction (electrical image stabilization) or only the optical camera shake correction.

The camera signal processing unit 13 performs processing from processing F2 to processing F7 by spatial coordinate translation for each pixel.

In processing F2, lens distortion correction is performed.

In processing F3, focal plane distortion correction as one element of the electronic camera shake correction is performed. Note that this is to correct distortion in a case where readout by a rolling shutter method is performed by the CMOS image sensor 12a, for example.

In processing F4, roll correction is performed. That is, roll component correction as one element of the electronic camera shake correction is performed.

In processing F5, trapezoidal distortion correction is performed for trapezoidal distortion caused by the electronic camera shake correction. The trapezoidal distortion caused by the electronic camera shake correction is perspective distortion caused by clipping a place away from a center of the image.

In processing F6, shift and clipping in the pitch direction and the yaw direction as one element of the electronic camera shake correction is performed.

For example, the camera shake correction, the lens distortion correction, and the trapezoid distortion correction are performed by the above procedure.

Note that it is not essential to perform all the processing described here, and the order of the processing may be appropriately changed.

The codec processing in the camera signal processing unit 13 in FIG. 3 performs, for example, encoding processing for recording or communication and file generation, for the image data to which various types of processing have been applied. For example, the camera signal processing unit 13 generates image files MF as an MP4 format or the like used for recording moving image and sound conforming to MPEG-4. Furthermore, it is also conceivable to generate, as a still image file, a file in a format such as joint photographic experts group (JPEG), tagged image file format (TIFF), or graphics interchange format (CIF).

Note that the camera signal processing unit 13 also generates metadata to be added to the image file MF by using information and the like from the camera control unit 18.

Although a sound processing system is not illustrated in FIG. 3, a sound recording system and a sound processing system are actually provided, and the image file MF may include sound data together with the image data as the moving image.

The recording control unit 14 performs recording/reproduction with respect to a recording medium such as a nonvolatile memory. For example, the recording control unit 14 performs processing of recording the image files MF and thumbnail images of moving image data and still image data, and the like on the recording medium.

Various actual forms of the recording control unit 14 are conceivable. For example, the recording control unit 14 may be configured as a flash memory and a write/read circuit thereof built in the imaging device 1, or may be configured as a form by a card recording/reproducing unit that performs recording/reproducing access to a recording medium attachable/detachable to/from the imaging device 1, for example, a memory card (portable flash memory or the like). Furthermore, as a form incorporated in the imaging device 1, the recording control unit 14 may be implemented as a hard disk drive (HDD) or the like.

The display unit 15 is a display unit that performs various displays for a capturer, and is a display panel or a viewfinder by a display device such as a liquid crystal display (LCD) or an organic electro-luminescence (EL) arranged in a housing of the imaging device 1.

The display unit 15 causes various displays to be executed on a display screen on the basis of an instruction from the camera control unit 18.

For example, the display unit 15 displays a reproduction image of the image data read from the recording medium by the recording control unit 14.

Furthermore, image data of a captured image converted in resolution for display by the camera signal processing unit 13 is supplied to the display unit 15, and the display unit 15 may perform display on the basis of the image data of the captured image according to the instruction from the camera control unit 18. As a result, a so-called through image (object monitoring image), which is a captured image during composition confirmation, is displayed.

Furthermore, the display unit 15 causes various operation menus, icons, messages, and the like, that is, display as a graphical user interface (GUI) to be executed on the screen on the basis of the instruction from the camera control unit 18.

The output unit 16 performs data communication and network communication with an external device by way of wired or wireless means.

For example, captured image data (a still image file or a moving image file) is transmitted and output to an external display device, a recording device, a reproduction device, or the like.

Furthermore, the output unit 16 may perform communication via various networks such as the Internet, a home network, and a local area network (LAN), and transmit and receive various data to and from servers and terminals on the network, assuming that the output unit 16 is a network communication unit, for example.

The operation unit 17 collectively represents input devices for the user to perform various operation inputs. Specifically, the operation unit 17 represents various operation pieces (keys, dials, touch panels, touch pads, and the like) provided on the housing of the imaging device 1.

A user operation is detected by the operation unit 17, and a signal corresponding to the input operation is sent to the camera control unit 18.

The camera control unit 18 is configured by a microcomputer (arithmetic processing unit) provided with a central processing unit (CPU).

The memory unit 19 stores information and the like used by the camera control unit 18 for processing. The illustrated memory unit 19 comprehensively represents a read only memory (ROM), a random access memory (RAM), a flash memory, and the like.

The memory unit 19 may be a memory area built in a microcomputer chip as the camera control unit 18, or may be configured by a separate memory chip.

The camera control unit 18 executes a program stored in the ROM, the flash memory, or the like of the memory unit 19, thereby controlling the entire imaging device 1.

For example, the camera control unit 18 controls operations of necessary parts for control of a shutter speed of the imaging element unit 12, instructions of various types of signal processing in the camera signal processing unit 13, the imaging operation and recording operation according to user operations, a reproduction operation of a recorded image file, operations of the lens system 11 such as zoom, focus, and aperture adjustment in a lens barrel, a user interface operation, and the like.

The RAM in the memory unit 19 is used for temporary storage of data, programs, and the like, as a work area for various data processing by the CPU of the camera control unit 18.

The ROM and the flash memory (nonvolatile memory) in the memory unit 19 are used to store an operating system (OS) for the CPU to control each unit, content files such as image files, an application program for various operations, firmware, and the like.

The driver unit 22 is provided with, for example, a motor driver for a zoom lens driving motor, a motor driver for a focus lens driving motor, a motor driver for a motor of an aperture mechanism, and the like.

These motor drivers apply a drive current to the corresponding driver according to the instruction from the camera control unit 18 to cause the driver to move the focus lens and the zoom lens, open and close aperture blades of the aperture mechanism, and the like.

The sensor unit 23 comprehensively represents various sensors mounted on the imaging device.

For example, an inertial measurement unit (IMU) is mounted as the sensor unit 23. The IMU can detect angular velocity using a pitch, yaw, and roll triaxial angular velocity (gyro) sensor and can detect acceleration using an acceleration sensor, for example.

Note that the sensor unit 23 only needs to include a sensor capable of detecting the camera shake at the time of imaging, and does not need to include both the gyro sensor and the acceleration sensor.

Furthermore, as the sensor unit 23, a position information sensor, an illuminance sensor, or the like may be mounted.

For example, the image file MF as a moving image captured and generated by the imaging device 1 described above can be transferred to the image processing devices TDx and TDy such as the mobile terminal 2 and undergo the image processing.

Figure 5:
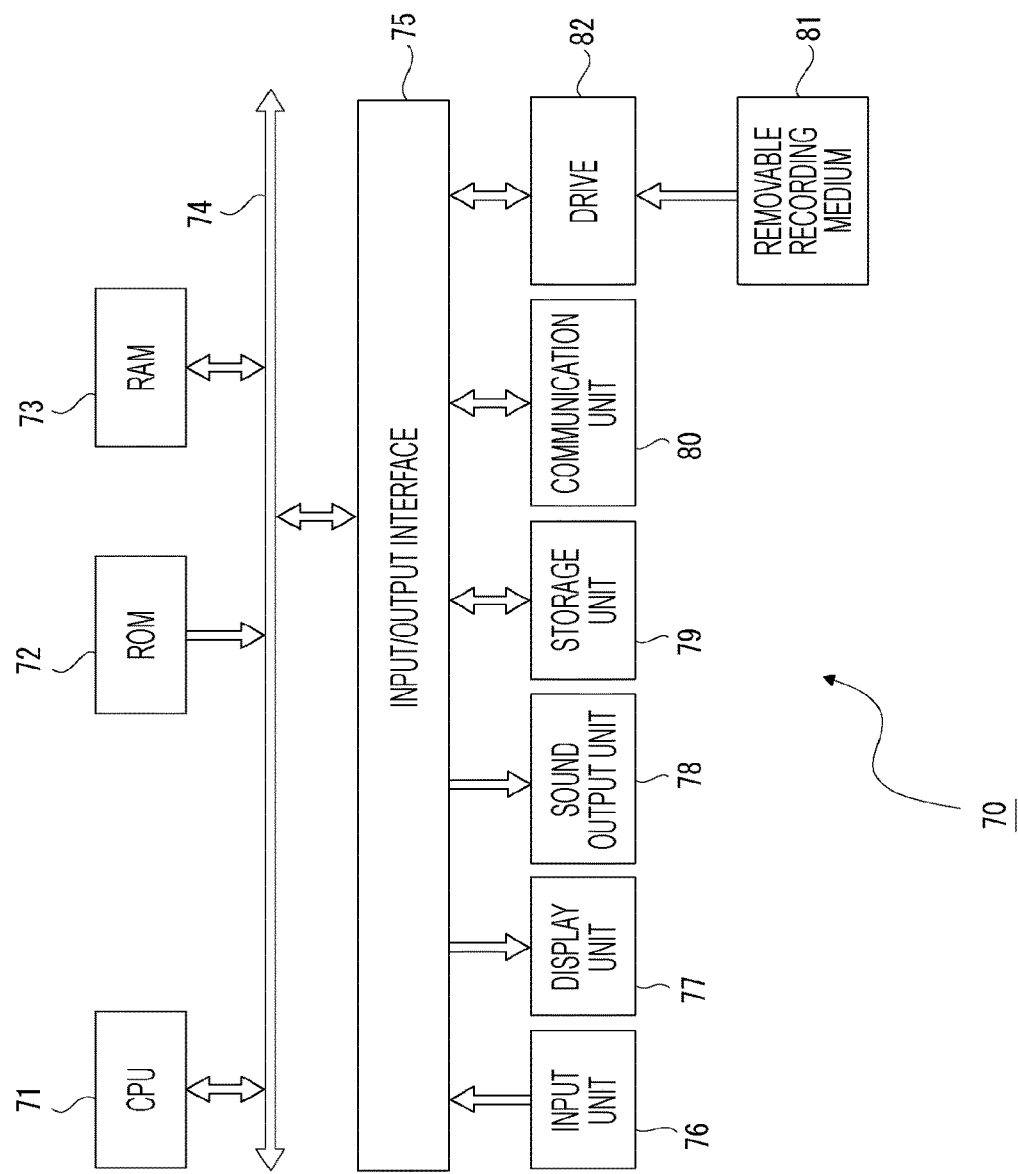
FIG. 5 is a block diagram of an information processing device according to the embodiment.

The mobile terminal 2 and the personal computer 3 serving as the image processing devices TDx and TDy can be implemented as an information processing device having the configuration illustrated in FIG. 5, for example. Note that the server 4 can be similarly implemented by the information processing device having the configuration of FIG. 5.

In FIG. 5, a CPU 71 of an information processing device 70 executes various types of processing according to a program stored in a ROM 72 or a program loaded from a storage unit 79 to a RAM 73. Furthermore, the RAM 73 appropriately stores data and the like necessary for the CPU 71 to execute the various types of processing.

The CPU 71, the ROM 72, and the RAM 73 are mutually connected via a bus 74. An input/output interface 75 is also connected to the bus 74.

An input unit 76 including operation pieces and operation devices is connected to the input/output interface 75.

For example, as the input unit 76, various operation pieces and operation devices such as a keyboard, a mouse, a key, a dial, a touch panel, a touch pad, and a remote controller are assumed.

A user's operation is detected by the input unit 76, and a signal corresponding to the input operation is interpreted by the CPU 71.

Furthermore, a display unit 77 including an LCD or an organic EL panel and the like and a sound output unit 78 including a speaker and the like are connected to the input/output interface 75 integrally or as separate units.

The display unit 77 is a display unit that performs various displays, and includes, for example, a display device provided in the housing of the information processing device 70, a separate display device connected to the information processing device 70, or the like.

The display unit 77 executes displays of an image for various types of image processing, a moving image to be processed, and the like on the display screen on the basis of an instruction from the CPU 71. Furthermore, the display unit 77 performs display of various operation menus, icons, messages, and the like, that is, display as a graphical user interface (GUI), on the basis of the instruction from the CPU 71.

There are some cases where the storage unit 79 configured by a hard disk, a solid-state memory, and the like, a communication unit 80 configured by a modem and the like are connected to the input/output interface 75.

The communication unit 80 performs communication processing via a transmission path such as the Internet, and communication with various devices by wired/wireless communication, bus communication, or the like.

Furthermore, a drive 82 is connected to the input/output interface 75, as necessary, and a removable recording medium 81 such as a magnetic disk, an optical disk, a magneto-optical disk, or a semiconductor memory is appropriately mounted.

Data files such as the image files MF, various computer programs, and the like can be read by the drive 82 from the removable recording medium 81. The read data file is stored in the storage unit 79, and images and sounds included in the data file are output by the display unit 77 and the sound output unit 78. Furthermore, the computer program and the like read from the removable recording medium 81 are installed in the storage unit 79 as necessary.

The information processing device 70 can install software for image processing as an image processing device of the present disclosure via network communication by the communication unit 80 or the removable recording medium 81. Alternatively, the software may be stored in advance in the ROM 72, the storage unit 79, or the like.

Figure 6:
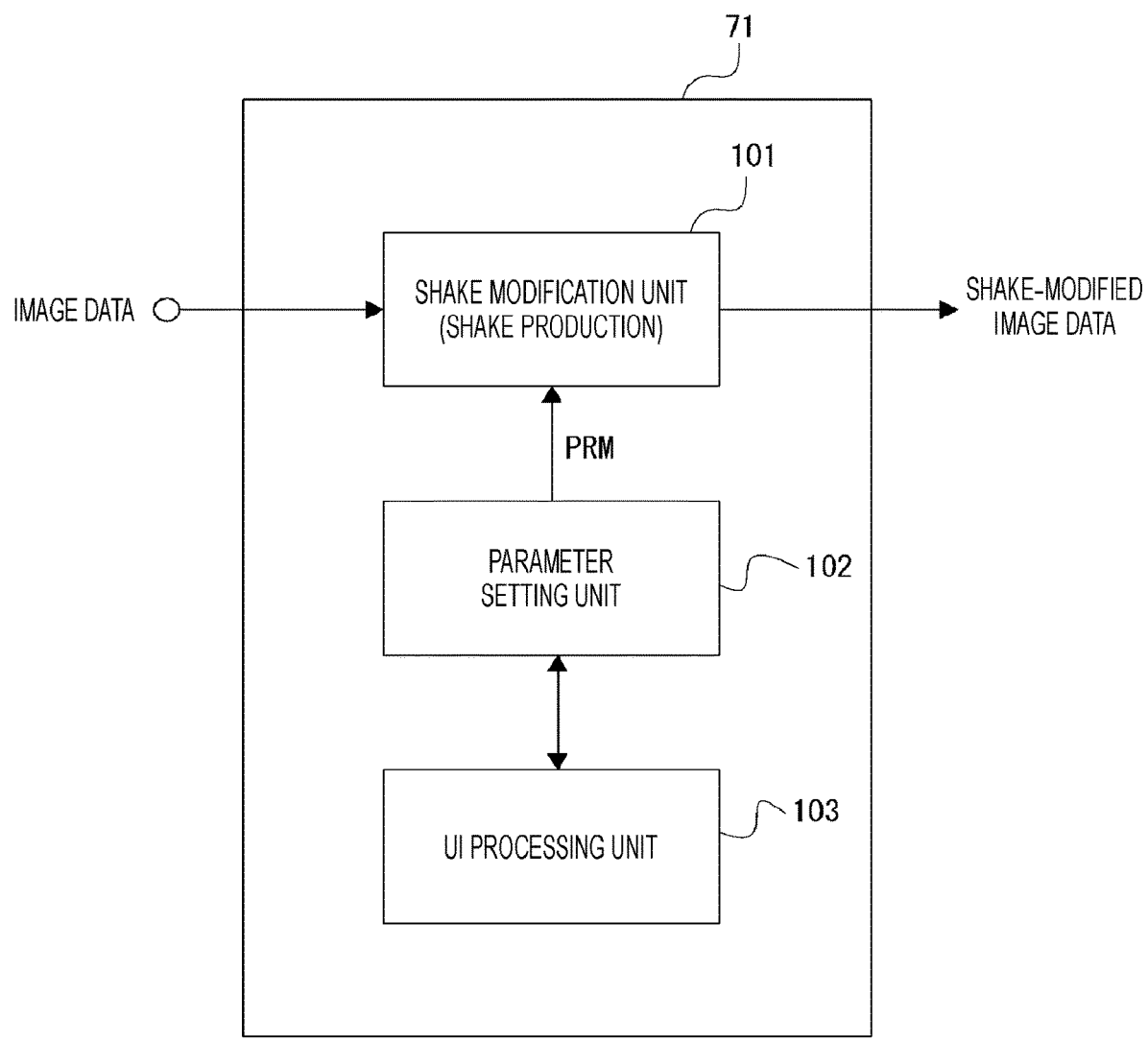
FIG. 6 is an explanatory diagram of a functional configuration as the image processing device according to the embodiment.

For example, the functional configuration as illustrated in FIG. 6 is constructed in the CPU 71 of the information processing device 70 by such software (an application program).

FIG. 6 illustrates functions provided as the information processing device 70 functioning as the image processing devices TDx and TDy. That is, the information processing device 70 (CPU 71) has functions as a shake modification unit 101, a parameter setting unit 102, and a user interface processing unit 103.

Note that the "user interface" is also referred to as "UI", and the user interface processing unit 103 is hereinafter also referred to as "UI processing unit 103".

The shake modification unit 101 is a function to perform the shake modification processing of modifying a shake state of the image data, using parameters input by the user and the post-adjustment shake information.

The shake modification unit 101 performs the processing as the shake reduction or shake production to obtain an output image as shake-reduced or shake-produced image data.

The UI processing unit 103 is a function to present an operation piece related to shake modification to the user and perform processing of acquiring operation information by the operation piece.

For example, the UI processing unit 103 performs processing of causing the display unit 77 to display an image indicating information regarding the operation piece and the image as a UI image. Furthermore, the UI processing unit 103 detects the user's operation by the input unit 76. For example, a touch operation or the like for the UI image is detected.

The parameter setting unit 102 is a function to set the parameter (shake modification parameter PRM) for the shake modification processing on the basis of the operation information acquired by the UI processing unit 103. That is, the user operation content detected by the UI processing unit 103 is converted into the shake modification parameter PRM, and the shake modification parameter PRM is supplied to the shake modification unit 101, so that the shake modification processing according to the user's operation is performed for the image data.

Here, input and output modes of the image processing devices TDx and TDy having such functions can be variously considered as in the following examples of patterns 1 to 5.

Figure 7:
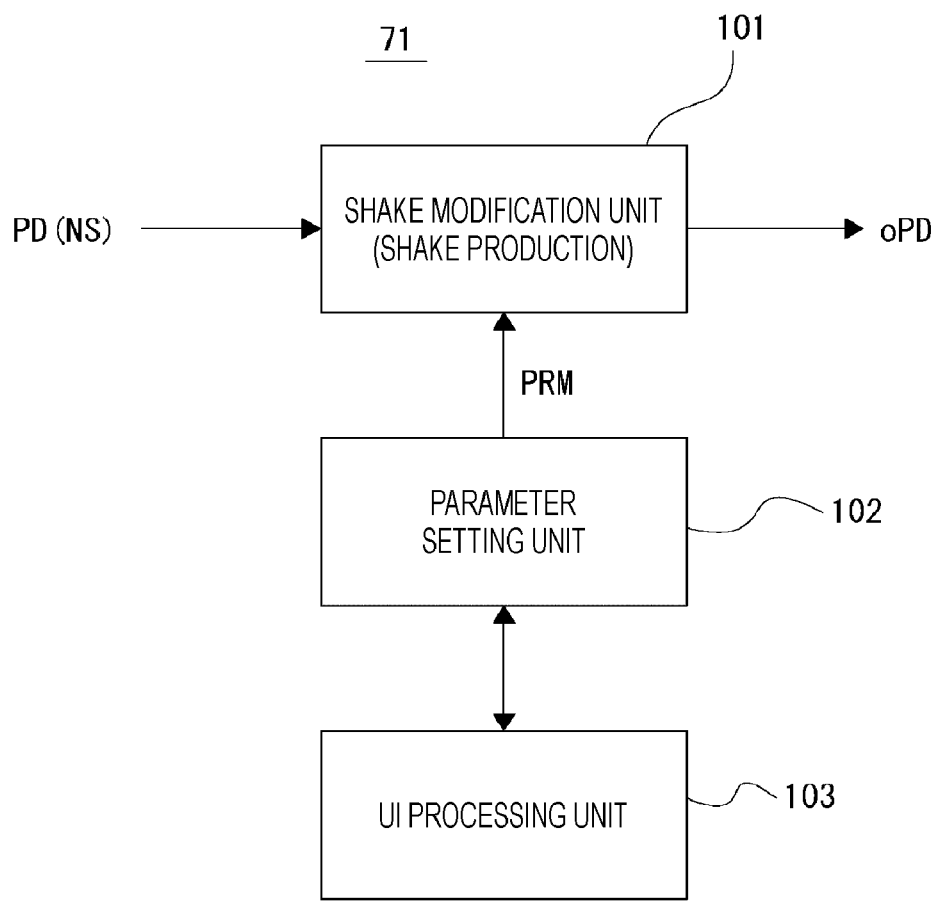
FIG. 7 is an explanatory diagram of an input/output mode as the image processing device according to the embodiment.

Pattern 1 is, as illustrated in FIG. 7, a mode in which image data PD (NS) in which no shake such as camera shake has originally occurred is input to the shake modification unit 101. As the image data PD (NS), for example, image data captured by a fixed monitoring camera or the like, image data captured using a tripod or the like, or the like is conceivable.

In this case, it is assumed that the shake modification unit 101 performs the shake production of adding shake to the image on the basis of the shake modification parameter PRM set according to an operation of the UI processing unit 103, and obtains output image data oPD to which the shake has been added.

Figure 8:
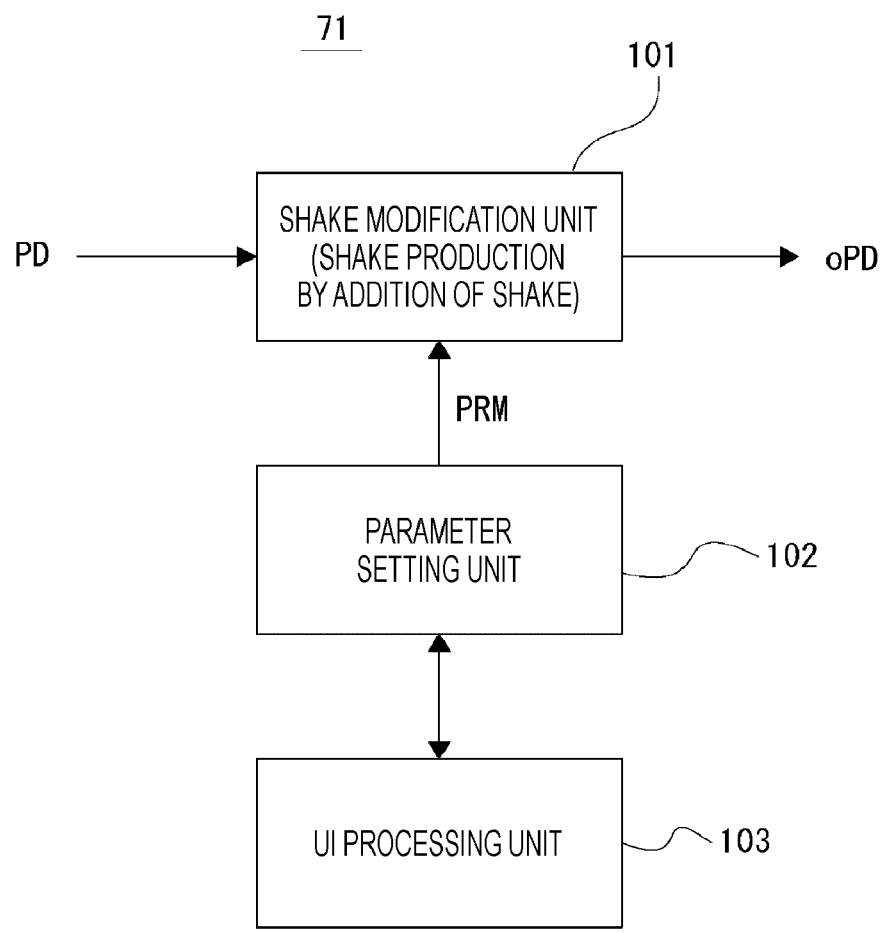
FIG. 8 is an explanatory diagram of an input/output mode as the image processing device according to the embodiment.

Pattern 2 is, as illustrated in FIG. 8, a mode in which image data PD in which shake such as camera shake has been corrected is input to the shake modification unit 101. For example, the image data PD captured by the imaging device 1 having a camera shake correction function is input.

In this case, it is assumed that the shake modification unit 101 performs the shake production of adding shake to the image on the basis of the shake modification parameter PRM set according to an operation of the UI processing unit 103, and obtains output image data oPD to which the shake has been added.

Figure 9:
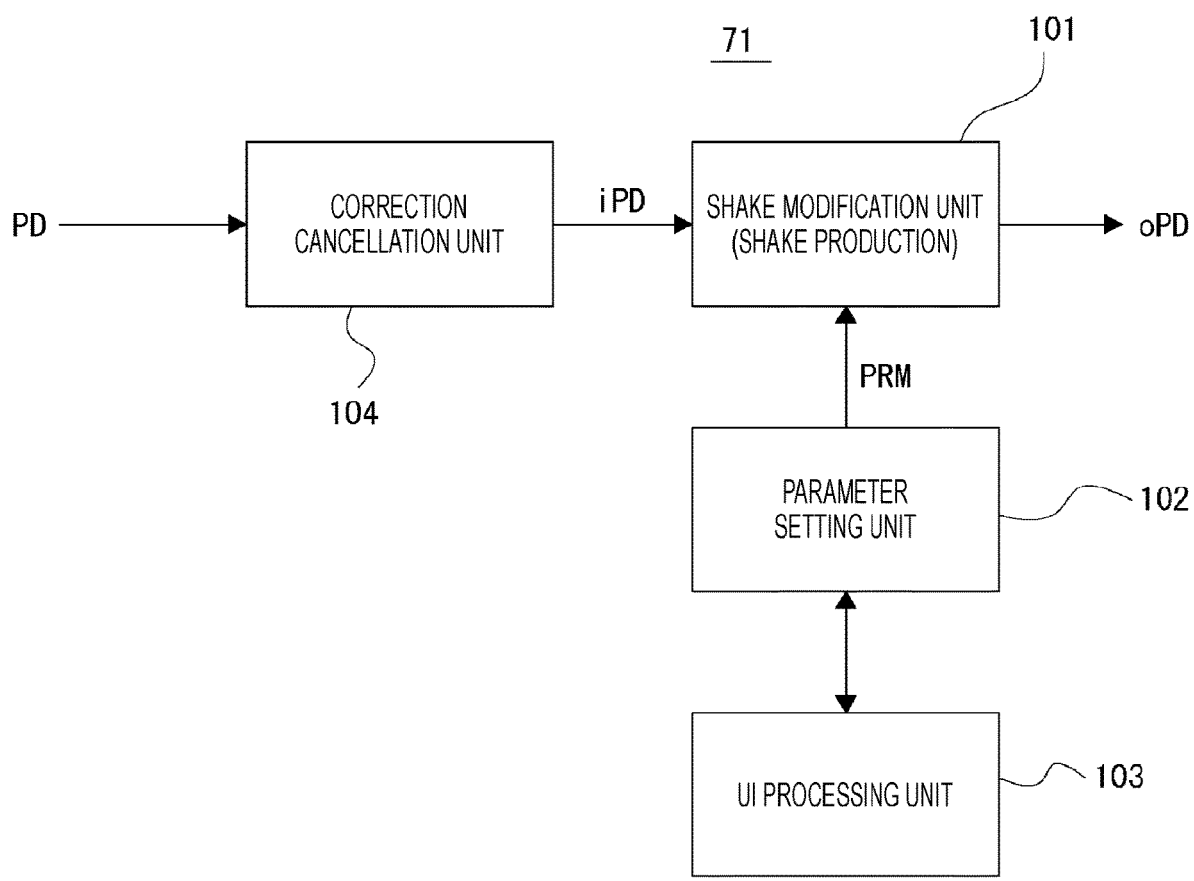
FIG. 9 is an explanatory diagram of an input/output mode as the image processing device according to the embodiment.

Pattern 3 is, as illustrated in FIG. 9, a mode in which image data PD in which shake such as camera shake has been corrected is input to the shake modification unit 101. Similarly to pattern 2, for example, it is assumed that the image data PD captured by the imaging device 1 having a camera shake correction function is input.

The information processing device 70 (CPU 71) serving as the image processing devices TDx and TDy is further provided with a function as a correction cancellation unit 104.

The correction cancellation unit 104 performs processing of canceling the camera shake correction already applied to the image data PD. The image data PD is image data iPD in a state in which the correction for removing shake is canceled and the original shake (before the correction) is occurring.

It is assumed that the shake modification unit 101 performs the shake modification processing of adjusting the shake of the image for the image data iPD on the basis of the shake modification parameter PRM set according to the operation of the UI processing unit 103 to obtain the output image data oPD in which the state of the shake state has been modified.

As the shake modification in this case, the shake reduction and shake production are assumed.

As the shake reduction in the shake modification unit 101, it is conceivable to perform the shake correction again with more advanced processing after canceling the shake correction originally performed on the imaging device 1 side. That is, the shake reduction is processing of performing the shake reduction with higher performance than the camera shake correction in the imaging device 1 to obtain an image in a state where shake is further eliminated.

As the shake production in the shake modification unit 101, it is assumed to change or adjust the shake state into a different state according to user's intention for the image with shake for which the shake correction originally performed on the imaging device 1 side has been canceled. The adjustment referred to here may be, for example, processing of performing partial removal to slightly moderate the original shake or the shake production of making the original shake more exaggerated.

Figure 10:
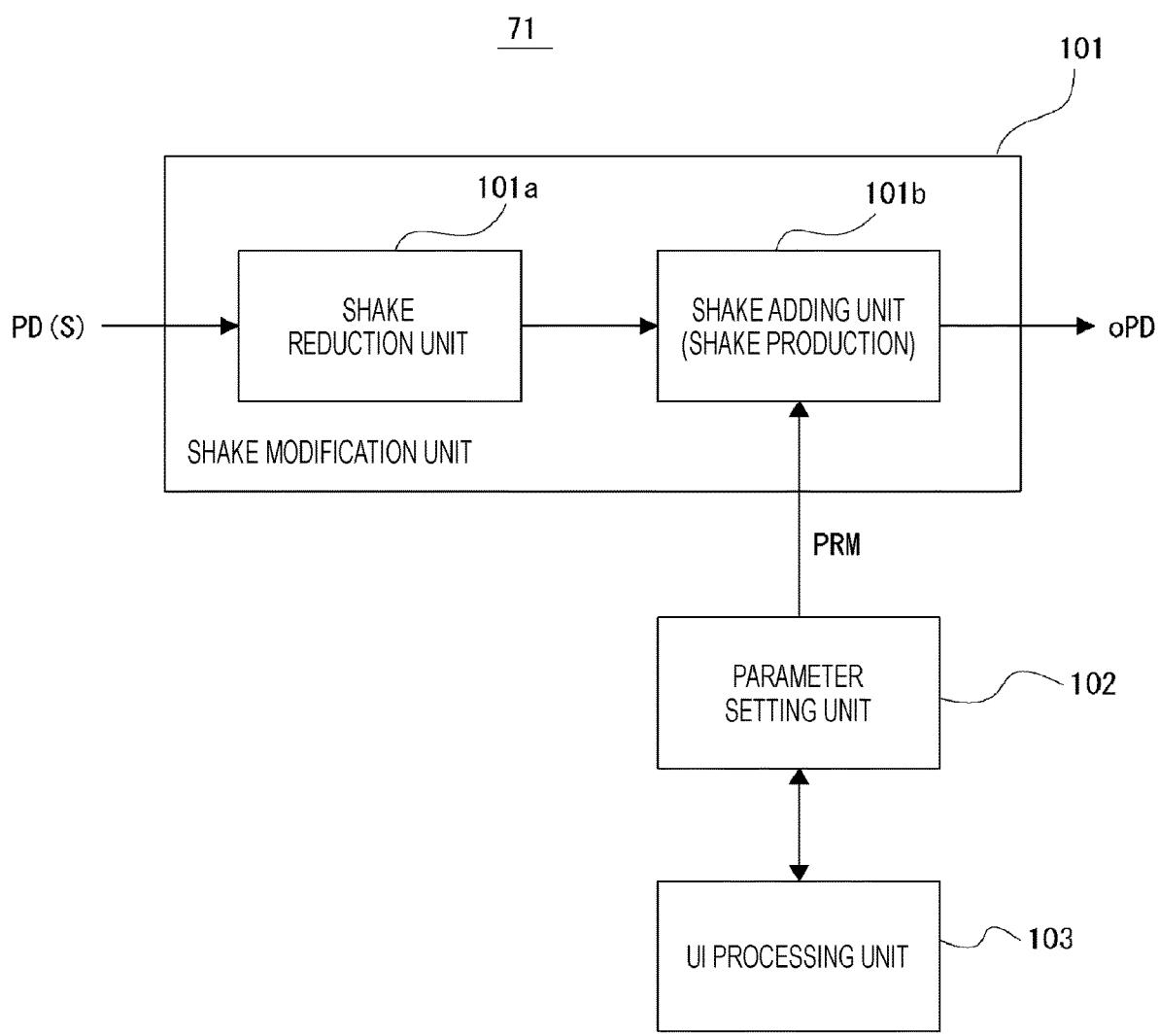
FIG. 10 is an explanatory diagram of an input/output mode as the image processing device according to the embodiment.

Pattern 4 is, as illustrated in FIG. 10, a mode in which image data PD (S) in which shake such as camera shake remains is input to the shake modification unit 101. For example, the image data PD (S) captured by the imaging device 1 not having the camera shake correction function or the image data PD (S) captured with the camera shake correction function turned off is input.

The shake modification unit 101 performs processing of functions as a shake reduction unit 101*a* and a shake adding unit 101*b* for such image data iPD.

Both the shake reduction unit 101*a* and the shake adding unit 101*b* are functions to perform the shake modification processing, and in particular, the shake reduction unit 101*a* is a function to perform processing of removing shake occurring in the input image data PD (S).

For example, the shake reduction unit 101*a* performs processing of removing shake using the shake information at the time of imaging acquired from the imaging device 1 side. Furthermore, assuming the image processing device TDy, the shake reduction unit 101*a* performs processing of removing shake added at that time by using the shake modification information from the image processing device TDx that has added shake.

The shake adding unit 101*b* has a function to add shake according to the user operation.

In the shake modification unit 101, first, the shake reduction unit 101*a* performs processing of removing the shake generated at the time of imaging or at the time of previous image processing for the input image data PD (S). Then, in the state where the shake has been removed, the shake adding unit 101*b* performs the shake production of adding shake to the image on the basis of the shake modification parameter PRM set according to the operation of the UI processing unit 103. Therefore, it is assumed that the output image data oPD to which shake different from that of the input image data PD (S) has been added is obtained.

Figure 11:
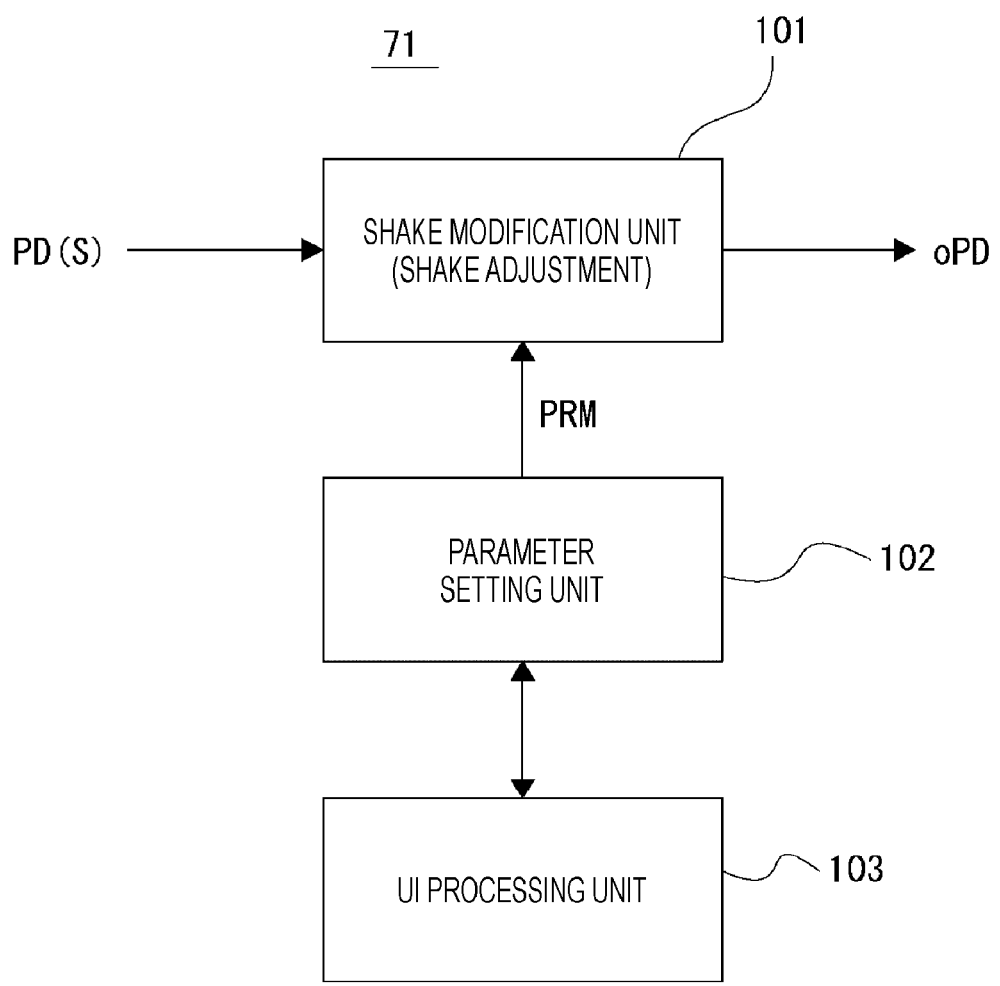
FIG. 11 is an explanatory diagram of an input/output mode as the image processing device according to the embodiment.

Pattern 5 is, as illustrated in FIG. 11, a mode in which image data PD (S) in which shake such as camera shake remains is input to the shake modification unit 101. Similarly to pattern 4, for example, the image data PD (S) captured by the imaging device 1 not having the camera shake correction function or the image data PD (S) captured with the camera shake correction function turned off is input.

It is assumed that the shake modification unit 101 performs the shake modification processing of adjusting the shake of the image for the image data iPD on the basis of the shake modification parameter PRM set according to the operation of the UI processing unit 103 to obtain the output image data oPD in which the shake has been adjusted.

The adjustment referred to here may be, for example, processing of performing partial removal to slightly moderate the original shake or the shake production of making the original shake more exaggerated.

3. IMAGE FILE AND METADATA

The content of the image file MF and the content of the metadata transmitted from the image source VS such as the imaging device 1 to the image processing device TDx will be described.

FIG. 12A illustrates data included in the image file MF. As illustrated, the image file MF includes various data as "header", "sound", "movie", and "metadata".

In the "header", information indicating the presence or absence of metadata and the like are described together with information such as a file name and a file size.

The "sound" is sound data recorded together with a moving image. For example, two-channel stereo sound data is stored.

The "movie" is moving image data, and includes image data as frames (#1, #2, #3, . . . ) constituting the moving image.

Additional information associated with the frames (#1, #2, #3, . . . ) constituting the moving image is described as the "metadata".

A content example of the metadata is illustrated in FIG. 12B. For example, IMU data, a coordinate translation parameter HP, timing information TM, and a camera parameter CP are described for one frame. Note that these are part of the metadata content, and here, only information related to the image processing to be described below is illustrated.

As the IMU data, gyro (angular velocity data), accelerator (acceleration data), and a sampling rate are described.

The IMU mounted on the imaging device 1 as the sensor unit 23 outputs the angular velocity data and the acceleration data at the predetermined sampling rate. In general, this sampling rate is higher than a frame rate of the captured image, and thus many IMU data samples are obtained in one frame period.

Therefore, as the angular velocity data, n samples are associated with one frame, such as a gyro sample #1, a gyro sample #2, . . . , and a gyro sample #n illustrated in FIG. 12C.

Furthermore, as the acceleration data, m samples are associated with one frame, such as an accelerator sample #1, an accelerator sample #2, . . . , and an accelerator sample #m.

$$n=m \text{ or } n \neq m.$$

Note that, although an example in which the metadata is associated with each frame has been described here, for example, the IMU data may not be completely synchronized with a frame. In such a case, for example, time information associated with time information of each frame is held as an IMU sample timing offset in the timing information TM.

The coordinate translation parameter HP is a generic term for parameters used for correction involving coordinate translation of each pixel in the image. Non-linear coordinate translation such as lens distortion is also included.

Then, the coordinate translation parameter HP is a term that can include at least a lens distortion correction parameter, a trapezoid distortion correction parameter, a focal plane distortion correction parameter, an electronic camera shake correction parameter, and an optical camera shake correction parameter.

The lens distortion correction parameter is information for directly or indirectly grasping how distortion such as barrel aberration and pincushion aberration has been corrected and returning the image to the image before lens distortion correction. The metadata regarding the lens distortion correction parameter as one of the metadata will be briefly described.

FIG. 13A illustrates an image height Y, an angle α, an entrance pupil position d1, and an exit pupil position d2 in a schematic diagram of the lens system 11 and the image sensor 12a.

The lens distortion correction parameter is used to know an incident angle for each pixel of the image sensor 12a in the image processing. Therefore, it is sufficient that the relationship between the image height Y and the angle α is known.

FIG. 13B illustrates an image 110 before lens distortion correction and an image 111 after lens distortion correction. A maximum image height H0 is a maximum image height before distortion correction, and is a distance from a center of an optical axis to a farthest point. A maximum image height H1 is a maximum image height after distortion correction.

What is necessary as metadata to know the relationship between the image height Y and the angle α is the maximum image height H0 before distortion correction and data d0, d1, . . . , d(N−1) of the incident angle with respect to each of the N image heights. "N" is assumed to be about 10 as an example.

Returning to FIG. 12B, the trapezoid distortion correction parameter is a correction amount when correcting trapezoid distortion caused by shifting a clipped region from the center by the electronic camera shake correction, and also is a value corresponding to the correction amount of the electronic camera shake correction.

The focal plane distortion correction parameter is a value indicating a correction amount for each line with respect to the focal plane distortion.

Regarding the electronic camera shake correction and the optical camera shake correction, the parameters indicate correction amounts in the respective axial directions of yaw, pitch, and roll.

Note that the parameters of the lens distortion correction, the trapezoid distortion correction, the focal plane distortion correction, and the electronic camera shake correction are collectively referred to as coordinate translation parameters, and this is because these types of correction processing are correction processing for an image formed on each pixel of the image sensor 12a of the imaging element unit 12, and the coordinate translation parameters are parameters for the correction processing involving coordinate translation of each pixel. The optical camera shake correction is also one of the coordinate translation parameters, and this is because shake correction for an inter-frame component is processing involving coordinate translation of each pixel in the optical camera shake correction.

That is, by performing reverse correction using these parameters, the image data to which the lens distortion correction, the trapezoid distortion correction, the focal plane distortion correction, the electronic camera shake correction, or the optical camera shake correction have been applied can be returned to the state before each correction processing, that is, the state when the image is formed on the image sensor 12a of the imaging element unit 12.

Furthermore, the parameters of the lens distortion correction, the trapezoid distortion correction, and the focal plane distortion correction are collectively called optical distortion correction parameters because these types of correction processing are distortion correction processing for the case where an optical image itself from an object is an image captured in an optically distorted state, and are intended for optical distortion correction.

That is, by performing reverse correction using these parameters, the image data to which the lens distortion correction, the trapezoid distortion correction, and the focal plane distortion correction have been applied can be returned to the state before optical distortion correction.

The timing information TM in the metadata includes information of an exposure time (shutter speed), exposure start timing, a readout time (curtain speed), the number of exposure frames (long-second exposure information), an IMU sample offset, and a frame rate.

In the image processing of the present embodiment, these are mainly used to associate a line of each frame with the IMU data.

Note that, even in a case where the image sensor 12a is a CCD or a global shutter type CMOS, in a case where the exposure centroid is shifted by using an electronic shutter or a mechanical shutter, it is possible to perform correction in accordance with the exposure centroid, using the exposure start timing and the curtain speed.

As the camera parameter CP in the metadata, an angle of view (focal length), a zoom position, and lens distortion information are described.

4. IMAGE PROCESSING OF EMBODIMENT

A processing example of the information processing device 70 serving as the image processing devices TDx and TDy as an embodiment will be described.

Figure 14:
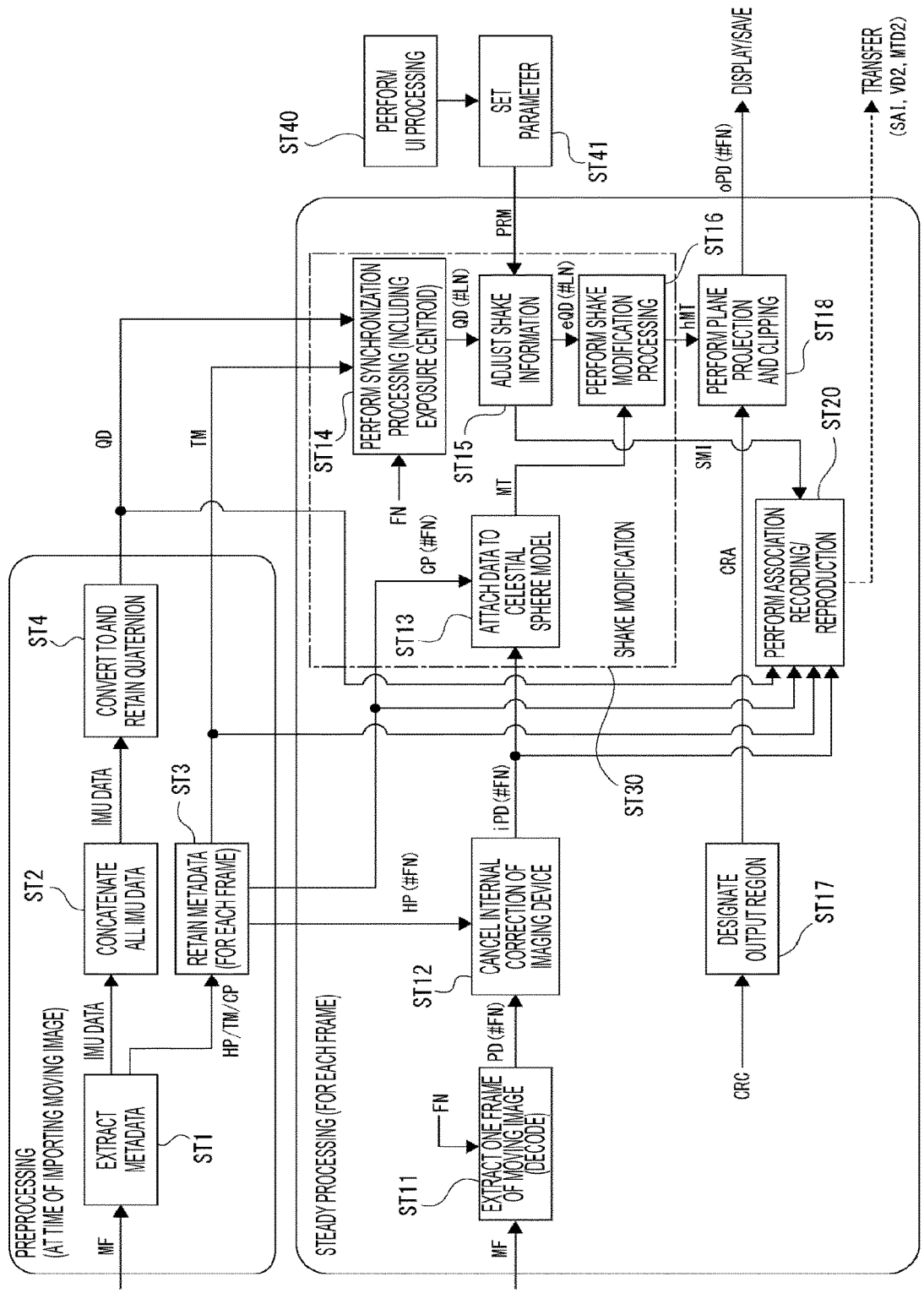
FIG. 14 is an explanatory diagram of image processing according to the embodiment.

FIG. 14 illustrates a procedure of various types of processing executed in the information processing device 70 as the image processing device TDx, and illustrates a relationship among information used in the various types of processing.

Note that processing in steps ST13, ST14, ST15, and ST16 surrounded as step ST30 in FIG. 14 is performed by the function of the shake modification unit 101 in FIG. 6.

Parameter setting processing in step ST41 is performed by the function of the parameter setting unit 102.

UI processing in step ST40 is performed by the function of the UI processing unit 103.

Furthermore, the example of FIG. 14 assumes pattern 3 of FIG. 9, and the image data PD in which shake such as camera shake has been corrected is input to shake modification processing ST30 after the correction is canceled.

The processing in step ST12 is processing of the function of the correction cancellation unit 104 in FIG. 9. Note that, when considering a state in which the processing in step ST12 is turned off in FIG. 14, the above-described processing of the other patterns (patterns 1, 2, 4, and 5) can be assumed.

In FIG. 14, step ST30 surrounded by the broken line is referred to as "shake modification", and step ST16 is referred to as "shake modification processing". Step ST16 is processing of actually modifying the shake state and is "shake modification" in a narrow sense.

Meanwhile, step ST30 is "shake modification" in a broad sense including the shake modification processing in step ST16 and celestial sphere model processing and coefficient processing as preparation for the processing, and the like.

As the processing of FIG. 14, first, steps ST1, ST2, ST3, and ST4 as preprocessing will be described.

The preprocessing is processing performed when the image file MF is imported.

The term "import" as used here refers to setting the image file MF or the like accessible as the information processing device 70 has fetched the file into the storage unit 79 or the like, as a target for image processing, and refers to performing preprocessing to develop the file so as to enable image processing. For example, the "import" does not refer to transfer a file from the imaging device 1 to the mobile terminal 2 or the like.

The CPU 71 imports the image file MF designated by the user operation or the like to be set as the image processing target, and performs processing related to the metadata added to the image file MF as preprocessing. For example, processing of extracting and storing the metadata corresponding to each frame of a moving image is performed.

Specifically, in this preprocessing, metadata extraction (step ST1), all-IMU data concatenation (step ST2), metadata retention (step ST3), and conversion into and retention of quaternion (posture information of the imaging device 1) (step ST4) are performed.

Figure 12:
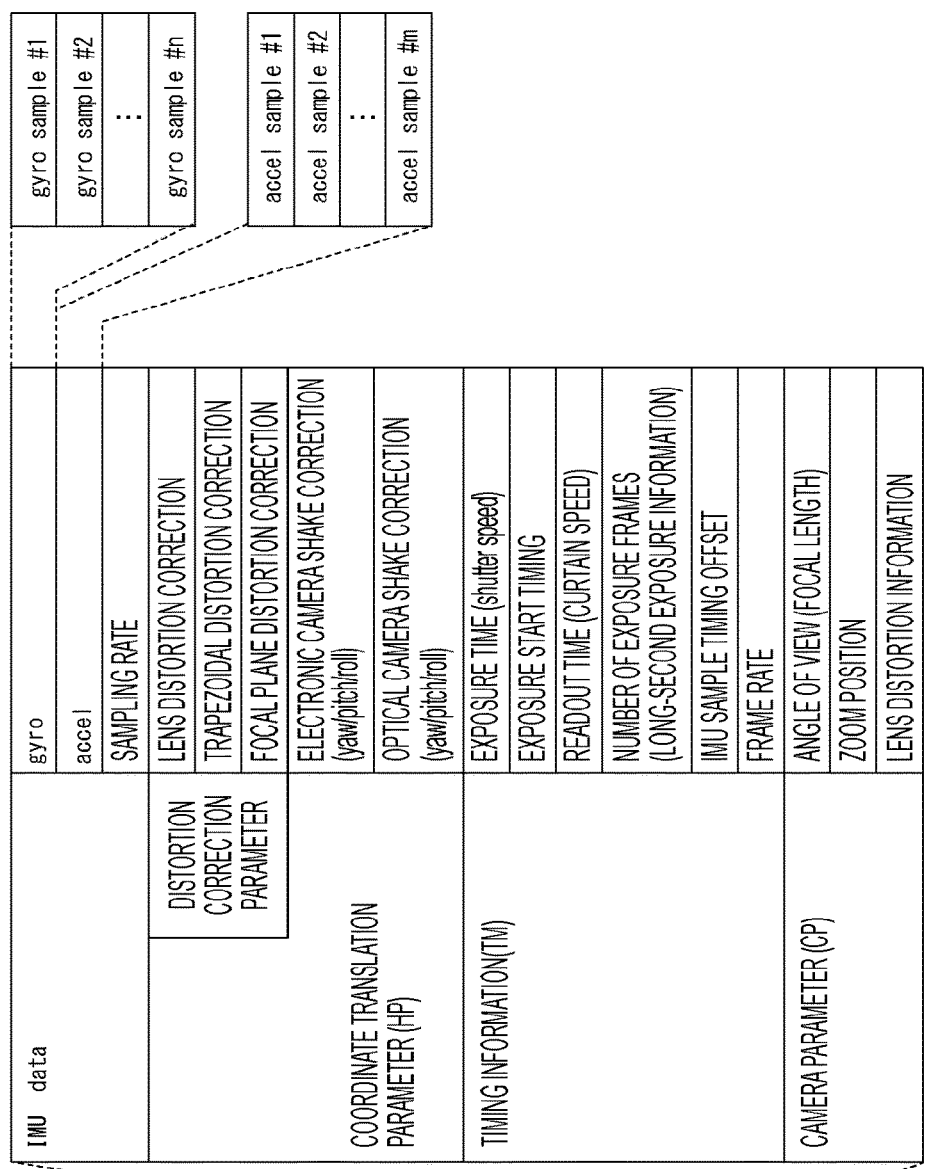
FIG. 12 is an explanatory diagram of content of an image file and metadata according to the embodiment.

As the metadata extraction in step ST1, the CPU 71 reads the target image file MF and extracts the metadata included in the image file MF as described with reference to FIG. 12.

Note that some or all of steps ST1, ST2, ST3, and ST4 may be performed on the image source VS side such as the imaging device 1. In this case, in the preprocessing, the content after the processing to be described below is acquired as the metadata.

The CPU 71 performs concatenation processing for the IMU data (angular velocity data (gyro sample) and acceleration data (accelerator sample)) among the extracted metadata in step ST2.

This is processing of arranging and concatenating all pieces of the IMU data associated with all the frames in chronological order to construct the IMU data corresponding to the entire sequence of the moving image.

Then, the CPU 71 performs integration processing for the concatenated IMU data to calculate the quaternion QD representing the posture of the imaging device 1 at each time point on the sequence of the moving image, and the quaternion QD is stored and retained. The calculation of the quaternion QD is an example.

Note that the quaternion QD can be calculated only from the angular velocity data.

The CPU 71 performs processing of retaining the metadata other than the IMU data among the extracted metadata, that is, the coordinate translation parameter HP, the timing information TM, and the camera parameter CP in step ST3. That is, the CPU 71 stores the coordinate translation parameter HP, the timing information TM, and the camera parameter CP in a state corresponding to each frame.

By performing the above preprocessing, the CPU 71 is prepared to perform the various types of image processing including the shake modification for the image data received as the image file MF.

Steady processing in FIG. 14 indicates image processing performed for the image data of the image file MF to which the above preprocessing has been applied.

The CPU 71 performs processing of extracting one frame of the moving image (step ST11), canceling internal correction of the imaging device (step ST12), attaching data to a celestial sphere model (step ST13), synchronization processing (step ST14), shake information adjustment (step ST15), shake modification (step ST16), output region designation (step ST17), plane projection and clipping (step ST18), and association recording/reproduction (step ST20).

The CPU 71 performs each processing in steps ST11 to ST20 for each frame at the time of image reproduction of the image file MF.

In step ST11, the CPU 71 decodes one frame of the moving image (image file MF) along a frame number FN. Then, image data PD (#FN) of one frame is output. Note that "(#FN)" indicates the frame number and indicates information corresponding to the frame.

Note that, in a case where the moving image has not been encoded such as compression, the decoding processing in step ST11 is unnecessary.

In step ST12, the CPU 71 performs processing of canceling the internal correction performed by the imaging device 1 for the image data PD (#FN) of one frame.

For this purpose, the CPU 71 refers to the coordinate translation parameter HP (#FN) stored corresponding to the frame number (#FN) at the time of preprocessing, and performs reverse processing to the correction performed by the imaging device 1. As a result, image data iPD (#FN) in a state where the lens distortion correction, the trapezoid distortion correction, the focal plane distortion correction, the electronic camera shake correction, and the optical camera shake correction in the imaging device 1 have been canceled is obtained.

In step ST13, the CPU 71 attaches the image data iPD (#FN) of one frame in the state where various corrections have been canceled to the celestial sphere model. At this time, the camera parameter CP (#FN) stored corresponding to the frame number (#FN), that is, the angle of view, the zoom position, and the lens distortion information are referred to.

FIG. 15 illustrates an outline of attachment to the celestial sphere model.

FIG. 15A illustrates the image data iPD. The image height h is the distance from the image center. Each circle in the drawing indicates positions where the image heights h are equal.

The "relationship between an image sensor plane and an incident angle $\varphi$" in the frame is calculated from the angle of view, the zoom position, and the lens distortion information of the frame of the image data iPD, and is set as "data 0", . . . , "dataN−1" at each position of the image sensor plane. Then, the relationship between the image height h and the incident angle $\varphi$ is expressed as a one-dimensional graph as illustrated in FIG. 15B from "data 0", . . . , and "data N−1". The incident angle $\varphi$ is an angle of a light beam (an angle viewed from the optical axis).

The one-dimensional graph is rotated once around the center of the captured image, and the relationship between each pixel and the incident angle is obtained.

Accordingly, each pixel of the image data iPD, such as a pixel G1 to a pixel G2 on the celestial sphere coordinates in FIG. 15C, is mapped onto a celestial sphere model MT.

By the above process, an image (data) of the celestial sphere model MT in which the captured image is attached to the ideal celestial sphere surface in the state where the lens distortion has been removed is obtained. In the celestial sphere model MT, parameters and distortions unique to the imaging device 1 that originally captured the image data iPD have been removed, and a range visible by an ideal pinhole camera is attached to the celestial sphere surface.

Therefore, by rotating the image of the celestial sphere model MT in a predetermined direction in this state, the shake modification processing as the shake reduction or shake production can be implemented.

Here, the posture information (quaternion QD) of the imaging device 1 is used for the shake modification processing. For this purpose, the CPU 71 performs the synchronization processing in step ST14.

In the synchronization processing, processing of specifying and acquiring a quaternion QD (#LN) suitable for each line is performed corresponding to the frame number FN.

Note that "(#LN)" indicates a line number in the frame and indicates information corresponding to the line.

Note that the reason why the quaternion QD (#LN) for each line is used is that, in the case where the image sensor 12a is a CMOS image sensor and performs imaging by the rolling shutter method, the amount of shake varies for each line.

For example, in the case where the image sensor 12a is a CCD image sensor and performs imaging by the global shutter method, the quaternion QD (#FN) in units of frames may be used.

Note that, even in the case of a global shutter of a CCD or a CMOS as the image sensor 12a, the centroid is shifted when an electronic shutter (the same similarly applies to a mechanical shutter) is used. Therefore, it is favorable to use a quaternion at the timing of the center of the exposure period of the frame (shifted according to the shutter speed of the electronic shutter).

Here, the blur appearing in an image is considered.

The blur is blur of an image due to relative movement between the imaging device and the object in the same frame. That is, the blur is image blur due to shake within the exposure time. The longer the exposure time, the stronger the influence of blur as the blur.

The electronic camera shake correction can reduce or eliminate the "shake" occurring between frames in the case of using a method of controlling an image range to clip for each frame, but such electronic camera shake correction cannot reduce relative shake in the exposure time.

In addition, when the clipped region is changed by the camera shake correction, the posture information of each frame is used. However, if the posture information deviates from the center of the exposure period such as timing of the start or end of the exposure period, the direction of shake within the exposure time based on the posture is biased, and the blur is easily noticeable. Moreover, in the rolling shutter of the CMOS, the exposure period is different for each line.

Therefore, in the synchronization processing in step ST14, the quaternion QD is acquired with reference to the timing of the exposure centroid for each line, for each frame of the image data.

Figure 16:
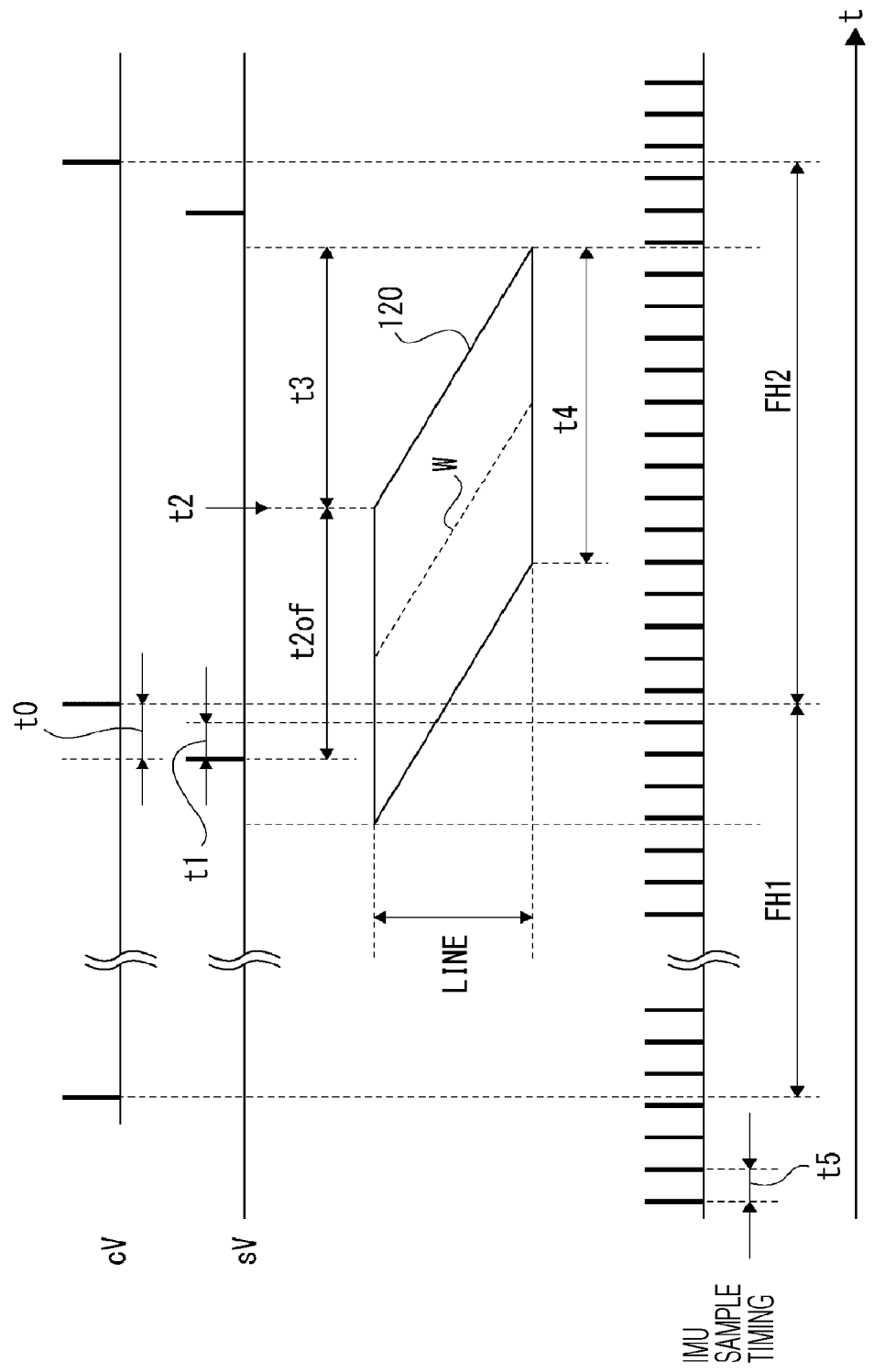
FIG. 16 is an explanatory diagram of sample timing of IMU data according to the embodiment.

FIG. 16 illustrates a synchronization signal cV of the imaging device 1 in ae vertical period, and synchronization signal sV of the image sensor 12a generated from the synchronization signal cV, and sample timing of the IMU data, and also illustrates an exposure timing range 120.

The exposure timing range schematically indicates the exposure period of each line of one frame at an exposure time t4 by the rolling shutter method as a parallelogram. Moreover, a temporal offset t0 of the synchronization signal cV and the synchronization signal sV, an IMU sample timing offset t1, a readout start timing t2, a readout time (curtain speed) t3, and an exposure time t4 are illustrated. Note that the readout start timing t2 is timing after a predetermined time t2 of has elapsed from the synchronization signal sV.

Each IMU data obtained at each IMU sample timing is associated with a frame. For example, the IMU data in a period FH1 is the metadata associated with the current frame in which the exposure period is expressed as a parallelogram, and the IMU data in the period FH1 is the metadata associated with the next frame. However, by concatenating all the IMU data in step ST2 of FIG. 14, association between each frame and the IMU data is canceled, and the IMU data can be chronologically managed.

In this case, the IMU data corresponding to the exposure centroid (timing of the broken line W) of each line of the current frame is specified. This can be calculated if the temporal relationship between the IMU data and an effective pixel region of the image sensor 12a is known.

Therefore, the IMU data corresponding to the exposure centroid (timing of the broken line W) of each line is specified using information that can be acquired as the timing information TM corresponding to the frame (#FN).

That is, the IMU data is information of the exposure time, the exposure start timing, the reading time, the number of exposure frames, the IMU sample offset, and the frame rate.

Then, the quaternion QD calculated from the IMU data of the exposure centroid is specified and set as the quaternion QD (#LN) that is the posture information for each line.

This quaternion QD (#LN) is provided for the shake information adjustment processing in step ST15.

In the shake information adjustment, the CPU 71 adjusts the quaternion QD according to the input shake modification parameter PRM.

The shake modification parameter PRM is a parameter input according to the user operation or a parameter generated by automatic control.

The user can input the shake modification parameter PRM so as to add an arbitrary shake degree to the image. Furthermore, the CPU 71 can generate the shake modification parameter PRM by automatic control according to image analysis, image type, user's selection operation of a shake model, or the like.

Here, FIG. 14 illustrates the UI processing in step ST40 and the parameter setting processing in step ST41.

Although details of the UI processing will be described below, the user can perform an operation input for giving an instruction on the shake modification. That is, the operation input is an operation of giving an instruction on shake as shake production, an operation of instructing a degree of shake reduction, or the like.

The CPU 71 performs parameter setting in step ST41 on the basis of the UI processing in step ST40. That is, the shake modification parameter according to the user operation is set and used for the shake information adjustment processing in step ST15.

In the shake information adjustment processing in step ST15, specifically, the CPU 71 generates a post-adjustment quaternion eQD for adding shake to the image or increasing or decreasing the amount of shake on the basis of the quaternion QD that is the shake information at the time of imaging or the shake modification parameter PRM set in step ST41.

A specific generation example of the post-adjustment quaternion eQD will be described with reference to FIGS. 17, 18, and 19.

Figure 17:
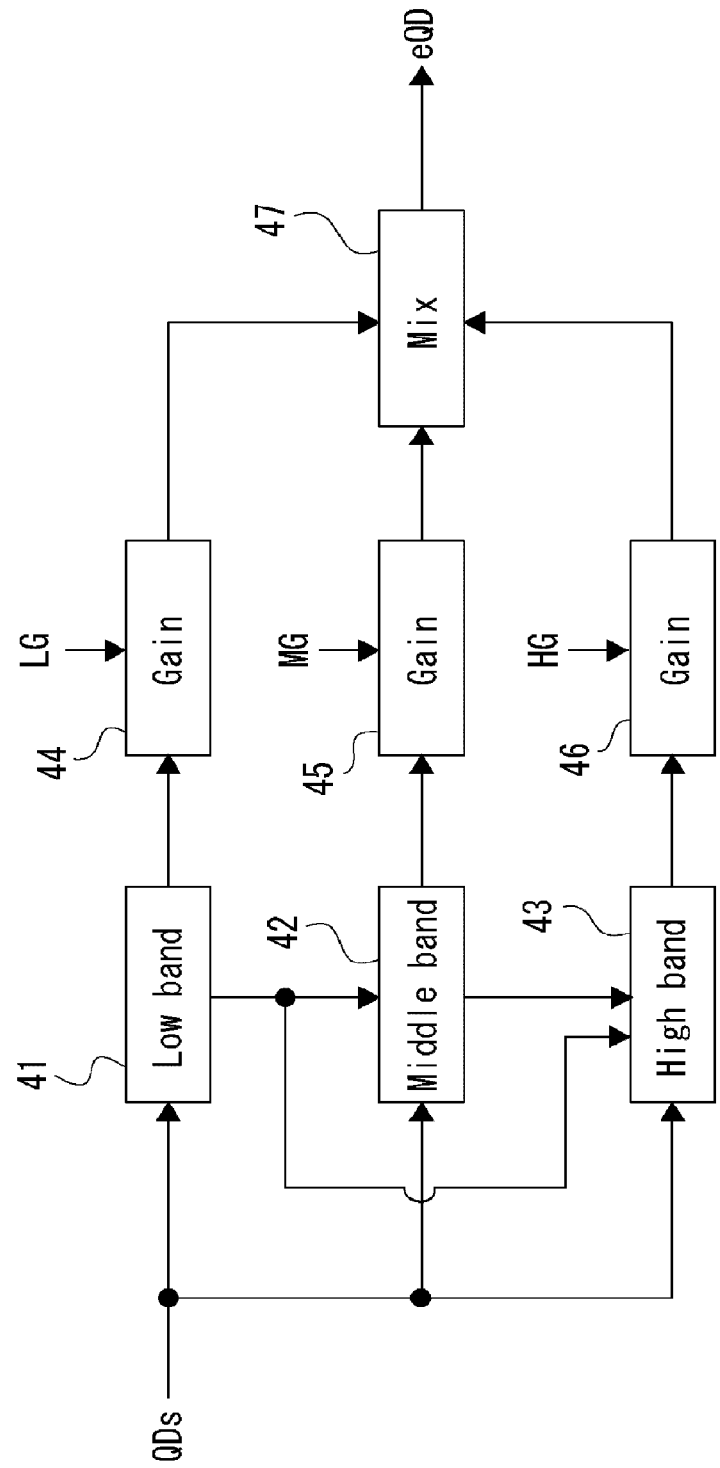
FIG. 17 is an explanatory diagram of shake information adjustment by frequency band according to the embodiment.

FIG. 17 illustrates an example of generating the post-adjustment quaternion eQD according to an instruction of a gain by frequency band by the shake modification parameter PRM.

The frequency band is a band of a frequency of shake. For the sake of description, it is assumed that the band is divided into three bands of a low band, a middle band, and a high band. Of course, this is merely an example, and any number of bands may be adopted as long as it is two or more.

A low frequency gain LG, a middle frequency gain MG, and a high frequency gain HG are provided as the shake modification parameter PRM.

The adjustment processing system in FIG. 17 includes a low pass filter 41, a middle pass filter 42, a high pass filter 43, gain calculation units 44, 45, and 46, and a synthesis unit 47.

"Quaternion QDs for shaking" is input to the adjustment processing system. This is conjugation of the quaternion QD as the shake information at the time of imaging.

Each value q for the current frame and preceding and following predetermined frames as the quaternion QDs for shaking is input to the low pass filter 41 to obtain a low pass component $q_{low}$.

$$q_{low} = \text{mean}(q, n) \quad \text{[Math. 1]}$$

The gain calculation unit 44 gives the low frequency gain LG to the low pass component $q_{low}$.

In the equation, mean (q, n) represents an average value of n values before and after q.

Note that the equation of mean (q, n) is merely an example of the low pass filter, and it goes without saying that other calculation methods may be used. Each equation described below is also an example.

The value q of the quaternion QDs for shaking is also input to the middle pass file 42 to obtain a middle pass component $q_{mid}$.

$$q_{mid} = q^*_{low} \times \text{mean}(q, m) \quad \text{[Math. 2]}$$

where n>m

Note that $q^*_{low}$ is a conjugate of $q_{low}$.

Further, "x" is a quaternion product.

The gain calculation unit 45 gives the middle frequency gain MG to the middle pass component $q_{mid}$.

Further, the value q of the quaternion QDs for shaking is input to the high pass file 43 to obtain a high pass component $q_{high}$.

$$q_{high} = q^*_{mid} \times q^*_{low} \times q \quad \text{[Math. 3]}$$

Note that $q^*_{mid}$ is a conjugate of $q_{mid}$.

The gain calculation unit 46 gives the high frequency gain HG to the high pass component $q_{high}$.

These gain calculation units 44, 45, and 46 set an input as "$q_{in}$".

$$q_{in} = \left[ \cos\frac{\theta}{2} \quad a_x\sin\frac{\theta}{2} \quad a_y\sin\frac{\theta}{2} \quad a_z\sin\frac{\theta}{2} \right] \quad \text{[Math. 4]}$$

In this case, the following "$q_{out}$" is output where $\theta' = \theta * \text{gain}$.

(where gain represents the low frequency gain LG, the middle frequency gain MG, or the high frequency gain HG.)

$$q_{out} = \left[ \cos\frac{\theta'}{2} \quad a_x\sin\frac{\theta'}{2} \quad a_y\sin\frac{\theta'}{2} \quad a_z\sin\frac{\theta'}{2} \right] \quad \text{[Math. 5]}$$

Such gain calculation units 44, 45, and 46 obtain low pass component $q'_{low}$, middle pass component $q'_{mid}$, and high pass component $q'_{high}$ to which the low frequency gain LG, the middle frequency gain MG, and the high frequency gain HG are given, respectively. A value $q_{mixed}$ obtained by synthesizing the above components in the synthesis unit 47 is obtained.

$$q_{mixed} = q'_{low} \times q'_{mid} \times q'_{high} \quad \text{[Math. 6]}$$

Note that "x" is a quaternion product.

The thus obtained value $q_{mixed}$ is the value of the post-adjustment quaternion eQD.

Although the above is an example of band division, a method of generating the post-adjustment quaternion eQD of giving a gain according to the shake modification parameter PRM without band division is also conceivable.

Figure 18:
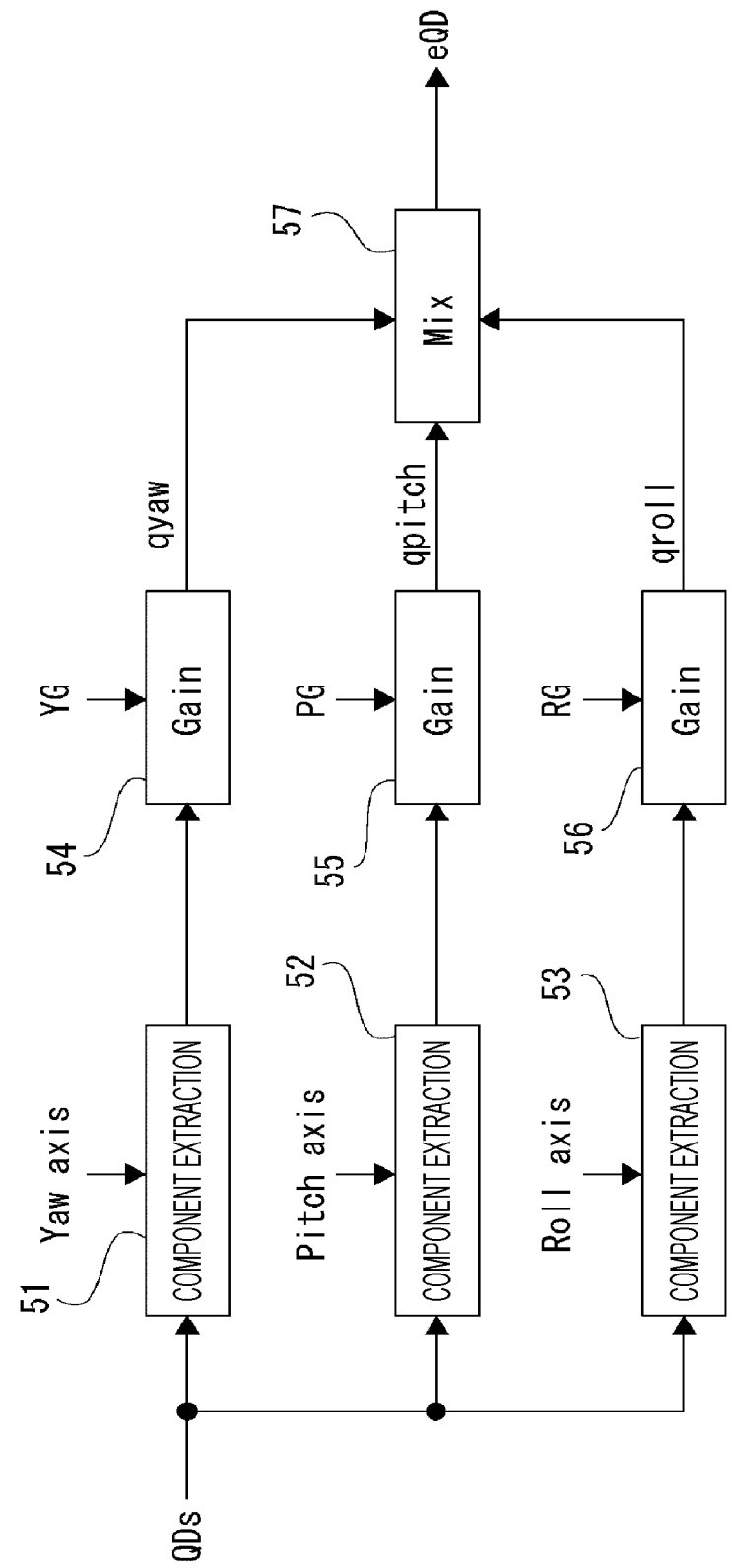
FIG. 18 is an explanatory diagram of shake information adjustment for each direction according to the embodiment.

FIG. 18 illustrates an example of generating the post-adjustment quaternion eQD according to an instruction of a gain by direction by the shake modification parameter PRM.

The direction is a direction of shake, that is, a direction of yaw, pitch, or roll.

A yaw gain YG, a pitch gain PG, and a roll gain RG are provided as the shake modification parameter PRM.

The adjustment processing system in FIG. 18 includes a yaw component extraction unit 51, a pitch component extraction unit 52, a roll component extraction unit 53, gain calculation units 54, 55, and 56, and a synthesis unit 57.

The yaw component extraction unit 51, the pitch component extraction unit 52, and the roll component extraction unit 53 are provided with information of a yaw axis, a pitch axis, and a roll axis, respectively.

Each value q for the current frame and preceding and following predetermined frames as the quaternion QDs for shaking is input to the yaw component extraction unit 51, the pitch component extraction unit 52, and the roll component extraction unit 53 to obtain a yaw component $q_{yaw}$, a pitch component $q_{pitch}$, and a roll component $q_{roll}$.

In each component extraction processing, the input is the next "$q_{in}$".

$$q_{in} = \left[ \cos\frac{\theta}{2} \quad a_x\sin\frac{\theta}{2} \quad a_y\sin\frac{\theta}{2} \quad a_z\sin\frac{\theta}{2} \right] \quad \text{[Math. 7]}$$

$$u = [u_x \quad u_y \quad u_z]$$

u is a unit vector representing a direction of an axis such as the yaw axis, the pitch axis, or the roll axis.

In this case, the next "$q_{out}$" is output as $\theta' = \theta * (a \cdot u)$.

$$q_{out} = \left[ \cos\frac{\theta'}{2} \quad u_x\sin\frac{\theta'}{2} \quad u_y\sin\frac{\theta'}{2} \quad u_z\sin\frac{\theta'}{2} \right] \quad \text{[Math. 8]}$$

The gain calculation units 54, 55, and 56 give the yaw gain YG, the pitch gain PG, and the roll gain RG to the yaw component $q_{yaw}$, the pitch component $q_{pitch}$, and the roll component $q_{roll}$ obtained by such component extraction, respectively.

Then, a value $q_{mixed}$ obtained by synthesizing the yaw component $q'_{yaw}$, the pitch component $q'_{pitch}$, and the roll component $q'_{roll}$ to which the gain calculation has been applied by the synthesis unit 47 is obtained.

$$q_{mixed} = q'_{yaw} \times q'_{pitch} \times q'_{roll} \quad \text{[Math. 9]}$$

Note that "x" in this case is also a quaternion product.

The thus obtained value $q_{mixed}$ is the value of the post-adjustment quaternion eQD.

Figure 19:
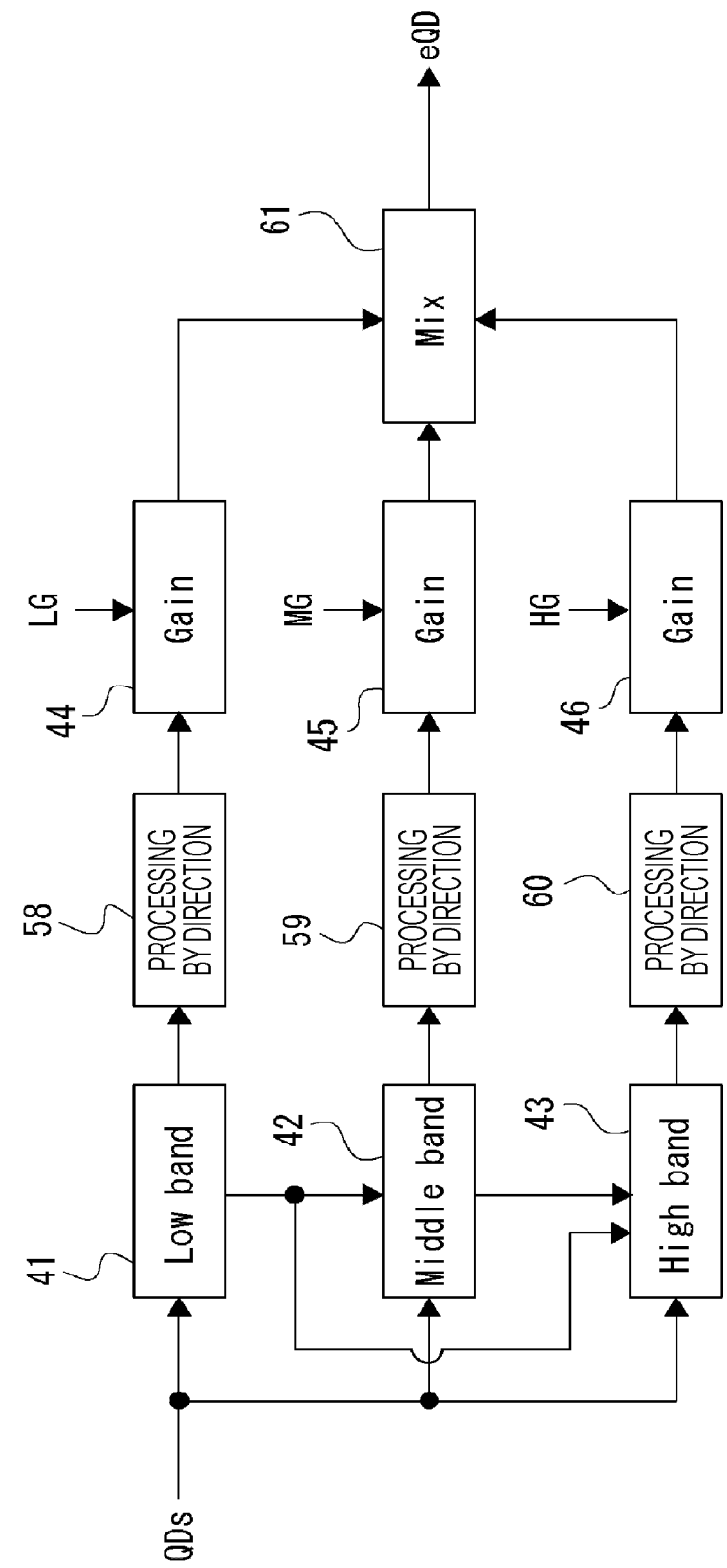
FIG. 19 is an explanatory diagram of shake information adjustment by frequency band and by direction according to the embodiment.

FIG. 19 illustrates an example of combining the above-described information adjustment by frequency band and by direction.

The adjustment processing system includes a low pass filter 41, a middle pass filter 42, a high pass filter 43, processing units by direction 58, 59, and 60, gain calculation units 44, 45, and 46, and a synthesis unit 61.

Depending on the shake modification parameter PRM, the low frequency gain LG, the middle frequency gain MG, the high frequency gain HG, and the yaw gain YG, the pitch gain PG, and the roll gain RG (not illustrated) are given.

In this adjustment processing system, each value q for the current frame and preceding and following predetermined frames as the quaternion QDs for shaking is supplied to the low pass filter 41, the middle pass filter 42, and the high pass filter 43 to obtain respective band components. Each band component is input to the processing units by direction 58, 59, and 60.

Each of the processing units by direction 58, 59, and 60 includes the yaw component extraction unit 51, the pitch component extraction unit 52, the roll component extraction unit 53, the gain calculation units 54, 55, and 56, and the synthesis unit 57 in FIG. 18.

That is, the processing unit by direction 58 divides the low pass component of the quaternion QDs for shaking into components in the yaw direction, the roll direction, and the pitch direction, performs gain calculation using the yaw gain YG, the pitch gain PG, and the roll gain RG, and then synthesizes the components.

The processing unit by direction 59 divides the middle pass component of the quaternion QDs for shaking into components in the yaw direction, the roll direction, and the pitch direction, similarly performs gain calculation, and then synthesizes the components.

The processing unit by direction 60 divides the high pass component of the quaternion QDs for shaking into components in the yaw direction, the roll direction, and the pitch direction, similarly performs gain calculation, and then synthesizes the components.

Note that the gains used in the processing units by direction 58, 59, and 60 are assumed to have different gain values. That is, the processing unit by direction 58 uses the yaw gain YG for low frequency, the pitch gain PG for low frequency, and the roll gain RG for low frequency, the processing unit by direction 59 uses the yaw gain YG for middle frequency, the pitch gain PG for middle frequency, and the roll gain RG for middle frequency, and the processing unit by direction 60 uses the yaw gain YG for high frequency, the pitch gain PG for high frequency, and the roll gain RG for high frequency. That is, it is conceivable that the processing unit by directions 58, 59, and 60 use nine gains.

The outputs of these processing unit by directions 58, 59, and 60 are supplied to the gain calculation units 44, 45, and 46, respectively, and are given the low frequency gain LG, the middle frequency gain MG, and the high frequency gain HG, respectively. Then, the components are synthesized by the synthesis unit 61 and output as the value of the post-adjustment quaternion eQD.

In the above example of FIG. 19, first, the band is divided by frequency band and then the processing by direction is applied for each band component. However, opposite processing is also adoptable. That is, first, the band may be divided by direction, and then the processing by frequency band may be applied for each direction component.

In that case, it is conceivable to use nine gains in the processing by frequency band. For example, in the processing by frequency band for the yaw direction, the low frequency gain LG for the yaw direction, the middle frequency gain MG for the yaw direction, and the high frequency gain HG for the yaw direction are used. In the processing by frequency band for the pitch direction, a low frequency gain LG for the pitch direction, a middle frequency gain MG for the pitch direction, and a high frequency gain HG for the pitch direction are used. In the processing by frequency band for the roll direction, a low frequency gain LG for the roll direction, a middle frequency gain MG for the roll direction, and a high frequency gain HG for the roll direction are used.

In step ST15 of FIG. 14, the post-adjustment quaternion eQD is generated by the above processing example.

Then, the generated post-adjustment quaternion eQD is provided to the shake modification processing in step ST16.

The shake modification processing in step ST16 can be considered as adding shake by applying the post-adjustment quaternion eQD obtained by the processing in FIGS. 17, 18, and 19 to an image in a state where shake is stopped.

In the shake modification processing in step ST16, the CPU 71 adds shake by rotating the image of the celestial sphere model MT to which the image of the frame has been attached in step ST13, for each line, using the post-adjustment quaternion eQD (#LN). An image of a shake-modified celestial sphere model hMT is sent to the processing in step ST18.

Then, in step ST18, the CPU 71 projects the image of the shake-modified celestial sphere model hMT onto a plane and clips the image to obtain an image (output image data oPD) to which the shake modification has been performed.

In this case, the shake modification is implemented by the rotation of the celestial sphere model MT, and the shape does not become a trapezoidal shape even if the model is clipped at any position by using the celestial sphere model MT, and as a result, the trapezoidal distortion is eliminated. Furthermore, as described above, in the celestial sphere model MT, the range visible by the ideal pinhole camera is attached to the celestial sphere surface, and thus there is no lens distortion. Since the rotation of the celestial sphere model MT is performed according to the post-adjustment quaternion eQD (#LN) based on the quaternion QD (#LN) for each line, the focal plane distortion correction is also eliminated.

Moreover, since the quaternion QD (#LN) corresponds to the exposure centroid of each line, the blur is not noticeable in the image.

The association between the image projected on the plane in step ST18 and the celestial sphere model MT is as follows.

FIG. 20A illustrates an example of a rectangular coordinate plane 131 to be projected on the plane. Each coordinate of the image to be projected on the plane is (x, y).

As illustrated in FIG. 20B, the coordinate plane 131 is arranged (normalized) in a three-dimensional space so as to be in contact with the celestial sphere model MT directly above in the center. That is, the coordinate plane 131 is arranged such that the center of the coordinate plane 131 coincides with the center of the celestial sphere model MT and in contact with the celestial sphere model MT.

In this case, the coordinates are normalized on the basis of zoom magnification and size of the clipped region. For example, as illustrated in FIG. 20A, in a case where a horizontal coordinate of the coordinate plane 131 is 0 to outh and a vertical coordinate is 0 to outv, outh and outv are the image size. Then, for example, the coordinates are normalized by the following equations.

$$x_{norm} = \frac{1}{zoom} \cdot \frac{(x - outh/2)}{r} \quad \text{[Math. 10]}$$

$$y_{norm} = \frac{1}{zoom} \cdot \frac{(y - outv/2)}{r}$$

$$z_{norm} = 1 \text{ where}$$

$$r = \min(outh, outv)/2$$

In the above (equation 10), min (A, B) is a function that returns A or B, whichever is smaller. Furthermore, "zoom" is a parameter for controlling scaling.

In addition, xnorm, ynorm, and znorm are normalized x, y, and z coordinates.

The coordinates of the coordinate plane 131 are normalized to the coordinates on the spherical surface of the hemisphere with a radius of 1.0 by the equations of the above (equation 10).

As illustrated in FIG. 21A, the coordinate plane 131 is rotated by a rotation matrix operation to obtain the direction of the clipped region. That is, the rotation is performed at a pan angle, a tilt angle, and a roll angle using a rotation matrix of the following (equation 11). Here, the pan angle is a rotation angle for rotating coordinates about a z axis. Furthermore, the tilt angle is a rotation angle for rotating coordinates about an x axis, and the roll angle is a rotation angle for rotating coordinates about a y axis.

$$\begin{pmatrix} x_{rot} \\ y_{rot} \\ z_{rot} \end{pmatrix} = \begin{pmatrix} 1 & 0 & 0 \\ 0 & \cos R_t & -\sin R_t \\ 0 & \sin R_t & \cos R_t \end{pmatrix}$$

$$\begin{pmatrix} \cos R_r & 0 & -\sin R_r \\ 0 & 1 & 0 \\ \sin R_r & 0 & \cos R_r \end{pmatrix} \begin{pmatrix} \cos R_p & -\sin R_p & 0 \\ \sin R_p & \cos R_p & 0 \\ 0 & 0 & 1 \end{pmatrix} \begin{pmatrix} x_{norm} \\ y_{norm} \\ z_{norm} \end{pmatrix}$$

[Math. 11]

In the above (equation 11), "Rt" represents the tilt angle, "Rr" represents the roll angle, and "Rp" represents the pan angle. Furthermore, (xrot, yrot, zrot) is coordinates after rotation.

The coordinates (xrot, yrot, zrot) are used for calculating celestial sphere corresponding points in perspective projection.

As illustrated in FIG. 21B, the coordinate plane 131 is perspectively projected onto the celestial sphere surface (region 132). That is, when a straight line is drawn from the coordinates toward the center of the celestial sphere, a point intersecting the spherical surface is obtained. Each coordinate is calculated as follows.

$$x_{sph} = x_{rot}/\sqrt{x_{rot}^2 + y_{rot}^2 + z_{rot}^2}$$

$$y_{sph} = y_{rot}/\sqrt{x_{rot}^2 + y_{rot}^2 + z_{rot}^2}$$

$$z_{sph} = z_{rot}/\sqrt{x_{rot}^2 + y_{rot}^2 + z_{rot}^2}$$ [Math. 12]

In (equation 12), xsph, ysph, and zsph are coordinates obtained by projecting the coordinates on the coordinate plane 131 to the coordinates on the surface of the celestial sphere model MT.

Image data projected on the plane is obtained in this relationship.

For example, the clipped region for the image projected on the plane by the above-described method is set in step ST17 in FIG. 14.

In step ST17, clipped region information CRA in the current frame is set on the basis of tracking processing by image analysis (object recognition) or clipped region instruction information CRC according to a user operation.

For example, FIGS. 22A and 22B illustrate clipped region information CRA set for an image of a certain frame in a frame state.

Such clipped region instruction information CRC is set for each frame.

Note that an instruction of an aspect ratio of an image by the user or automatic control is also reflected in the clipped region information CRA.

The clipped region information CRA is reflected in the processing in step ST18. That is, as described above, a region corresponding to the clipped region information CRA is projected on a plane on the celestial sphere model MT, and an output image oPD is obtained.

The output image oPD thus obtained is image data to which the shake modification processing has been applied in step ST16.

By performing the processing of FIG. 14 every frame, when the output image oPD is reproduced and displayed, an image to which shake is added is displayed as the shake production. Therefore, in the case where the user performs an operation for inputting the shake modification parameter PRM, an image to which the shake production according to the intention of the user is added is obtained. Such image data is displayed or saved as a shake-produced image.

Here, in the present embodiment, for example, association recording/reproduction is performed as step ST20. For example, the CPU 71 can perform association recording (for example, recording in the storage unit 79 or the removable recording medium 81 in FIG. 5) for each frame and reproduce/transfer and output the recorded information as necessary.

As the association recording processing for each frame, for example, the shake information at the time of imaging and the shake modification information SMI are recorded in association with the image data in units of frames.

First, in step ST12, the CPU 71 performs recording processing for the image data iPD in which the internal correction of the imaging device has been canceled, as the image data in units of frames. That is, the image data is image data in which the shake reduction in the imaging device 1 has been canceled and the influence of shake such as camera shake at the time of imaging appears as it is.

Furthermore, the CPU 71 performs recording processing for the quaternion QD, the timing information TM, and the camera parameter CP for the frame, as the shake information at the time of imaging associated with the image data iPD.

FIG. 23 illustrates the metadata MTD1 supplied from the image source VS to the image processing device TDx and the metadata MTD2 supplied from the image processing device TDx to the image processing device TDy. Information corresponding to the metadata MTD2 is associated for each frame of the image data iPD as the shake information at the time of imaging.

Moreover, the CPU 71 performs recording processing for the shake modification parameter PRM as the shake modification information SMI associated with the image data iPD. Alternatively, the post-adjustment quaternion eQD may be recorded instead of the shake modification parameter PRM or together with the shake modification parameter PRM.

The image data iPD, the shake information at the time of imaging (metadata MTD2), and the shake modification information SMI of each frame recorded in association in this manner are transferred to an external device and made available.

FIG. 2 illustrates that the image data VD2, the metadata MTD2, and the shake modification information SMI are transmitted from the image processing device TDx to the image processing device TDy, but in the case of the example of FIG. 14, the image data VD2 is image data configured by the image data iPD. Furthermore, the metadata MTD2 indicates the shake information at the time of imaging as content illustrated in FIG. 23. The shake modification information SMI is the information indicating the processing amount of the shake production performed for the image data iPD.

Figure 24:
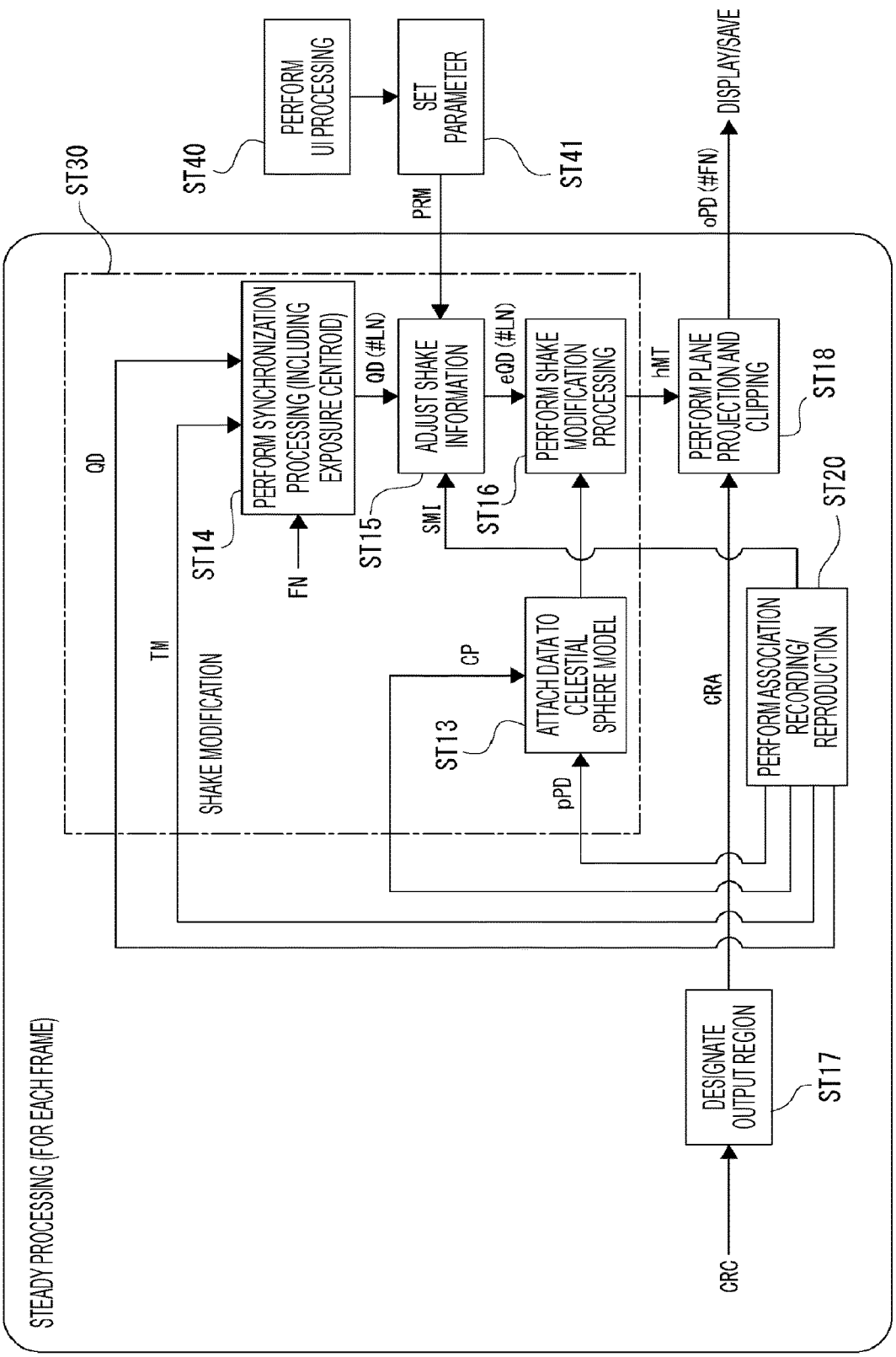
FIG. 24 is an explanatory diagram of secondary image processing according to the embodiment.

FIG. 24 illustrates a processing example of the image processing device TDy that has acquired the image data VD2, the metadata MTD2, and the shake modification information SMI.

Note that, hereinafter, the same step numbers are given to similar processing to the above-described processing to avoid redundant description of the processing content.

Note that, similarly to FIG. 14, step ST30 is "shake modification" in a broad sense, and the processing in steps ST13, ST14, ST15, and ST16 is performed.

FIG. 24 illustrates steady processing performed by the image processing device TDy, for example.

In this case, it is assumed that information transmitted from the image processing device TDx is reproduced as the association recording/reproduction processing in step ST20.

That is, the association recording/reproduction processing in step ST20 is processing in which the information (Image data VD2, metadata MTD2, shake modification information SMI) transmitted from the image processing device TDx is recorded in the storage unit 79 or the removable recording medium 81 of the information processing device 70 in FIG. 5 functioning as the image processing device TDy, for example, and is sequentially read therefrom.

The CPU 71 of the information processing device 70 functioning as the image processing device TDy reads the image data pPD for each frame as processing in step ST20. The image data pPD refers to the image data reproduced from the recording medium in step ST20.

In a case where the image processing device TDx performs the processing in FIG. 14, the image data pPD to be reproduced is the image data iPD described with reference to FIG. 14.

Furthermore, as the processing in step ST20, the CPU 71 reads the camera parameter CP corresponding to the image data pPD of the current reproduction frame for attaching to the celestial sphere model MT in step ST13.

Furthermore, as the processing in step ST20, the CPU 71 reads the quaternion QD and the timing information TM corresponding to the image data pPD of the current reproduction frame for the synchronization processing in step ST14.

Moreover, as the processing in step ST20, the CPU 71 reads the shake modification information SMI corresponding to the image data pPD of the current reproduction frame for the shake information adjustment in step ST15.

As the processing in step ST13, the CPU 71 attaches the reproduced image data pPD to the celestial sphere model with reference to the reproduced camera parameter CP.

As the processing in step ST14, the CPU 71 performs the synchronization processing using the quaternion QD and the timing information TM corresponding to the reproduced image data pPD.

As the processing in step ST15, the CPU 71 adjusts the quaternion QD using the reproduced shake modification information SMI and the input shake modification parameter PRM to generate the post-adjustment quaternion eQD.

The CPU 71 sets the shake modification parameter PRM in step ST41 on the basis of the UI processing in step ST40 for use in the shake information adjustment processing in step ST15.

As the processing in step ST16, the CPU 71 rotates the image data pPD attached to the celestial sphere model MT using the post-adjustment quaternion eQD, and performs the shake modification processing.

At step ST18, the CPU 71 clips the shake-modified image according to the clipped region information CRA, performs planar projection, and generates and outputs the output image data oPD.

The image processing device TDy that performs each of such processing can perform the following operations.

Reproduction of the Shake Production Performed by the Image Processing Device TDx in the Past In step ST15, the post-adjustment quaternion eQD can be generated reflecting the shake modification information SMI (for example, the shake modification parameter PRM) in the image processing device TDx. Therefore, in step ST16, the CPU 71 of the image processing device TDy can perform the same shake modification processing as the shake modification performed in the image processing device TDx in the past, and can obtain, display, and record such output image data oPD.

Addition of New Shake Production

The image data pPD (image data iPD) to be reproduced as a processing target is image data to which the shake modification in the image processing device TDx has not been applied. Therefore, in the image processing device TDy, the shake modification parameter PRM is input by the user operation or automatic control, and the post-adjustment quaternion eQD corresponding thereto is generated, so that, in step ST16, the shake modification processing of only the image processing device TDy that is not affected by the past shake modification can be performed, and an image by such output image data oPD can be displayed or recorded.

Adjustment and Correction of the Shake Production Applied in the Image Processing Device TDx in the Past In step ST15, the post-adjustment quaternion eQD can be generated reflecting both the shake modification information SMI (for example, the shake modification parameter PRM) in the image processing device TDx and the shake modification parameter PRM newly input by the user operation or automatic control.

Therefore, the CPU 71 of the image processing device TDy can change the shake degree of an image due to the shake modification performed by the image processing device TDx, for example, according to the user of the image processing device TDy adjusting or partially modifying the shake modification parameter PRM. Then, the CPU 71 can display or record an image by such output image data oPD.

Furthermore, in the case where the shake modification is performed in the image processing device TDy, it is conceivable to associate information of the shake modification.

That is, the shake modification information SMI associated with the image data VD2 (iPD) of each frame and the shake information at the time of imaging (metadata MTD2) is updated to the shake modification information SMI used this time.

In this way, another image processing device that has acquired the associated information group can reproduce or correct the shake modification performed by the image processing device TDy.

Note that it is also conceivable to record the information regarding the clipped region information CRA in step ST17 in association. For example, information of the aspect ratio is associated. As a result, the designation information of the aspect ratio can also be reflected at the time of subsequent image reproduction, addition of the shake production, or the like.

Of course, the clipped region information CRA such as the aspect ratio may be recorded in the processing in the image processing device TDx in FIG. 14.

5. SHAKE MODIFICATION USER INTERFACE

The above description has been made that the shake modification is performed as step ST30 in FIG. 14 or 24.

As the shake modification, modifying the shake state in the direction of eliminating the shake between frames (ideally, making the shake zero) as the shake reduction, or modifying the shake state to add or reduce shake as the shake production is performed.

Here, as a feeling of a person who views a moving image, there is a case where a sense of power or realistic feeling is increased when there is shake to some extent compared to an image without shaking at all. In addition, there is a case where it is desired to slightly leave the shake instead of completely removing the shake.

Therefore, in the present embodiment, for example, in FIG. 14 or 24, the shake modification parameter PRM is set according to the user operation and the user operation is reflected in the shake modification by steps ST40 and ST41.

Hereinafter, various examples will be described as UI operations for shake modification.

[5-1: UI Operation of First Embodiment]

Figure 25:
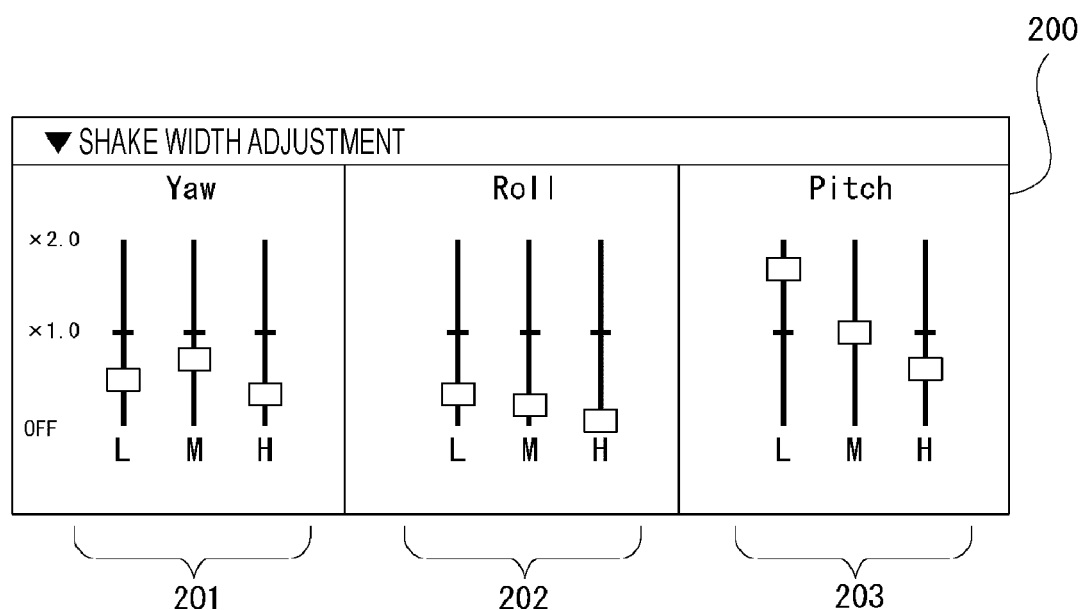
FIG. 25 is an explanatory diagram of a UI according to the first embodiment.

FIG. 25 illustrates a shake width adjustment image 200 displayed as a UI image. This is, for example, an image for adjusting shake width to be displayed on the display unit 77 in FIG. 5, and is an image that functions as the input unit 76 by a touch panel or the like.

The shake width adjustment image 200 is provided with a yaw adjustment part 201, a roll adjustment part 202, and a pitch adjustment part 203.

In each of the yaw adjustment part 201, the roll adjustment part 202, and the pitch adjustment part 203, images of sliders for operation for respective frequency bands of shake are presented as L (low frequency), M (middle frequency), and H (high frequency), and the user can perform shake width adjustment by performing a touch operation on an arbitrary slider.

For example, the user can adjust the shake amount for each desired frequency band for each of shake in the yaw direction (roll shake), shake in the pitch direction (pitch shake), and shake in the roll direction (rotation shake) using the shake width adjustment image 200.

In the UI processing in step ST40 of FIG. 14 or 24, when the shake width adjustment image 200 is displayed and a user operation is detected, the shake modification parameter PRM is set in step ST41 according to the operation information and is reflected in the shake modification processing in step ST16 via the processing in step ST15 as described above.

The shake width adjustment image 200 of FIG. 25 is an example corresponding to the example of generating the post-adjustment quaternion eQD as in FIG. 19, for example. Specifically, as the shake modification parameter PRM, the above-described low frequency gain LG, middle frequency gain MG, high frequency gain HG, yaw gain YG, pitch gain PG, and roll gain RG are set as the shake modification parameters PRM according to the operation of the shake width adjustment image 200.

In the shake modification processing, a rotation amount for the shake reduction is varied on the basis of the operation information according to the operation in the yaw direction, the pitch direction, or the roll direction of an image attached to the celestial sphere model MT. Alternatively, rotation for the shake production according to the operation is applied.

By providing such a shake width adjustment image 200, the user can adjust the shake state of each of a yaw axis component, a pitch axis component, and a roll axis component for each band of the low frequency band, the middle frequency band, and the high frequency band.

Therefore, the output image oPD can be an image to which various shake expressions are added, such as an image in which the shake in the roll direction and the yaw direction is suppressed but the shake in the pitch direction is left to some extent, or an image in which the shake in the high frequency is suppressed but large shake is not corrected and left. That is, more various moving image expressions can be performed by adjusting the target and degree of the shake correction.

Note that, in FIG. 25, the operation can be performed for each of the three bands for each of the directions of shake, but other examples are of course conceivable. For example, there are various conceivable examples such as an example in which only the operations in the yaw direction, the pitch direction, and the roll direction are available but adjustment for each frequency band is not available, an example in which the direction cannot be designated but adjustment only for each band such as the low band, the middle band, or the high band is available, an example in which adjustment only in one direction is available, and an example in which adjustment only in one band is available.

[5-2: UI Operation of Second Embodiment]

Figure 26:
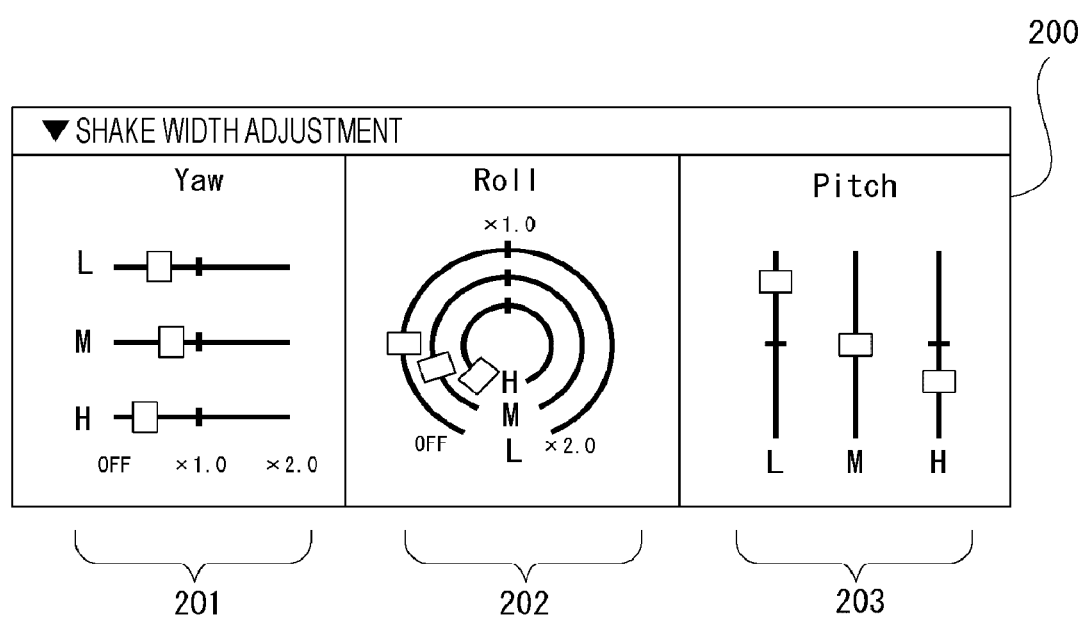
FIG. 26 is an explanatory diagram of a UI according to a second embodiment.

FIG. 26 illustrates an example of a shake width adjustment image 200 as a second embodiment.

Since a yaw adjustment part 201 is adjustment related to shake in a lateral direction, a slider that slides in the lateral direction is provided.

Since a roll adjustment part 202 is adjustment related to shake in a rotation direction, a slider that slides in a circular direction is provided.

Since a pitch adjustment part 203 is adjustment related to shake in a vertical direction, a slider that slides in the vertical direction is provided.

In this way, a user can easily understand an adjustable direction of the shake and can easily perform a desired operation.

[5-3: UI Operation of Third Embodiment]

FIG. 27 is an example in which an adjustment operation of a shake state can be intuitively performed.

A shake width adjustment image 200 is displayed as illustrated in FIG. 27A, and a preset button 210 is displayed as illustrated in FIG. 27B.

For example, "slowly walking person (Slow)", "walking person (Walk)", and "running person (Fast)" are prepared as the preset buttons 210. Furthermore, the shake modification parameters PRM corresponding to these preset buttons 210 are recorded in the ROM 72 or the storage unit 79.

Then, when a user presses a certain preset button 210, the shake modification parameter PRM is read. Furthermore, an operation state corresponding to the shake modification parameter PRM is expressed. For example, as illustrated in FIG. 27C, the content of preset data is presented to the user as the position of the slider of the shake width adjustment image 200.

In this way, the user can know the operation state of the slider according to a moving image of a viewpoint of a slowly walking person, a moving image of a viewpoint of a walking person, or a moving image of a viewpoint of a running person. Furthermore, the shake modification parameter PRM corresponding to the state of the slider at that time is set and reflected in the shake modification processing, so that the moving image of the viewpoint of a walking person, the moving image of the viewpoint of a running person, or the like can be confirmed by a reproduction image.

In particular, while it is difficult for a person who is not an expert to perform an operation so as to obtain an arbitrary effect by adjusting the slider, such a preset button 210 makes it easy to perform an operation for obtaining an image desired by the user.

Of course, the user can finely adjust the position of the slider after the position of the slider is modified with preset information, and thus, it is easy to implement desired shake of the user.

FIG. 28 illustrates an example of presenting only the preset button 210 without using the shake width adjustment image 200. Moreover, FIG. 28 is an example of making various presets selectable.

First, as in FIG. 28A, the preset buttons 210 corresponding to large classifications such as "person", "animal", and "vehicle" are presented.

When the user selects "animal", preset buttons 211 of a small category such as "rabbit", "cat", and "horse" are then presented as in FIG. 28B. The shake modification parameters PRM corresponding to these preset buttons 211 are recorded in the ROM 72 or the storage unit 79.

If the user selects the preset button 211 of "rabbit", preset data (shake width adjustment data) corresponding to shake when the rabbit is running is read, and the shake modification parameter PRM is set according to the preset data. Then, shake modification processing is performed on the basis of the shake modification parameter PRM.

For example, by hierarchically presenting the preset buttons 210 and 210 as in FIGS. 28A and 28B, the user can select various types of shake and can easily give an instruction on desired shake correction.

Note that more various examples are conceivable for the user interface that displays the operation pieces such as the sliders and preset buttons.

[5-4: UI Processing of First, Second, and Third Embodiments]

Figure 29:
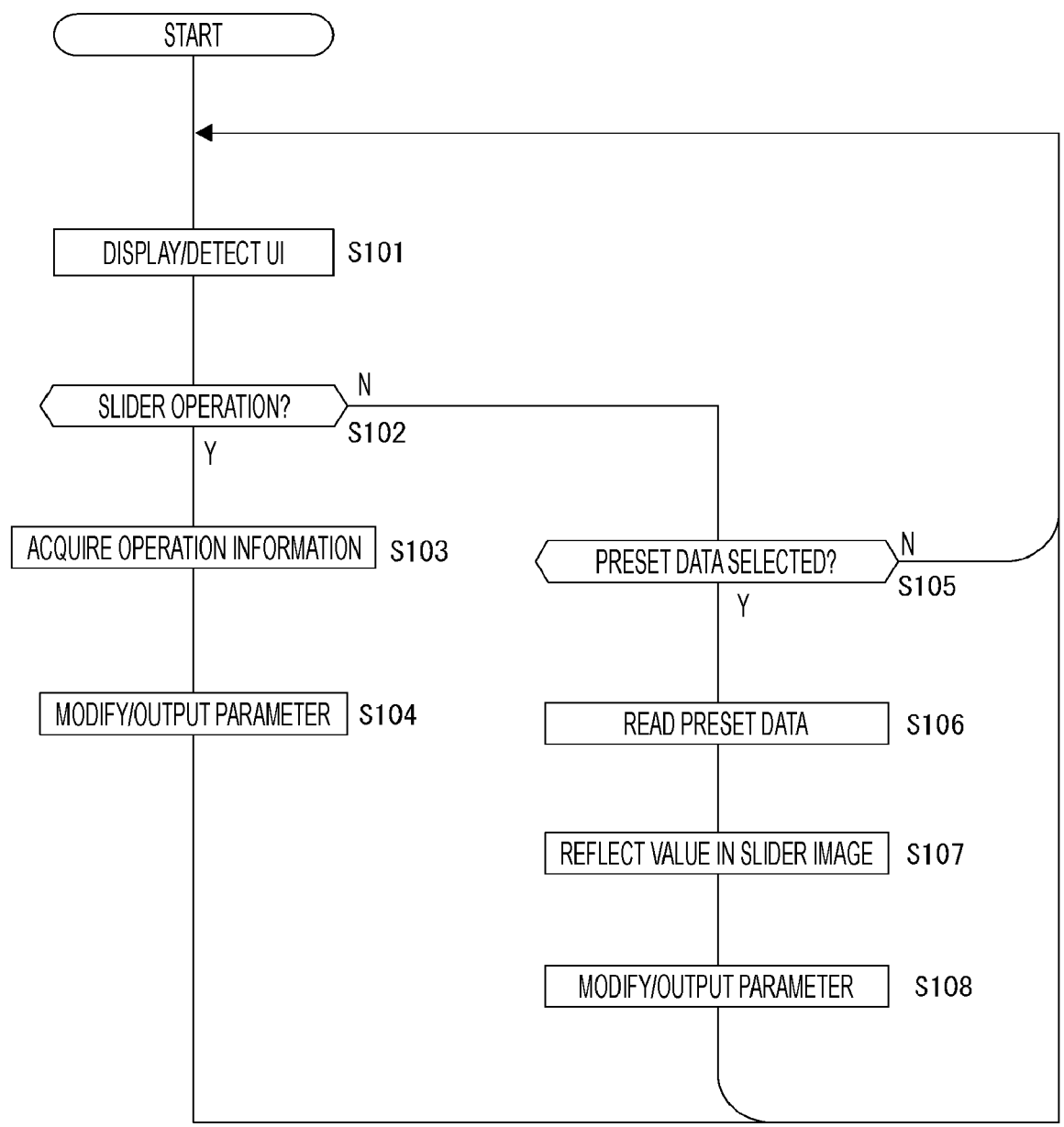
FIG. 29 is a flowchart of UI processing according to the first, second, and third embodiments.

FIG. 29 illustrates a UI processing example of performing UI processing according to the above-described first, second, or third embodiment. This is processing executed by the CPU 71 by the functions of the UI processing unit 103 and the parameter setting unit 102.

In step S101, the CPU 71 performs UI display and operation detection processing.

For example, while displaying the shake width adjustment image 200 as illustrated in FIG. 25 or 26 and controlling the display of the preset buttons 210 and 211 illustrated in FIG. 27 or 28, the CPU 71 detects the user's operation on the display.

Furthermore, the CPU 71 switches the display with respect to the operation, for example, switches the slider position, or the like.

In the case of using the hierarchical structure of the preset buttons 210 and 211, the CPU 71 displays the preset button 210 of the next hierarchy, for example, the preset button 211 of the small classification, according to the operation of the preset button of the large classification, for example.

When detecting the operation of the slider in the shake width adjustment image 200, the CPU 71 proceeds from step S102 to step S103, acquires the operation information (an operation value of the slider), sets the shake modification parameter PRM according to the operation information in step S104, and outputs the same to the shake modification processing (step ST30 in FIG. 14). Then, the CPU 71 returns to step S101.

When detecting the preset data selection operation, the CPU 71 proceeds from step S105 to step S106, and reads the preset data corresponding to the operation. Then, the CPU 71 performs display control such that the value of the preset data is reflected on the position of the slider as illustrated in FIG. 27C. Then, in step S108, the CPU 71 sets the shake modification parameter PRM based on the preset data, outputs the same to the shake modification processing (step ST30 in FIG. 14), and returns to step S101.

With the above processing, the UI display and the operation support as illustrated in FIG. 25 (or 26), 27, and 28 can be implemented, and the shake modification processing according to the sliders and the preset buttons 210 and 211 of the shake width adjustment image 200 can be executed.

[5-5: UI Operation of Fourth Embodiment]

An example of performing timeline display will be described as a UI operation of a fourth embodiment.

FIG. 30A illustrates an example of a timeline 250 displayed on the display unit 77 by the CPU 71. The timeline 250 indicates from head to end of a moving image with a horizontal direction as a time axis direction. The timeline 250 includes an image timeline 251, a shake timeline 252, and a sound timeline 253.

In the image timeline 251, thumbnail images or the like of frames constituting the moving image are intermittently extracted and displayed in time order.

In the shake timeline 252, a shake state is displayed by, for example, a waveform. Note that, here, one shake waveform is illustrated. However, for example, the shake waveform may be separately displayed as a yaw direction shake waveform, a pitch direction shake waveform, and a roll direction shake waveform. Moreover, the shake waveform may be separately displayed for each frequency band.

In the sound timeline 253, a sound signal waveform added to the moving image is displayed. Of course, in the case of stereo sound of an L channel and an R channel, respective sound signal waveforms may be displayed.

For example, by displaying such a timeline 250, the user can confirm the shake state in accordance with a change in a scene or a change in a sound situation of the moving image.

Thereby, this is convenient for the shake production or the shake reduction with a designated section.

The shake information is associated with a frame of an image as the IMU data or the quaternion QD, for example, and the shake waveform based on the shake information is displayed on the shake timeline 252.

Only the shake information indicated by the shake waveform may be recorded on or read from a recording medium.

For example, by a predetermined operation of placing a cursor on the shake timeline 252 and right clicking the shake timeline 252, or the like, a save window 260 for saving shake information is displayed and "save shake information" or "open shake information" can be selected, as illustrated in FIG. 30B.

In the case where the user clicks the "save shake information", for example, a confirmation window 261 illustrated in FIG. 30C is displayed. The confirmation window 261 is provided with an OK button 262 and a cancel button 263 so that intention of the user can be confirmed.

In the case of saving only the shake information, that is, in the case of saving the shake information separately from the image and sound, synchronization information between the shake information and the image will be gone. Therefore, the disappearance of the synchronization information is presented to the user, and the intention of OK/cancel is confirmed.

When the user operates the OK button 262, the CPU 71 performs shake information saving processing.

When the user operates the cancel button 263, the CPU 71 returns the display to the display state of the timeline 250 in FIG. 30A, for example, without performing the shake information saving processing.

In the case where the user clicks the "open shake information", for example, it is conceivable to enlarge the shake information and display an image on which details can be adjusted or display a numerical value list as the IMU data or the quaternion QD so as to enable the user to perform detailed editing and confirmation.

It is also conceivable to perform an operation of adjusting the amount of shake or eliminating shake in a certain section of the moving image by enlarging the shake waveform on the time axis to enable modification of the waveform itself (modification of amplitude or frequency).

[5-6: UI Operation of Fifth Embodiment]

A fifth embodiment is an example of enabling assignment of preset data on a timeline 250.

Figure 31:
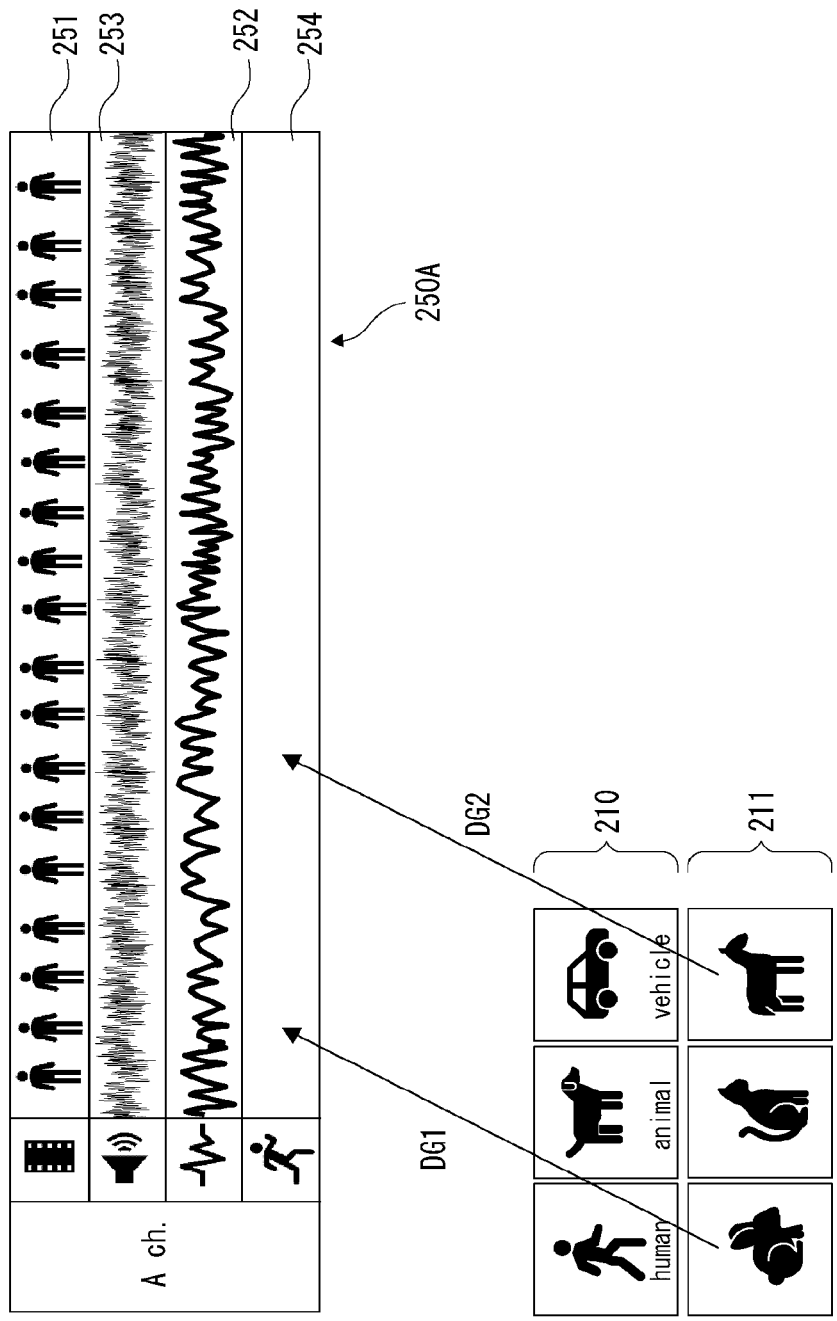
FIG. 31 is an explanatory diagram of a UI according to a fifth embodiment.

FIG. 31 illustrates a timeline 250A with a horizontal direction as a time axis direction. The timeline 250A in this case is provided with an assignment frame 254 in addition to an image timeline 251, a sound timeline 253, and a shake timeline 252.

The assignment frame 254 is a region for a user to arbitrarily assign preset data.

For example, preset buttons 210 and 211 are displayed on a screen of the display unit 77 together with the timeline 250A. The user can assign the preset data by, for example, dragging/dropping an arbitrary preset button 211 to the assignment frame 254.

For example, by performing a drag/drop operation DG1 for a rabbit button in the preset button 211, preset data display 255 of a rabbit is performed in the assignment frame 254 as illustrated in FIG. 32A, and assignment of the preset data of shake of the rabbit to a corresponding section in a moving image is displayed.

Similarly, by performing a drag/drop operation DG2 for a horse button, preset data display 256 of a horse is performed in the assignment frame 254 as illustrated in FIG. 32A, and assignment of the preset data of shake of the horse to a corresponding section in the moving image is displayed.

In the case where the preset data of the rabbit or the preset data of the horse is assigned to a certain section as illustrated in FIG. 32A, this means that the shake state in the section is modified to shake like the rabbit or shake like the horse.

That is, in the section, the shake modification parameter PRM corresponding to the preset data of the rabbit or the preset data of the horse is set and the shake modification is performed.

For this reason, in the section to which the preset data is assigned, the original shake indicated in the shake timeline 252 is not reflected in the image. Therefore, the shake waveform in the corresponding section is displayed in an unnoticeable manner as illustrated in the drawing (indicated by the broken line in the drawing) or is erased or grayed so that the user can understand that.

Depending on the drag/drop operation of the preset data, for example, the preset data to be operated is assumed to be assigned to a section of a fixed time length, and thereafter, the user can arbitrarily adjust the section in the assignment frame 254.

For example, the section length of the preset data of the rabbit or the section length of the preset data of the horse can be widened or narrowed by performing an operation such as dragging an end of the preset data display 255 or 256.

Furthermore, in the drawing, crossfade display 257 is performed at a boundary of the preset data (the boundary between the rabbit section and the horse section in FIG. 32A), and the shake state is gradually changed from the rabbit shake to the horse shake in the vicinity of this boundary.

The user can also modify each section from the state of FIG. 32A to the state of FIG. 32B by, for example, moving the portion of the crossfade display 257 or moving an end portion of the crossfade display 257.

Figure 32:
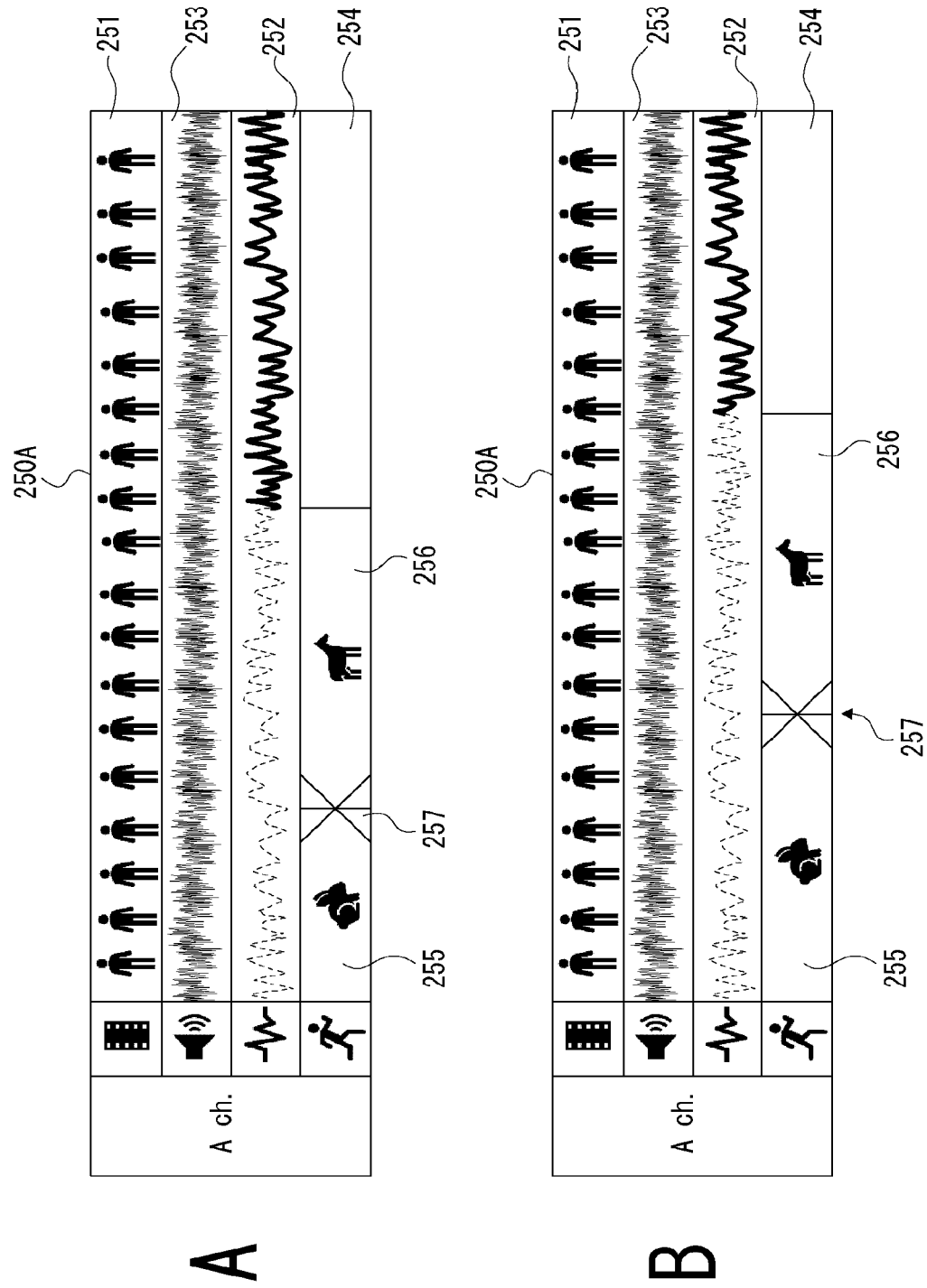
FIG. 32 is an explanatory diagram of the UI according to the fifth embodiment.

By providing the UI screen as illustrated in FIG. 31 or 32, the user can very easily assign the preset data to each scene of the moving image.

[5-7: UI Operation of Sixth Embodiment]

A sixth embodiment is an example of enabling an operation while confirming reproduction display to which a shake waveform and shake are given by displaying timeline display and a reproduction image.

Figure 33:
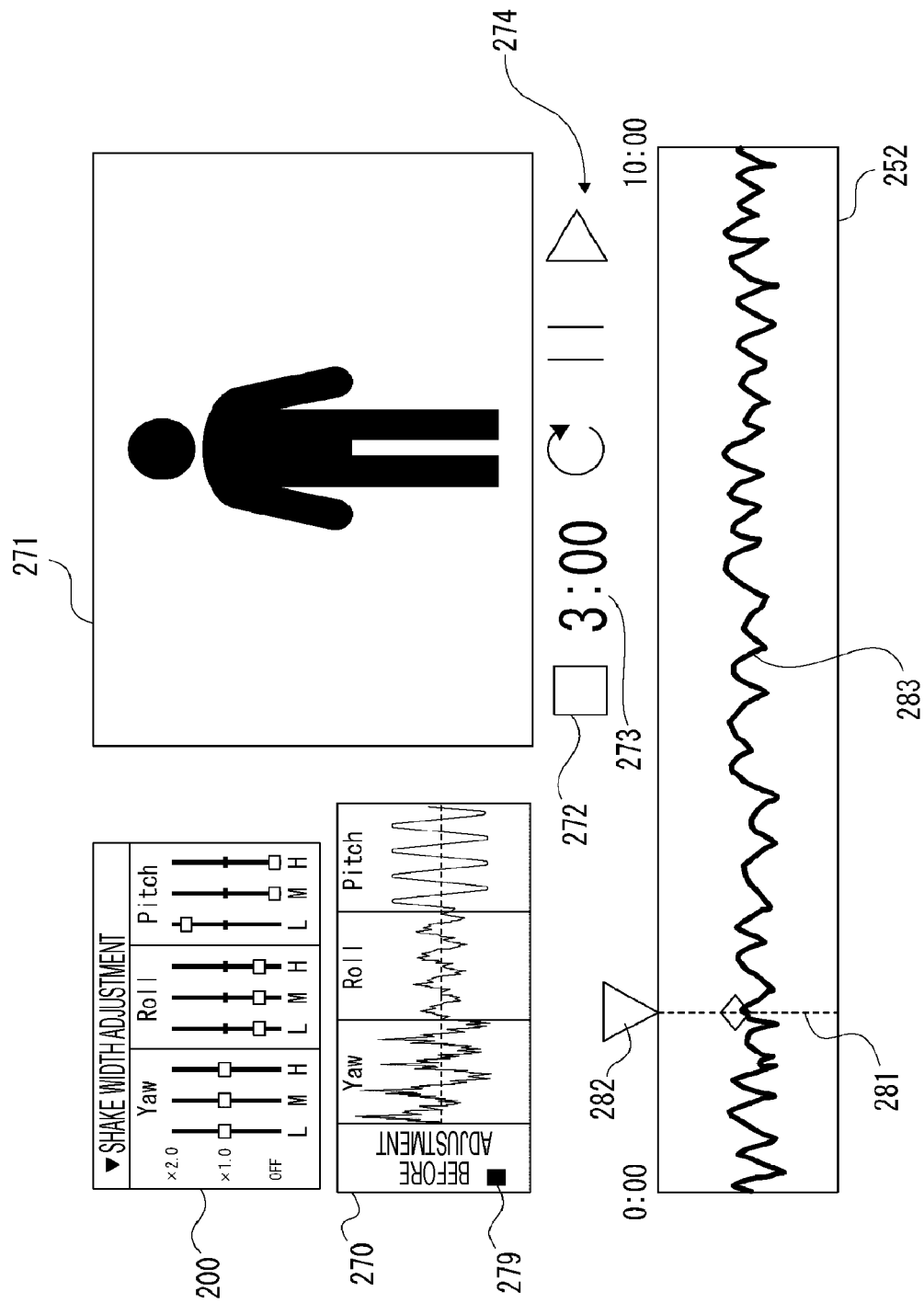
FIG. 33 is an explanatory diagram of a UI according to a sixth embodiment.

FIG. 33 illustrates a screen example. On the screen, for example, a shake width adjustment image 200, a monitor display 270, a reproduction display part 271, and a shake timeline 252 are presented to a user.

For example, as described with reference to FIGS. 25 and 26, the shake width adjustment image 200 can indicate a shake amount in each direction by the user performing a slider operation.

The waveform monitor 270 displays the shake waveform near the current position (keyframe) in each of the yaw direction, the roll direction, and the pitch direction, for example.

In the drawing, each shake waveform is illustrated as "before adjustment", which is a waveform before adjusted by the operation of the shake width adjustment image 200.

The waveform monitor 270 is provided with a switching button 279, and when the user operates the switching button 279, the displayed shake waveform is switched to "after adjustment". That is, the waveform is switched to the waveform in an adjusted state by the operation of the shake width adjustment image 200 and displayed.

For example, by performing a toggle operation for the switching button 279, the user can alternately see the shake waveforms of "after adjustment" and "before adjustment" and can visually confirm the degree of adjustment.

Note that, of course, the shake waveforms "after adjustment" and "before adjustment" may be displayed in parallel.

On the shake timeline 252, the horizontal direction is the time axis direction, and a shake waveform 283 is displayed. For example, in this example, the shake waveform 283 from a head (0 minutes 00 seconds) to an end (10 minutes 00 seconds) of a 10 minute moving image is displayed.

Then, as a keyframe display 281, a portion set as a keyframe by the user operation is clearly indicated. The user can set a frame at an arbitrary time point as the keyframe by moving a keyframe operation piece 282.

Note that, in this example, the keyframes can be set on the shake timeline 252, but the keyframe may be set on an image timeline 251 or a sound timeline 253 described above.

A reproduction image is displayed on the reproduction display part 271. In the vicinity of the reproduction display part 271, a reproduction repetition period designation button 272, a repetition period length 273, and a reproduction operation part 274 are displayed.

The reproduction operation part 274 displays a repeat button, a pause button, a reproduction button, and the like. The user can instruct on/off of repeat reproduction, pause of moving image reproduction, start of reproduction, and the like with these operation pieces.

The reproduction repetition period designation button 272 is an operation piece for repeatedly reproducing a relatively short section, and for example, the reproduction period length is switched according to the operation.

The reproduction period length designated by the operation is displayed as the repetition period length 273. The figure illustrates that the section of 3 minutes and 0 seconds is repeatedly reproduced.

This repetitive reproduction is performed in the section based on the keyframe designated by the user on the shake timeline 252.

For example, the keyframe is set as a start position of the repeat reproduction. In the case of the figure, when the user performs a reproduction operation, the section of 3 minutes from the position indicated by the keyframe display 281 on the shake timeline 252 is repeatedly reproduced as a repeat reproduction period.

In a case where the user wants to repeatedly reproduce a shorter section, the user may operate the reproduction repetition period designation button 272 to shorten the repeat reproduction period. Furthermore, in a case where the user wants to reproduce a different section, the user may move the keyframe operation piece 282.

The user can perform an operation of adjusting the shake state using the shake width adjustment image 200 while viewing the repeat reproduction. As a result, the user can adjust the shake suitable for the scene while actually viewing the image.

The image to be reproduced is assumed to be the output image data oPD in FIG. 14 or 24. That is, the image is an image in which the shake modification has been applied with the shake modification parameter PRM. Therefore, when the user performs an operation of adjusting the shake state using the shake width adjustment image 200, the shake is reflected in the reproduction image, so that the user can operate the shake state to an arbitrary shake state while viewing the actual shake state.

Note that the section to be repeatedly reproduced is based on the keyframe, but the start position of the keyframe is not limited to the head of the section to be reproduced.

For example, a frame a predetermined time before (for example, five seconds before) the keyframe may be set as a reproduction start frame.

Alternatively, the reproduction start frame may be determined such that the keyframe comes at the center of the section to be repeatedly reproduced.

Furthermore, to which section of the image the shake state adjusted with the shake width adjustment image 200 while confirming the repeat reproduction is applied, that is, the shake modification parameter PRM set according to the operation is applied, is conceivable in various ways.

For example, the shake modification parameter PRM according to the operation may be applied only to the section to be repeatedly reproduced.

Furthermore, the shake modification parameter PRM according to the operation may be applied to the section from the keyframe to the end of the image regardless of the section to be repeatedly reproduced.

Furthermore, the shake modification parameter PRM according to the operation may be applied to the section from the head of the image to the keyframe regardless of the section to be repeatedly reproduced.

Furthermore, the shake modification parameter PRM according to the operation may be applied to the section a predetermined time before and after the designated keyframe.

Furthermore, the shake modification parameter PRM according to the operation may be applied to all the sections of the moving image regardless of the section to be repeatedly reproduced.

Furthermore, a frame as a scene change point may be detected, and the shake modification parameter PRM according to the operation may be applied to the section detected as a scene including the keyframe.

Furthermore, a frame as a scene change point may be detected, and the shake modification parameter PRM according to the operation may be applied to the section from the keyframe to the next scene change point or the section from the scene change point before the keyframe to the keyframe.

Note that, in the case where a main character of an object can be determined by automatic scene recognition, it is also conceivable to automate the shake adjustment according to a motion of the main character.

As an applicable example in a case of not applying the shake modification parameter PRM according to the operation to a frame before the keyframe, it is also conceivable to create a new keyframe at a rearmost point of the frame to which the shake modification parameter PRM is not desired to be applied, and input a default shake modification parameter PRM to the new keyframe. The default shake modification parameter PRM is, for example, a value obtained when all the gains designated by sliders of the shake width adjustment image 200 are set to "1".

As an example of limiting an application range of the shake modification parameter PRM according to the operation, it is conceivable to perform the operation using points before and after the point to be limited as keyframes.

In the case of adjustment of removing the entire shake, it is also possible to prepare a check box for the entire track represented by the shake timeline 252 so that an instruction on the shake reduction can be given.

Note that, for example, on the shake timeline 252, the color of the shake waveform 283 may be modified so that the user can determine whether or not adjustment (shake modification) has been applied, or display may be performed such that a line such as a line graph connects marks of the keyframes in a form of being superimposed on the shake waveform 283.

[5-8: UI Processing of Fourth, Fifth, and Sixth Embodiments]

A UI processing example of performing the UI processing according to the above-described fourth, fifth, or sixth embodiment will be described with reference to FIGS. 34 and 35. This is processing executed by the CPU 71 by the functions of the UI processing unit 103 and the parameter setting unit 102.

Figure 34:
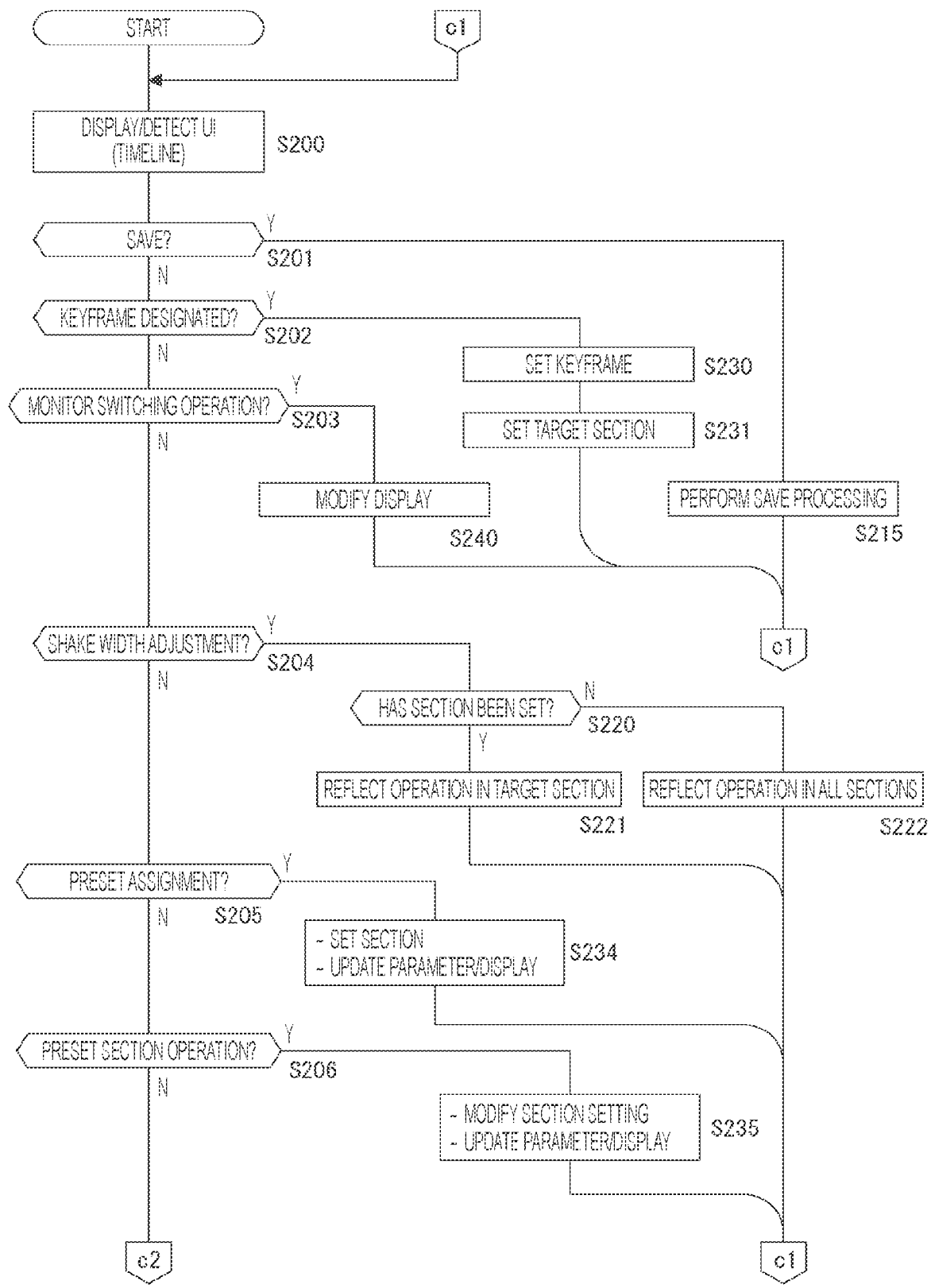
FIG. 34 is a flowchart of UI processing according to the fourth, fifth, and sixth embodiments.
Figure 35:
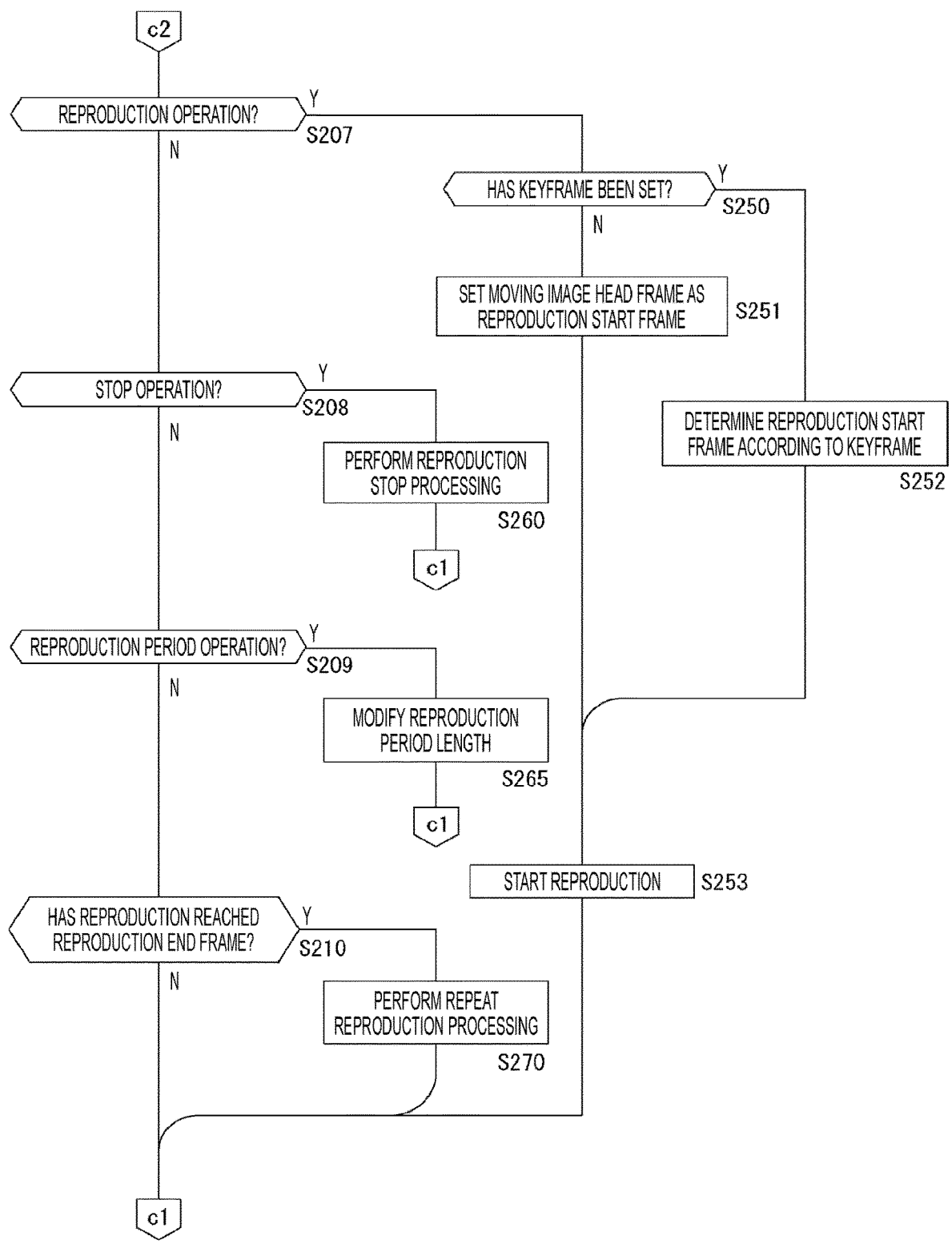
FIG. 35 is a flowchart of UI processing according to the fourth, fifth, and sixth embodiments.

Note that FIGS. 34 and 35 illustrate a series of processing in a divided manner, and the connection relationship of the flowcharts is indicated by "c1" and "c2".

Furthermore, in the processing, in the display of FIG. 33, the timeline 250A and the preset buttons 210 and 211 in FIGS. 31 and 32 are assumed to be displayed in place of the shake timeline 252, and the keyframe is displayed as illustrated in FIG. 33 on the shake timeline 252 on the timeline 250A.

In step S200, the CPU 71 performs the UI display and the operation detection processing.

For example, the CPU 71 performs control to cause the display unit 77 to display the shake width adjustment image 200, the waveform monitor 270, the reproduction display part 271, the reproduction repetition period designation button 272, the repetition period length 273, the reproduction operation part 274, the switching button 279, the timeline 250A (image timeline 251, sound timeline 253, shake timeline 252, and assignment frame 254), and the preset buttons 210 and 211. Furthermore, the CPU 71 detects the user operation on the screen on which these elements are displayed.

Furthermore, the CPU 71 switches the display with respect to the operation, for example, switches the slider position, or the like. the CPU 71 displays the preset button 210 of the next hierarchy, for example, the preset button 211 of the small classification, according to the operation of the preset button of the large classification, for example, corresponding to the hierarchical structure of the preset buttons 210 and 211.

The CPU 71 branches the processing in response to the detection of the user operation in steps S201, S202, S203, S204, S205, S206, S207, S208, S209, and S210 in FIGS. 34 and 35.

When detecting a save operation of the user, the CPU 71 proceeds from step S201 to step S215 in FIG. 34.

The save operation is, for example, an operation of right clicking the shake timeline 252 and selecting save of the shake information in the save window 260 as described with reference to FIG. 30.

In this case, in step S215, the CPU 71 performs the saving processing. For example, the CPU 71 causes the confirmation window 261 (see FIG. 30C) to be displayed, returns to step S200 without saving information in the case where the user operates the cancel button 263, and performs saving processing for the shake information to the storage unit 79 or the like, for example, and returns to step S200 in the case where the user operates the OK button.

When detecting that the user has performed a keyframe designation operation, the CPU 71 proceeds from step S202 to step S230 in FIG. 34 and performs keyframe setting. That is, the keyframe display 281 is performed at a position corresponding to the operation of the keyframe operation piece 282 on the shake timeline 252, and a frame number thereof is specified and set as the keyframe. The frame number can be, for example, a number of hour, minute, and second frame when the head frame of the moving image is a 0:00:00 0 frame.

Next, the CPU 71 sets a target section in step S231. This is processing of setting a section to which the shake modification by the user operation is to be applied with reference to the keyframe. Although there are various setting methods as described above, for example, a section from the keyframe to the end of the image is set as an application section or the like.

The CPU 71 returns to step S200 through the processing in steps S230 and S231 described above.

When detecting that the user has performed a monitor switching operation, that is, the operation of the switching button 279, the CPU 71 proceeds from step S203 to step S240 and switches the display of the waveform monitor 270. In this case, when the display of the waveform monitor 270 is before adjustment, the CPU performs processing of switching the display to the waveform after adjustment, and when the display of the waveform monitor 270 is after adjustment, the CPU 71 performs processing of switching the display to the waveform before adjustment. Then, the processing of the CPU 71 returns to step S200.

When detecting that the user has performed a shake width adjustment operation, that is, the operation of the slider of the shake width adjustment image 200, the CPU 71 proceeds from step S204 to step S220 and checks whether or not the target section to reflect the operation has been set.

In the case where the target section has not been set, that is, the case where the user has not set the keyframe, the CPU 71 proceeds to step S222, and sets, for example, the entire section of the moving image as the target section, and causes the shake modification parameter PRM according to a current operation value of the slider to be applied to the entire section. Of course, the entire section being targeted is an example.

On the other hand, in the case where the target section has been set in the processing in step S231 by then, the CPU 71 proceeds to step S221 and causes the shake modification parameter PRM according to the current operation value of the slider to be applied to the set target section.

Then, the processing of the CPU 71 returns to step S200.

When detecting that the user has performed a preset assignment operation, the CPU 71 proceeds from step S205 to step S234.

The preset assignment operation is an operation of assigning certain preset data to a certain section, such as the drag/drop operations DG1 and DG2 in FIG. 31.

In this case, in step S234, the CPU 71 sets the section to be assigned, and causes the shake modification parameter PRM based on the preset data assigned to the section to be applied.

Furthermore, the CPU 71 causes the preset data display 255 to be performed on the assignment frame 254, and also performs display modification (for example, broken line display in FIG. 32A) indicating that the original shake is no longer applied, on the shake timeline 252. Then, the processing of the CPU 71 returns to step S200.

When detecting that the user has performed an operation to modify the preset assignment section, the CPU 71 proceeds from step S206 to step S235. For example, this is the case where the user has performed an operation of modifying the preset assignment section as described with reference to FIG. 32B.

In this case, in step S235, the CPU 71 newly sets the section to be assigned, and causes the application section of the shake modification parameter PRM based on the preset data to be modified. Then, the processing of the CPU 71 returns to step S200.

When detecting that the user has performed the reproduction operation, that is, the operation of the reproduction button of the reproduction operation part 274, the CPU 71 proceeds from step S207 to step S250 in FIG. 35 and checks whether or not the keyframe has been set.

In the case where the user has not performed the keyframe setting, the CPU 71 proceeds to step S251 and sets the head frame of the moving image as the reproduction start frame.

Then, in step S253, the CPU 71 performs reproduction start control. As a result, the moving image is reproduced on the reproduction display part 271 from the beginning.

Note that the section to be repeatedly reproduced is a section corresponding to the time displayed with the repetition period length 273.

In the case where the user has performed the keyframe setting, the CPU 71 proceeds from step S250 to step S251, and sets the reproduction start frame, which is the head of the section to be repeatedly reproduced, according to the keyframe setting.

As described above, there is an example in which the keyframe itself is set as the reproduction start frame, and there is also an example in which the reproduction start frame is set near the keyframe.

Then, in step S253, the CPU 71 performs reproduction start control. As a result, the moving image from the frame according to the keyframe setting is reproduced on the reproduction display part 271. Note that the section to be repeatedly reproduced is a section corresponding to the time displayed with the repetition period length 273 from the frame according to the keyframe setting.

After performing the reproduction start control in step S253, the CPU 71 returns to step S200 in FIG. 34.

Note that the section to be repeatedly reproduced set in step S252 does not necessarily need to match the section to which the shake modification by the user operation set in step S231 described above is applied.

However, these sections may be matched, and the shake modification may be applied to the section to be repeatedly reproduced. In this case, since the shake modification is applied only to the section in which the user can confirm the shake modification, an interface that is easy for the user to understand can be provided.

Conversely, in the case where the user checks a part of the moving image and wants to apply shake to a wide range, it is desirable to apply the shake modification to a section wider than the section to be repeatedly reproduced.

Furthermore, in the case where the shake production is added to a very short section, and preceding and succeeding sections are desired to be checked, it is desirable to apply the shake modification to a part of the section to be repeatedly reproduced.

When detecting that the user has performed a stop operation, that is, the operation of the stop button of the reproduction operation part 274, the CPU 71 proceeds from step S208 to step S260 in FIG. 35 and performs reproduction stop control. Then, the processing returns to step S200 of FIG. 34.

Note that reproduction stop and reproduction pause may be operated separately. For example, in the case where to reproduction pause operation different from a reproduction stop operation is detected, the CPU 71 performs processing of stopping the reproduction image at the frame at that time.

When detecting an operation of the reproduction period length, that is, the operation of the reproduction repetition period designation button 272 in step S209 of FIG. 35, the CPU 71 proceeds to step S265 and modifies the reproduction period length. That is, the CPU 71 modifies the setting of the reproduction period length and modifies the display of the repetition period length 273 to a new time length. Then, the processing of the CPU 71 returns to step S200 in FIG. 34.

The reproduction period length updated in step S265 is reflected in subsequent repeat reproduction or current repeat reproduction. As a result, the user can adjust the section to be repeatedly reproduced.

In the case of detecting that the repeat reproduction has reached a reproduction end frame in step S210 of FIG. 35, the CPU 71 proceeds to step S270 and performs repeat reproduction processing.

The reproduction end frame is a frame at a position after the set reproduction period length has passed from the reproduction start frame set in step S251 or step S252.

The CPU 71 performs control to return to the reproduction start frame and perform reproduction as the repeat reproduction processing. Then, the processing returns to step S200.

Through the processing of FIGS. 34 and 35, the UI display and the operation support as illustrated in FIGS. 30, 31, 32, and 33 are implemented.

6. CONCLUSION AND MODIFICATION

In the above embodiment, the following effects can be obtained.

The image processing devices TDx and TDy according to the embodiment includes the shake modification unit 101 that performs the shake modification processing of obtaining shake-modified image data by modifying the shake state of input image data constituting a moving image, the UI processing unit 103 that causes the operation piece regarding the shake modification to be presented and acquires the operation information by the operation piece, and the parameter setting unit 102 that sets the shake modification parameter PRM on the basis of the operation information acquired by the UI processing unit 103.

Thereby, an operation environment for enabling the user to execute the image processing such as adding shake to an image or suppressing shake of the image can be provided.

In particular, by making the parameter for the shake modification visually operable on the UI screen, a shake operation environment that is easy for the user to understand can be provided.

In the embodiment, an example has been described in which the UI processing unit 103 causes the operation piece for adjusting the shake amount to be presented, and the parameter setting unit 102 sets the parameter for adjusting the shake amount on the basis of the operation information of the operation piece. For example, the example is the processing corresponds to the display of the shake width adjustment image 200 and the operation thereof illustrated in FIGS. 25, 26, 27, and 33.

As a result, the user can arbitrarily adjust the amount of shake of the image.

In the embodiment, an example has been described in which the UI processing unit 103 causes the operation piece for adjusting the shake amount for one or a plurality of shake direction components to be presented, and the parameter setting unit 102 sets the parameter for adjusting the shake amount of the shake direction component on the basis of the operation information of the shake amount of the shake direction component.

That is, although the shake appearing in the image includes a plurality of shake direction components, the shake amount can be adjusted for one shake direction component or for each plurality of shake direction components.

Thereby, the user can adjust the shake amount in units of shake directions. For example, shake in a specific direction can be adjusted.

Furthermore, the shake amount of a plurality of shake direction components may be made adjustable. Various shake modifications can be implemented by adjusting the shake amount for each direction component.

For example, the user can perform adjustment such as reducing only various vertical shakes, or increasing vertical shakes and reducing horizontal shakes.

In particular, in the embodiment, an example has been described in which all or a part of the yaw direction shake component, the roll direction shake component, and the pitch direction shake component is included as the shake direction component.

Since all or some of the shake components in the yaw direction, the roll direction, and the pitch direction can be adjusted, the user can execute the operation such as removal or increase of specific shake or production of various shakes with an easily understandable interface.

Note that, in the embodiment, an example has been described in which the shake modification unit 101 performs the gain processing based on the shake modification parameter by shake direction, for the shake information (for example, the quaternion QDs for shaking) for adding shake based on the shake information at the time of imaging to generate the post-adjustment shake information.

The post-adjustment quaternion eQD in which the shake amount is adjusted for each shake direction can be generated by performing the gain processing for each shake direction (yaw, pitch, or roll) as in the processing in FIGS. 18 and 19, and mixing the results. By doing so, arbitrary adjustment is performed for each shake direction and various shake productions can be applied.

For example, it is also possible to easily perform the shake production in which vertical shake is applied but horizontal shake is not applied.

In the embodiment, an example has been described in which the UI processing unit 103 causes the operation piece for adjusting the shake amount for one or a plurality of shake frequency bands to be presented, and the parameter setting unit 102 sets the parameter for adjusting the shake amount of the shake frequency band on the basis of the operation information of the shake amount of the shake frequency band.

The shake appearing in the image includes vibration components of a plurality of frequencies. Therefore, the shake amount can be adjusted for each one frequency band or each plurality of frequency bands.

Thereby, the user can adjust the shake assuming the degree of shake such as large shake or small shake.

For example, it is possible to perform adjustment such as removing or adding only slight shake.

Furthermore, by making the shake amounts of the shake components in the plurality of frequency bands adjustable, shake adjustment for various degrees of shakes can be implemented. For example, the user can perform adjustment such as emphasizing fine shake while reducing large shake.

In particular, in the embodiment, an example has been described in which the operation piece for adjusting the shake amounts of at least the low frequency band and the high frequency band is caused to be presented as the frequency band, and the parameter setting unit 102 sets the parameter for adjusting the shake amount of the low frequency band and the parameter for adjusting the shake amount of the high frequency band.

For example, the shake can be adjusted in two bands of the low frequency band and the high frequency band. Alternatively, the shake can be adjusted in three or more bands of the low frequency band, one or more intermediate frequency bands, and the high frequency band.

Thereby, the user can adjust the shake amount for each band and can produce an arbitrary degree of shake. By providing the interface for enabling adjustment for each band, the degree of shake implemented according to an adjustment operation becomes predictable for the user, and the operability becomes improved.

Note that, in the embodiment, an example has been described in which the shake modification unit 101 generates the post-adjustment shake information by performing gain processing based on the shake modification parameter PRM by shake frequency band, for the shake information (for example, quaternion QDs for shaking) for adding shake based on the shake information at the time of imaging.

The post-adjustment quaternion eQD in which the shake amount is adjusted for each shake frequency band can be generated by dividing the band and performing the gain processing for each shake direction as in the processing in FIGS. 17 and 19, and mixing the results. By doing so, arbitrary adjustment can be performed for each shake frequency band and various shake productions can be applied.

For example, it is possible to easily perform the shake production such as suppressing large shake but increasing small shake.

In the embodiment, an example has been described in which the UI processing unit 103 causes the operation piece (preset buttons 210 and 211) for selecting the preset data of the shake waveform to be presented to be selectable, and the parameter setting unit 102 sets the parameter for adjusting the shake of the image according to the preset data selection operation (see FIGS. 27, 28, and 31).

Thereby, the user can very easily perform the shake modification operation by designating and selecting the prepared preset data.

For example, by preparing one or more preset data in which a change in the shake amount, frequency component, shake direction component, and the like are set in advance as a shake pattern, the user can perform the shake modification by the operation of designating the preset data.

Furthermore, a plurality of preset data is prepared, and the user can perform the operation of selecting desired shake.

In the above example, the preset data as shake of a person, shake of an animal, shake of a vehicle, and the like is prepared, so that the user can intuitively perform the operation for implementing the shake modification according to image content or editing intention on the moving image.

In particular, even if the user does not have detailed knowledge about the frequency component and the direction components such as yaw, roll, and pitch regarding the shake, the user can specify the shake by recognizing the shake as the shake of an animal, the shake of a vehicle, or the like, so the ease of operation is high.

In addition, for example, it is also assumed to prepare the preset data by subdividing the shake of a person such as shake of more slow walk, shake of normal walk, shake of running, shake of vigorous running, or the like.

By preparing the preset data of various animal types such as rabbit, cat, horse, dog, and frog, for the shake of animal, various types of shake editing becomes possible.

By preparing the preset data of various vehicle types such as car, truck, train, and airplane for the shake of vehicle, various types of shake editing becomes possible.

Moreover, it is conceivable to prepare the preset data corresponding to types of road surface states, such as asphalt road, dirt road, sand, and ice, or to prepare the preset data corresponding to sea states, such as calm on ship, weak wind, and storm, for example.

In the embodiment, an example has been described in which the UI processing unit 103 executes presentation of the timelines 250 and 250A indicating the shake component in the time axis direction of an image (see FIGS. 30, 31, 32, and 33).

Thereby, the user can easily confirm the shake state in each section (each scene) or the like in the moving image. This is very suitable for a case where the user confirms the overall tendency and state of shake in the moving image or the like, or confirms a section in which the user wants to perform the shake production, a section in which the user wants to perform the shake reduction, or the like.

In the embodiment, an example has been described in which the UI processing unit 103 can designate a keyframe on the timeline 250A (shake timeline 252) by the user operation (see, for example, steps S202, S230, and S231 in FIGS. 33, 34, and 35).

As a result, the user can arbitrarily designate a certain portion (section, scene) or the like in the moving image. This is a convenient function to designate a reproduction section, a shake editing portion, and the like.

In the embodiment, an example has been described in which the UI processing unit 103 performs processing of reproducing an image with reference to the keyframe designated by the user operation on the timeline 250A (shake timeline 252) (see steps S202, S230, S207, S250, S252, S253, and the like in FIGS. 33, 34, and 35).

As a result, the user can arbitrarily designate a certain portion in the moving image and give an instruction on reproduction thereof. Therefore, the user can confirm the shake state by viewing the reproduction image of the arbitrary portion.

In the embodiment, an example has been described in which the UI processing unit 103 performs processing of repeatedly reproducing an image section determined with reference to the keyframe designated by the user operation on the timeline 250A (see steps S202, S230, S207, S250, S252, S253, S210, S270, and the like in FIGS. 33, 34, and 35).

The user can easily understand the shake situation by repeatedly viewing a certain section (scene). Furthermore, in the case of adding the shake performance, the user can easily determine whether or not the shake production is appropriate by repeatedly viewing the section. Therefore, repeated reproduction becomes information presentation suitable for shake confirmation for the user.

In the embodiment, an example has been described in which the UI processing unit 103 performs processing of presenting the operation piece (preset buttons 210 and 211) for selecting the preset data of the shake waveform and assigning the selected preset data to the timeline 250A (see FIGS. 31 and 32).

As a result, the user can perform the operation of assigning arbitrary preset data to an arbitrary section on the timeline 250A. It is possible to perform the intuitive operation using the preset data and the operation of determining an application interval of the preset data while visually checking the preset data on the timeline.

In the embodiment, the UI processing unit 103 performs the processing of presenting the shake situation that changes according to the assignment of the preset data to the timeline 250A. That is, the section to which the preset data is assigned on the shake timeline 252 as illustrated in FIGS. 32A and 32B has a different display state of the shake waveform, and the display of a rabbit or a horse is arranged on the timeline 250A to indicate that the shake is added (see steps S234 and S235 in FIG. 34).

As a result, the user can confirm that the shake state changes in the section by assigning the preset data onto the timeline 250A.

FIGS. 32A and 32B clearly illustrate that the original waveform becomes ineffective and the shake of a rabbit and a horse is generated, but for example, it is also conceivable to display the waveform of shake imitating the rabbit or the horse as the shake waveform.

In the embodiment, an example has been described in which the UI processing unit 103 reflects the shake modification operation in the section set with reference to the keyframe (see steps S202, S230, S231, S204, S220, and S221 in FIGS. 34 and 35).

As a result, by designating the keyframe, the user can appropriately set the application section such as the slider operation and perform the shake modification operation of the section. Therefore, the operability is improved.

How to set the section corresponding to the keyframe can be considered in various ways as in the above example.

In the embodiment, an example has been described in which the UI processing unit 103 performs the processing of presenting the state before shake modification and the state after shake modification of the image according to the shake modification operation on the timeline (see the waveform monitor 270 in FIG. 33 and steps S203 and S240 in FIG. 34).

As a result, the user can confirm how the state of the shake state changes according to the shake modification operation and can easily understand the operation situation of the shake modification.

Note that the waveform of the shake before shake modification and the waveform of the shake after shake modification may be displayed side by side at the same time.

In the embodiment, an example has been described in which the shake modification unit 101 performs the shake modification processing of adding shake to the input image data in which no shake has occurred or the input image data (the image data PD or the image data PD (NS)) to which the shake reduction processing has been applied (see FIGS. 7, 8, and 9).

For example, the shake modification is performed for an image in which no camera shake or the like has originally occurred or an image for which the camera shake or the like has been removed on an imaging device side, which has been captured by a fixed camera.

That is, with the configuration, processing as the shake production that intentionally adds shake to an image with no shake or an image with little shake is performed, and the range of expression of the image can be widened.

In the embodiment, an example has been described in which the shake modification unit 101 performs the shake modification processing for the input image data (image data PD (S)) including the shake component (see FIGS. 10 and 11).

For example, an image from which the camera shake or the like has not been removed is input, and the shake modification is performed for the image.

In this case, that is, removal or reduction of shake, or increase or addition of shake is arbitrarily performed. According to the shake modification processing, it is possible to remove the shake originally present in the input image data and to increase the shake. In addition, it is also possible to add new shake after removing the original shake in the input image data. As a result, the quality of the image can be improved and the range of expression can be widened.

Figure 30:
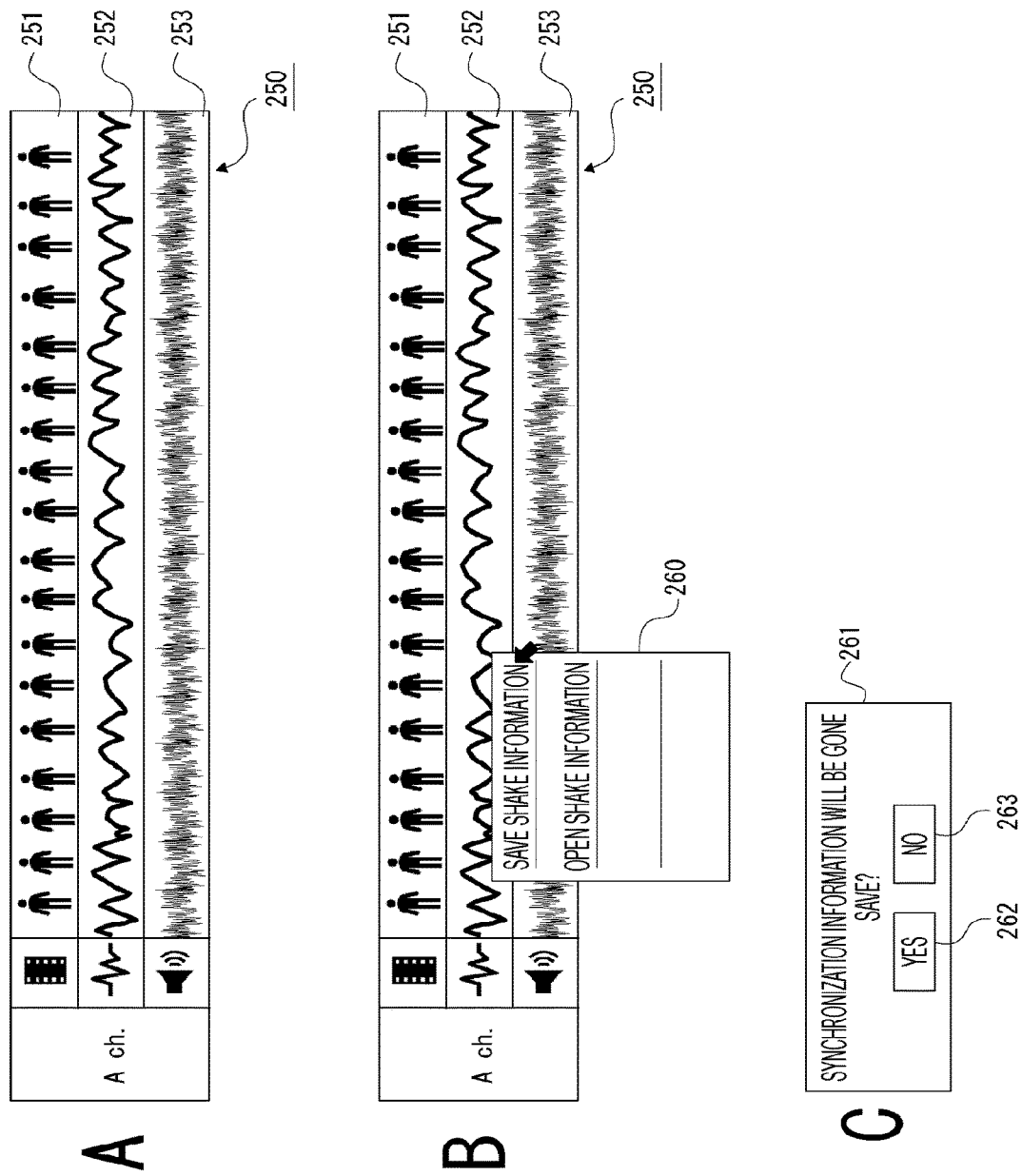
FIG. 30 is an explanatory diagram of a UI according to a fourth embodiment.

In the embodiment, the UI processing unit 103 performs the processing of storing the shake information according to the user's save operation (see step S215 in FIGS. 30 and 34).

As a result, information such as the shake modification by the operation arbitrarily performed by the user is saved, and can be reflected in subsequent reproduction, used for further editing, or used for removal of shake.

The program according to the embodiment is a program for causing the CPU, DSP, and the like, or a device including the CPU and DSP to execute the above-described user interface processing in the processing described in FIGS. 14 and 24.

That is, the program according to the embodiment causes the information processing device to execute the shake modification processing (ST30) of obtaining the shake-modified image data by modifying the shake state of the input image data constituting the moving image. Moreover, the program causes the information processing device to execute the UI processing of presenting the operation piece regarding the shake modification and acquiring the operation information by the operation piece, and the parameter setting processing of setting the shake modification processing parameter PRM on the basis of the operation information acquired by the UI processing, that is, the processing in FIG. 29 and the processing in FIGS. 24 and 35.

By such a program, the above-described image processing devices TDx and TDy can be implemented in a device such as the mobile terminal 2, the personal computer 3, or the imaging device 1, for example.

Such a program for implementing the image processing devices TDx and TDy can be recorded in advance in an HDD as a recording medium built in a device such as a computer device, a ROM in a microcomputer having a CPU, or the like.

Alternatively, the program can be temporarily or permanently stored (recorded) on a removable recording medium such as a flexible disk, a compact disc read only memory (CD-ROM), a magnet optical (MO) disk, a digital versatile disc (DVD), a Blu-ray disc (registered trademark), a magnetic disk, a semiconductor memory, or a memory card. Such a removable recording medium can be provided as so-called package software.

Furthermore, such a program can be installed from a removable recording medium to a personal computer or the like, and can also be downloaded from a download site via a network such as a local area network (LAN) or the Internet.

Furthermore, such a program is suitable for providing a wide range of image processing devices TDx and TDy according to the embodiment. For example, by downloading a program to a personal computer, a portable information processing device, a mobile phone, a game device, a video device, a personal digital assistant (PDA), or the like, the personal computer or the like can be caused to function as the image processing device of the present disclosure.

Note that the effects described in the present specification are merely examples and are not limited, and other effects may be exhibited.

Note that the present technology can also have the following configurations.

(1)
An image processing device including:
a shake modification unit configured to perform shake modification processing of obtaining shake-modified image data by modifying a shake state of input image data constituting a moving image;
a user interface processing unit configured to acquire operation information regarding shake modification; and
a parameter setting unit configured to set a parameter of the shake modification processing on the basis of the operation information acquired by the user interface processing unit.

(2)
The image processing device according to (1), in which
the user interface processing unit causes an operation piece for adjusting a shake amount to be presented, and
the parameter setting unit sets a parameter for adjusting the shake amount on the basis of operation information of the operation piece.

(3)
The image processing device according to (1) or (2), in which
the user interface processing unit causes an operation piece for adjusting a shake amount for one or a plurality of shake direction components to be presented, and
the parameter setting unit sets a parameter for adjusting the shake amount of the shake direction component on the basis of operation information of the shake amount of the shake direction component.

(4)
The image processing device according to (3), in which
the shake direction component includes at least one of a yaw direction shake component, a roll direction shake component, or a pitch direction shake component.

(5)
The image processing device according to any one of (1) to (4), in which
the user interface processing unit causes an operation piece for adjusting a shake amount for one or a plurality of frequency bands of shake to be presented, and
the parameter setting unit sets a parameter for adjusting the shake amount of the frequency band on the basis of operation information of the shake amount of the frequency band.

(6)
The image processing device according to (5), in which
the user interface processing unit causes an operation piece for adjusting shake amounts of at least a low frequency band and a high frequency band as the frequency band to be presented, and
the parameter setting unit sets a parameter for adjusting the shake amount of the low frequency band and a parameter for adjusting the shake amount of the high frequency band.

(7)
The image processing device according to any one of (1) to (6), in which
the user interface processing unit enables selection operation for preset data of a shake waveform, and
the parameter setting unit sets a parameter for adjusting shake of an image according to the selection operation for preset data.

(8)
The image processing device according to any one of (1) to (7), in which
the user interface processing unit causes presentation of a timeline indicating a shake component to be executed in a time axis direction of an image.

(9)
The image processing device according to (8), in which
the user interface processing unit enables specification of a keyframe on the timeline by a user operation.

(10)
The image processing device according to (8) or (9), in which
the user interface processing unit
enables specification of a keyframe on the timeline by a user operation, and
performs processing of reproducing an image with reference to the keyframe specified by the user operation on the timeline.

(11)
The image processing device according to (10), in which
the user interface processing unit performs processing of repeatedly reproducing an image section determined with reference to the keyframe specified by the user operation on the timeline.

(12)
The image processing device according to any one of (8) to (11), in which
the user interface processing unit performs processing of assigning preset data selected by an operation to the timeline.

(13)
The image processing device according to (12), in which the user interface processing unit performs processing of presenting a situation of shake that changes according to the assignment of the preset data to the timeline.

(14)
The image processing device according to any one of (8) to (13), in which
the user interface processing unit
enables specification of a keyframe on the timeline by a user operation, and
causes an operation of shake modification to be reflected in a section set with reference to the keyframe.

(15)
The image processing device according to any one of (1) to (14), in which
the user interface processing unit performs processing of presenting a state before modification and a state after modification of shake of an image regarding a shake modification operation.

(16)
The image processing device according to any one of (1) to (15), in which
the shake modification unit performs shake modification processing of adding shake to the input image data in which no shake has occurred or the input image data to which shake reduction processing has been applied.

(17)
The image processing device according to any one of (1) to (16), in which
the shake modification unit performs shake modification processing for the input image data including a shake component.

(18)
The image processing device according to any one of (1) to (17), in which
the user interface processing unit performs processing of storing shake information in response to an operation of saving shake information of a user.

(19)
An image processing method including:
performing, by an image processing device,
shake modification processing of obtaining shake-modified image data by modifying a shake state of input image data constituting a moving image;
user interface processing of acquiring operation information regarding shake modification; and
parameter setting processing of setting a parameter of the shake modification processing on the basis of the operation information acquired in the user interface processing.

(20)
A program for causing an information processing device to execute:
shake modification processing of obtaining shake-modified image data by modifying a shake state of input image data constituting a moving image;
user interface processing of acquiring operation information regarding shake modification; and
parameter setting processing of setting a parameter of the shake modification processing on the basis of the operation information acquired in the user interface processing.

REFERENCE SIGNS LIST

1 Imaging device
2 Mobile terminal
3 Personal computer
4 Server
5 Recoding medium
11 Lens system
12 Imaging element unit
13 Camera signal processing unit
14 Recording control unit
15 Display unit
16 Output unit
17 Operation unit
18 Camera control unit
19 Memory unit
22 Driver unit
23 Sensor unit
41 Low pass filter
42 Middle pass filter
43 High pass filter
44, 45, 46 Gain calculation unit
47, 57, 61 Synthesis unit
51 Yaw component extraction unit
52 Pitch component extraction unit
53 Roll component extraction unit
54, 55, 56 Gain calculation unit
58, 59, 60 Processing unit by direction
70 Information processing device
71 CPU
72 ROM
73 RAM
74 Bus
75 Input/output interface
76 Input unit
77 Display unit
78 Sound output unit
79 Storage unit
80 Communication unit
81 Removable recording medium
82 Drive
101 Shake modification unit
101a Shake reduction unit
101b Shake adding unit
102 Parameter setting unit
103 UI processing unit
104 Correction cancellation unit
110 Image before lens distortion correction
111 Image after lens distortion correction
120 Exposure timing
131 Coordinate plane
132 Region
200 Shake width adjustment image
210 Preset button
211 Preset button
250, 250A Timeline
251 Image timeline
252 Shake timeline
253 Sound timeline
254, 256 Preset data display
257 Crossfade display
260 Save window
261 Confirmation window
262 OK button
263 Cancel button
270 Waveform monitor
271 Reproduction display part
272 Reproduction repetition period designation button
273 Repetition period length
274 Reproduction operation part
279 Switching button 281 Keyframe display
282 Keyframe operation piece
283 Shake waveform
VS Image source
TDx Image processing device
TDy Image processing device

The invention claimed is:

1. An image processing device comprising:
processing circuitry configured to:
perform shake modification processing of obtaining shake-modified image data by modifying a shake state of input image data constituting a moving image;
acquire operation information regarding shake modification, via a user interface; and
set a parameter of the shake modification processing on a basis of the operation information acquired by the user interface,
wherein, the user interface is further configured to enable specification of a keyframe on a timeline by a user operation, and
the processing circuitry is further configured to perform image reproduction processing of an image with reference to the keyframe specified by the user operation on the timeline.

2. The image processing device according to claim 1, wherein
the processing circuitry causes an operation piece for adjusting a shake amount to be presented in the user interface, and
the processing circuitry sets a parameter for adjusting the shake amount on a basis of operation information of the operation piece.

3. The image processing device according to claim 1, wherein
the processing circuitry causes an operation piece for adjusting a shake amount for one or a plurality of shake direction components to be presented in the user interface, and
the processing circuitry sets a parameter for adjusting the shake amount of the shake direction component on a basis of operation information of the shake amount of the shake direction component.

4. The image processing device according to claim 3, wherein
the shake direction component includes at least one of a yaw direction shake component, a roll direction shake component, or a pitch direction shake component.

5. The image processing device according to claim 1, wherein
the processing circuitry causes an operation piece for adjusting a shake amount for one or a plurality of frequency bands of shake to be presented in the user interface, and
the processing circuitry sets a parameter for adjusting the shake amount of the frequency band on a basis of operation information of the shake amount of the frequency band.

6. The image processing device according to claim 5, wherein
the processing circuitry causes an operation piece for adjusting shake amounts of at least a low frequency band and a high frequency band as the frequency band to be presented by the user interface, and
the processing circuitry sets a parameter for adjusting the shake amount of the low frequency band and a parameter for adjusting the shake amount of the high frequency band.

7. The image processing device according to claim 1, wherein
the user interface enables a selection operation for preset data of a shake waveform, and
the processing circuitry sets a parameter for adjusting shake of an image according to the selection operation for preset data.

8. The image processing device according to claim 1, wherein
the timeline indicates a shake component to be executed in a time axis direction of an image.

9. The image processing device according to claim 1, wherein
the processing circuitry performs processing of repeatedly reproducing an image section determined with reference to the keyframe specified by the user operation on the timeline.

10. The image processing device according to claim 8, wherein
the processing circuitry performs processing of assigning preset data selected by an operation to the timeline.

11. The image processing device according to claim 10, wherein
the user interface is configured to present a situation of shake that changes according to the assignment of the preset data to the timeline.

12. The image processing device according to claim 8, wherein
the user interface is configured to
cause an operation of shake modification to be reflected in a section set with reference to the keyframe.

13. The image processing device according to claim 1, wherein
the user interface is configured to present a state before modification and a state after modification of shake of an image regarding a shake modification operation.

14. The image processing device according to claim 1, wherein
the processing circuitry performs shake modification processing of adding shake to the input image data in which no shake has occurred or the input image data to which shake reduction processing has been applied.

15. The image processing device according to claim 1, wherein
the processing circuitry performs shake modification processing for the input image data including a shake component.

16. The image processing device according to claim 1, wherein
the processing circuitry stores shake information in response to an operation of saving shake information of a user.

17. An image processing method comprising:
performing, by an image processing device having a processing circuitry and a user interface,
shake modification processing of obtaining shake-modified image data by modifying a shake state of input image data constituting a moving image with the processing circuitry;
acquiring operation information regarding shake modification via the user interface; and setting a parameter of the shake modification processing on a basis of the operation information with the processing circuitry, wherein the method further comprises enabling, via the user interface, specification of a keyframe on a timeline by a user operation, and performing image reproduction processing of an image with reference to the keyframe specified by the user operation on the timeline.

18. A non-transitory computer-readable medium having stored thereon, instructions which when executed by an information processing device, cause the information processing device to execute a method, the method comprising:

shaking modification processing of obtaining shake-modified image data by modifying a shake state of input image data constituting a moving image;

acquiring operation information regarding shake modification via a user interface; and setting a parameter of the shake modification processing on a basis of the acquired operation information, wherein the method further comprises enabling, via the user interface, specification of a keyframe on a timeline by a user operation, and performing image reproduction processing of an image with reference to the keyframe specified by the user operation on the timeline.

* * * * *